Feb. 16, 1926.

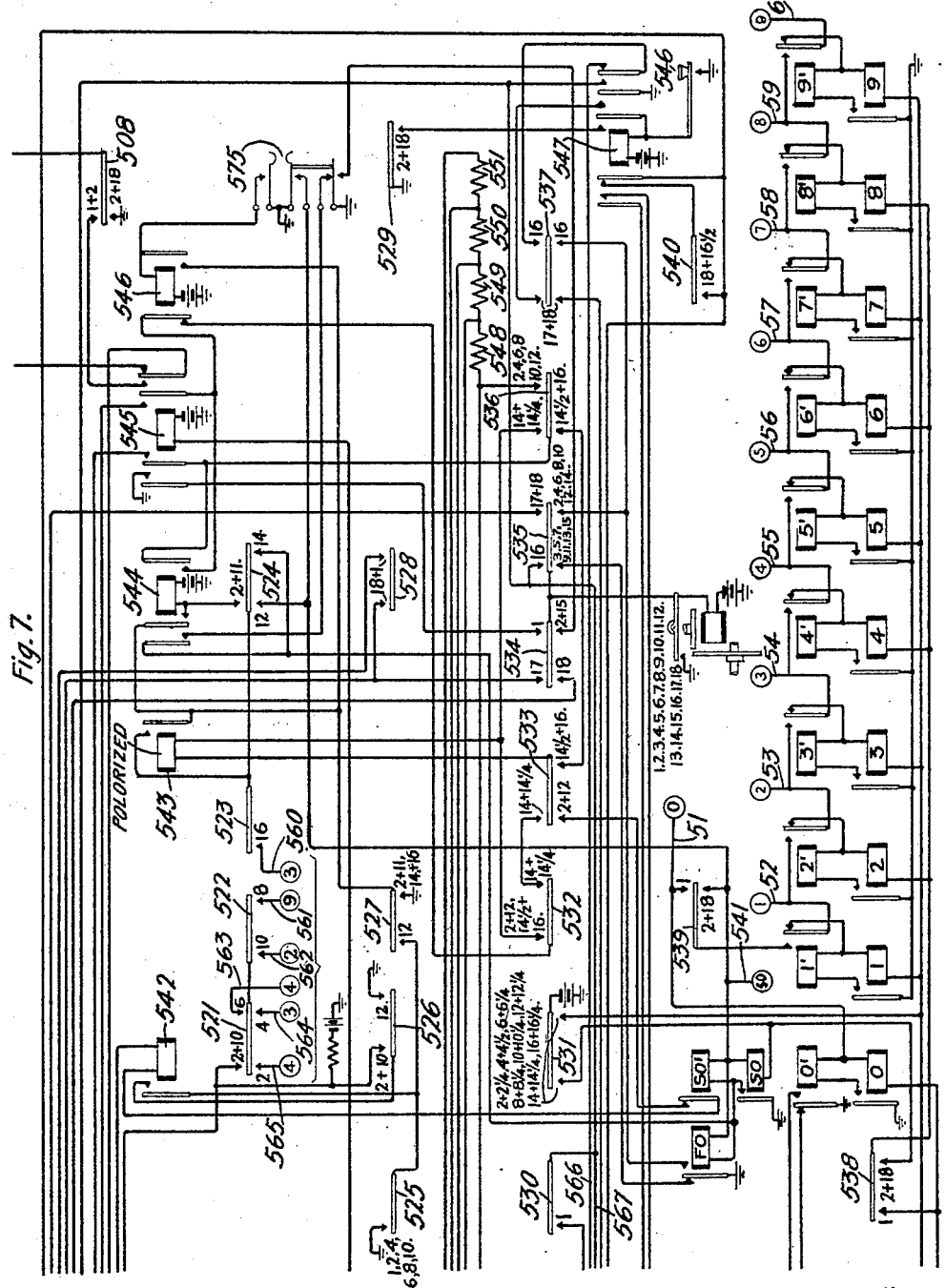

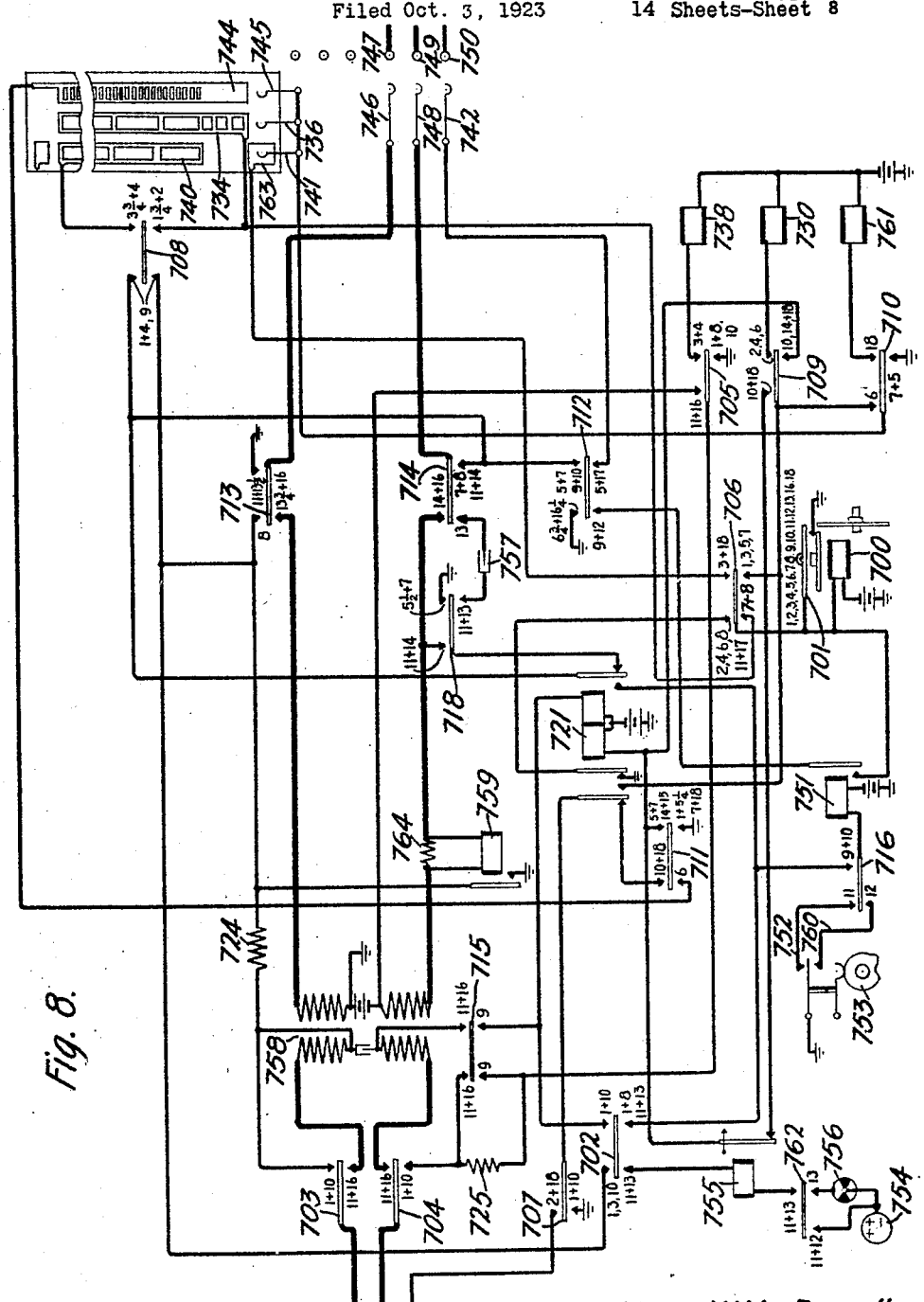

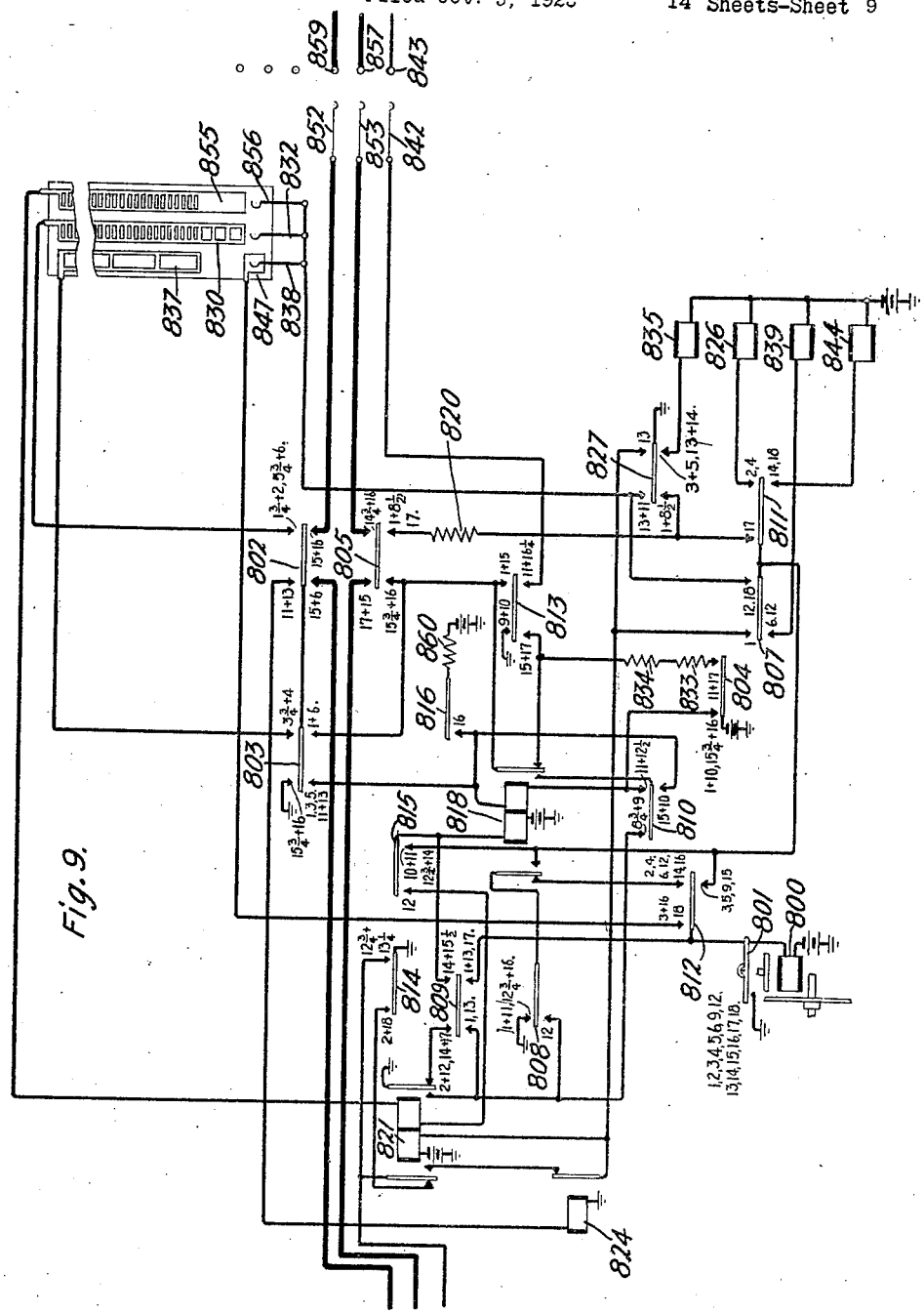

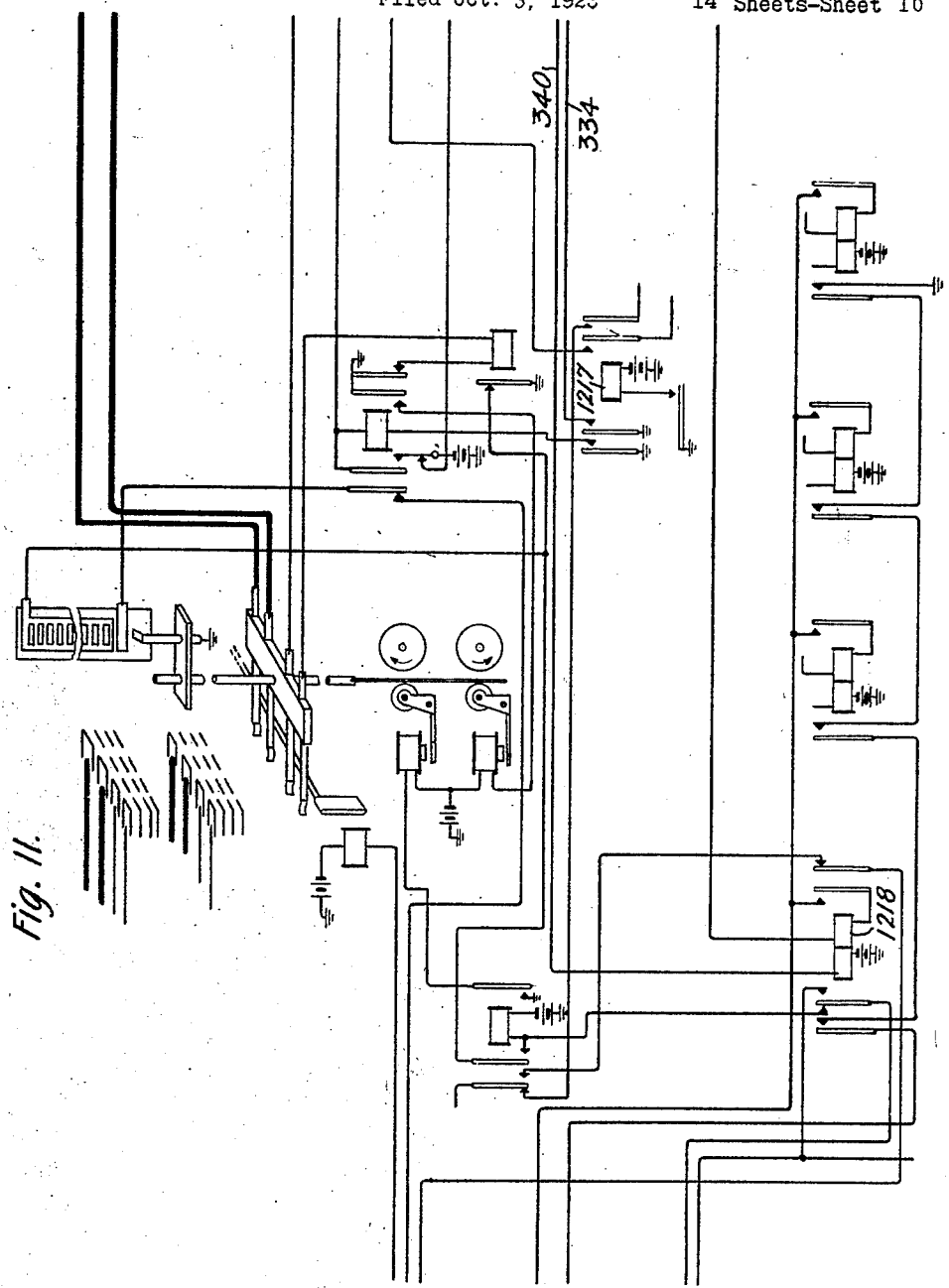

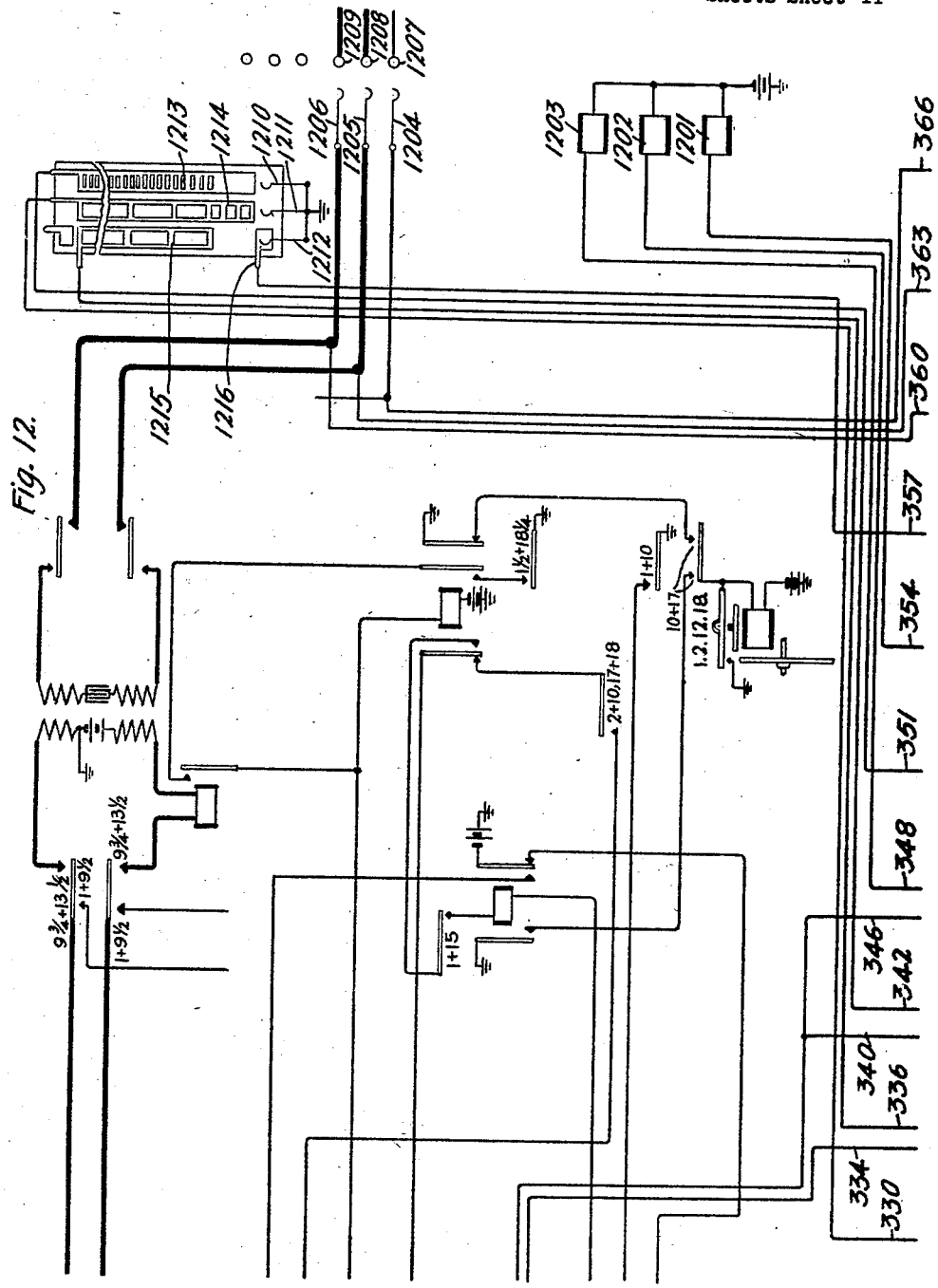

H. W. MacDOUGALL ET AL 1,573,412

AUTOMATIC TESTING SYSTEM TO TEST AUTOMATIC SWITCHES

Filed Oct. 3, 1923     14 Sheets-Sheet 12

Fig. 13.

Inventors: Harry W. MacDougall
Arnold S. Bertels
by _____ Att'y

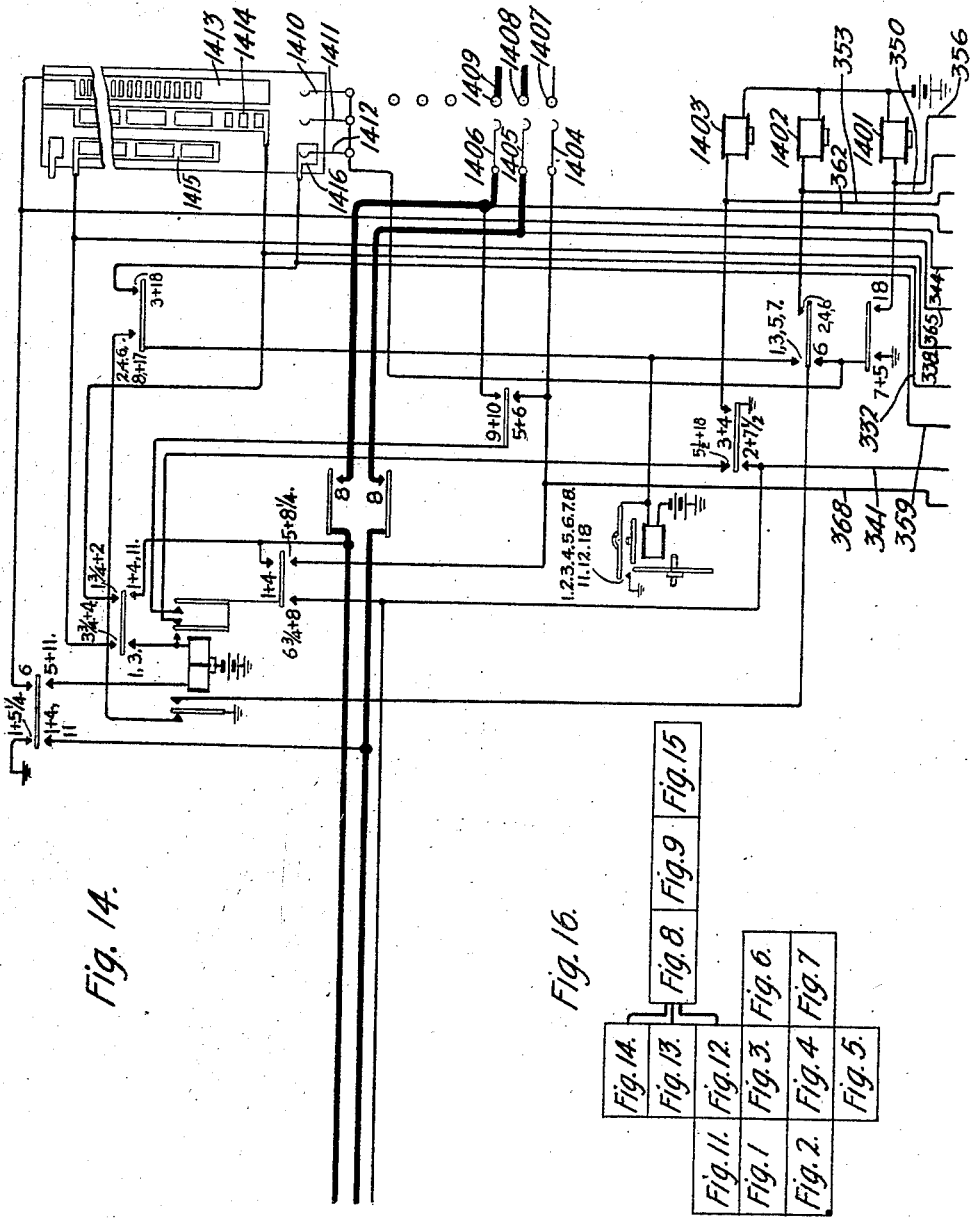

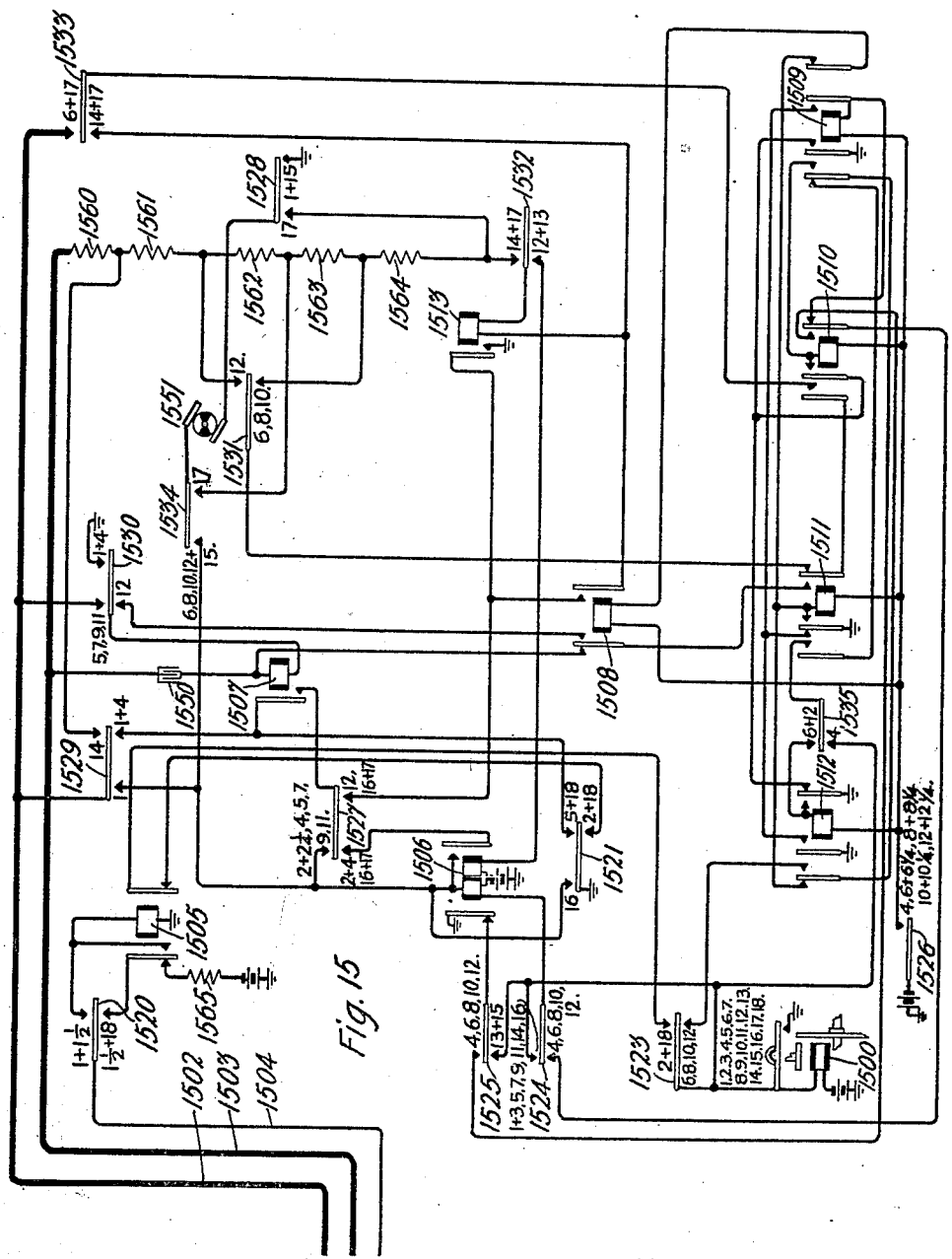

Patented Feb. 16, 1926.

1,573,412

UNITED STATES PATENT OFFICE.

HARRY W. MacDOUGALL, OF EAST ORANGE, AND ARNOLD S. BERTELS, OF TENAFLY, NEW JERSEY, ASSIGNORS TO WESTERN ELECTRIC COMPANY, INCORPORATED, OF NEW YORK, N. Y., A CORPORATION OF NEW YORK.

AUTOMATIC TESTING SYSTEM TO TEST AUTOMATIC SWITCHES.

Application filed October 3, 1923. Serial No. 666,216.

*To all whom it may concern:*

Be it known that we, HARRY W. MACDOUGALL and ARNOLD S. BERTELS, citizens of the United States of America, residing at East Orange, in the county of Essex, and at Tenafly, in the county of Bergen, State of New Jersey, respectively, have invented certain new and useful Improvements in Automatic Testing Systems to Test Automatic Switches, of which the following is a full, clear, concise, and exact description.

This invention relates to a telephone exchange system, and more particularly to a testing system for use in a machine switching system for testing selector switch units.

It is an object of this invention to provide an improved testing system.

The switching units of an automatically operated telephone exchange are made up of control apparatus, relays and auxiliary circuits to control its automatic progression and further control other switching units and the line apparatus. A large number of such switching units are required in a system of this kind, any one of which may be arbitrarily selected when idle to complete a service connection. Thus, it is apparent that a switching unit giving inefficient service is not immediately noticed. Since the apparatus of a switching unit requires adjustments within limited variation, it is important that these units be regularly tested to determine their ability to render efficient service. In order to reduce the cost of such maintenance it is desirable to use an automatically progressive testing system requiring a limited amount of manual operation. With this type of testing system the routine test of the automatic selector switching units of an exchange may be very rapidly accomplished.

A feature of this invention is in the use of a common automatically progressive selecting device to select automatic switches to be tested and direct them to one of a plurality of like testing devices.

A further feature of this invention is in the provision of an automatically progressive register to control the selection of the automatic switches to be tested.

A further feature of this invention is in the use of test selectors for successively selecting the automatic switches to be tested. The test selectors used in this system are automatic switches regularly used in service but of a different class than those to be tested. The various automatic switches used as test selectors have access to the automatic switches to be tested. They are successively selected by the testing control device and removed from service to be directively controlled in accordance with the position of the aforementioned register.

A further feature of this invention is in the provision of means to select groups of automatic switches and progressively test each automatic switch in the group. The group referred to is composed of a number of sub-groups with trunks extending to automatic switches in a particular office. The purpose in testing the automatic switches in groups is to increase the speed of the routine test. The test selector is directed to the first automatic switch of the group and progressively advanced from switch to switch. Each switch selected is tested.

A further feature of this invention is in the provision of means to govern the number of sub-groups constituting a group.

Other features of this invention relate to means to compensate trunk loops, extending to automatic switches in various offices, to equalize the trunk loop resistance for testing purposes, means to manually direct the testing control device for tests of particular automatic switches, means to arrest the testing control device when an unstandard condition is encountered, means to repeat tests of an automatic switch, means to restore the control system to normal from any position during a progressive test, and means to control a compound timing device to operate during the selection or test of an automatic switch.

These and other features of the invention will be apparent from the following description taken in connection with the accompanying drawing.

While the invention has been disclosed as particularly adapted for testing switches of the panel type, it will be apparent, however, from the following description that the invention has a wider utility and that by slight modification it could be adapted for testing other types of selector switches.

Fig. 1 shows keys to start an automatic routine test of incoming selector switches and keys to control special tests of particular incoming selector switches.

Fig. 2 illustrates register switches 70 and 85 connected to terminal strips. The cross-connection is shown between the terminal strips to illustrate a typical arrangement for an automatic routine test of incoming selector switches in a machine switching office. Register brushes 72 and 87 and their associated contacts are wired to control the movement of the register switches under control of the keys. The remaining register brushes and associated contacts are wired and cross-connected in a manner to control the movement of the testing control circuit so that all incoming selector switches of the office are tested, and so that incoming selector switches that are in other offices than the office in which this testing control circuit is located, may be tested.

The time period allotted for the operation of switches 570 or 580 is adjusted in such manner that should the various operations not be completed within a predetermined time, an alarm is sounded to indicate such condition to an attendant.

Fig. 7 illustrates the apparatus and circuits for controlling the incoming selector switch to be tested. This control circuit is designed to direct the incoming selector switch to a final selector switch, which is in turn directed to an auxiliary test circuit.

Fig. 8 shows an incoming selector switch and its auxiliary circuit. This is a typical incoming selector of the type to be tested by this testing system.

Fig. 9 illustrates a final selector switch used in conjunction with this test to connect the incoming selector switch to a test line located on the final frame.

Figure 2:
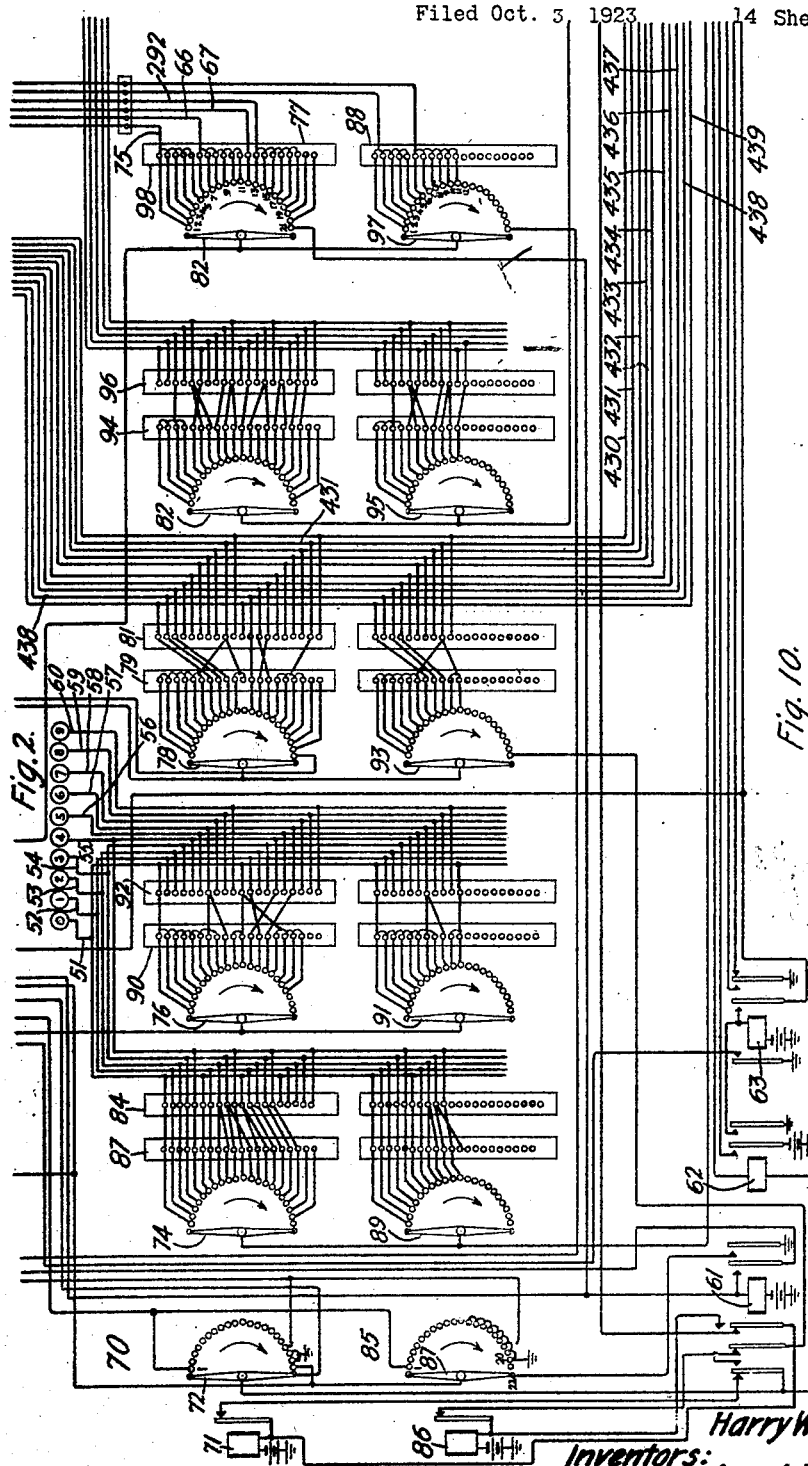

Fig. 10 is a diagram to show the location of the incoming selector switches on the frames and the necessary steps to test such incoming selector switches. The cross-connections of the terminals illustrated in Fig. 2 are made from this diagram.

Figs. 11 and 12 show a district selector used as a test selector. Calling subscribers' lines are normally extended to the district selector by means of the line finder shown in Fig. 11. It will be noted that the test selector is permanently connected to the testing control circuit at the contacts of the connector switches. The test selector is controlled from the testing control circuit to associate said testing selector with the incoming selector switches to be tested.

Fig. 13 shows a district selector of the type to which calling subscribers' lines are extended by means of line switches. This selector is used in the same manner as the line finder district.

Fig. 14 shows what is known as an office selector circuit which may be used as a test selector to associate the testing control circuit with incoming selector switches that cannot be reached by the other test selectors illustrated in Figs. 11, 12 and 13.

Fig. 15 illustrates the apparatus and circuits for testing the auxiliary circuits of the incoming selector switch, Fig. 8.

Fig. 16 is a diagram showing the order in which the sheets of drawings should be arranged.

*Description of apparatus.*

Figure 1:
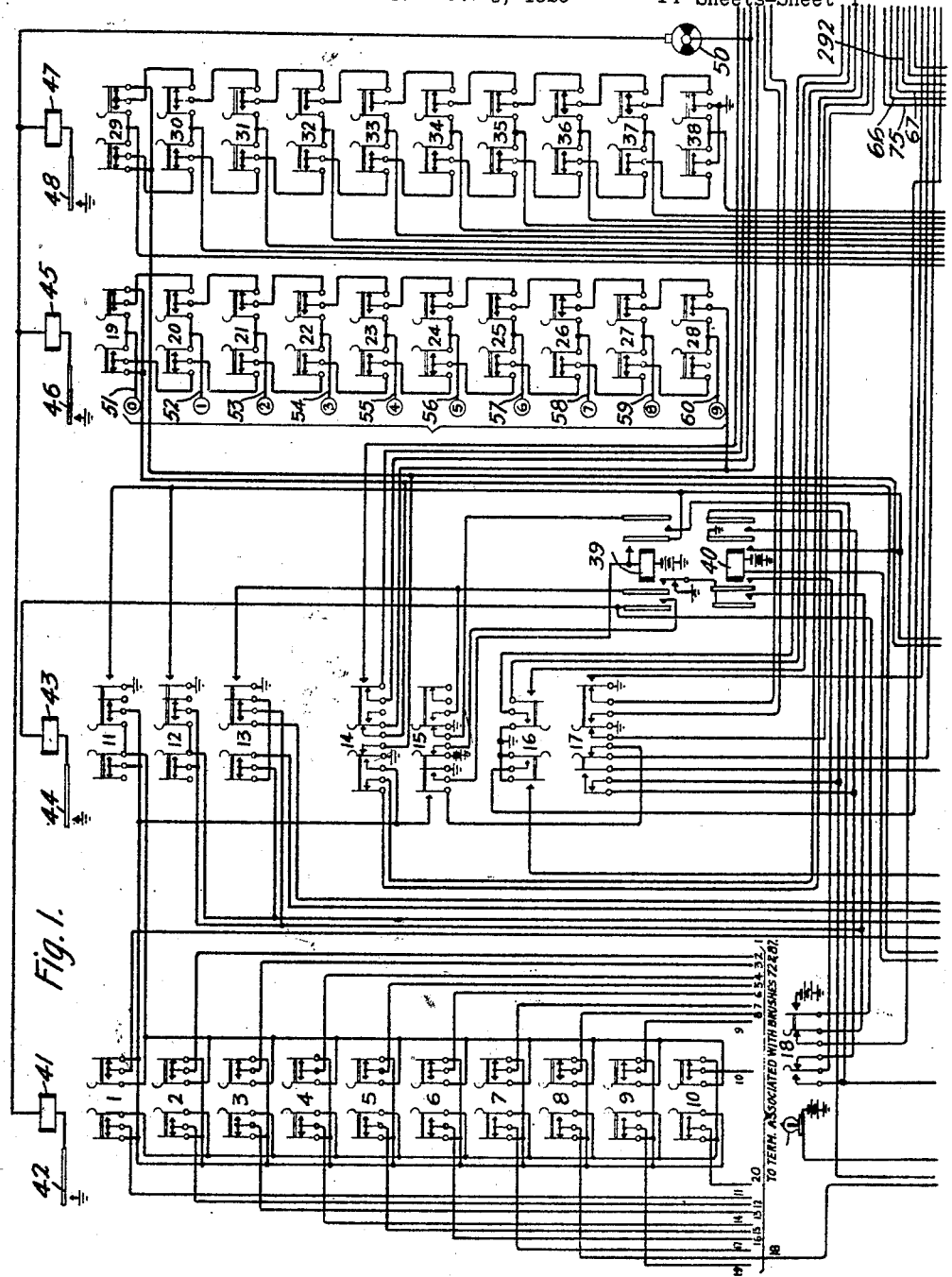

Keys 16 and 17 shown in Fig. 1 are the start keys. Key 15 is a key operated to restore the testing control circuit completely to normal. Keys 1 to 13 control register switches 70 and 85 for a particular test. Keys 19 to 28 and 29 to 38 further control the action of the testing control circuit during a particular test. Key 14 establishes miscellaneous circuits for particular test control. Keys 1 to 13 and 19 to 38, inclusive, are mechanically locked and electrically released. Keys 14 to 17, inclusive, are the ordinary type of locking key which are manually released. Key 18 is used to advance register switches 70 and 85 and is non-locking.

Figure 4:
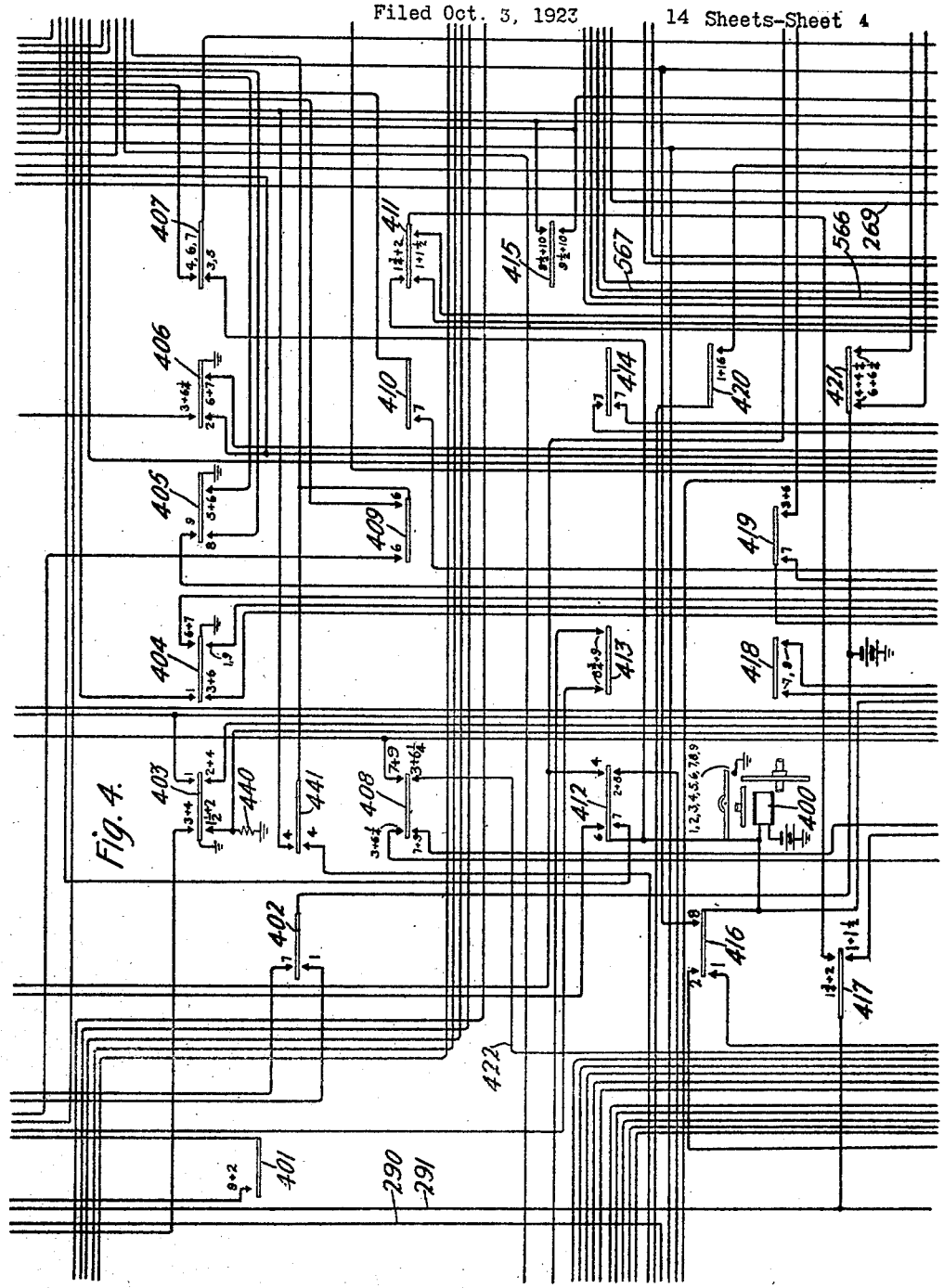
Figs. 4 and 5 illustrate apparatus and circuits to control the positioning of the test selector.
Figure 5:
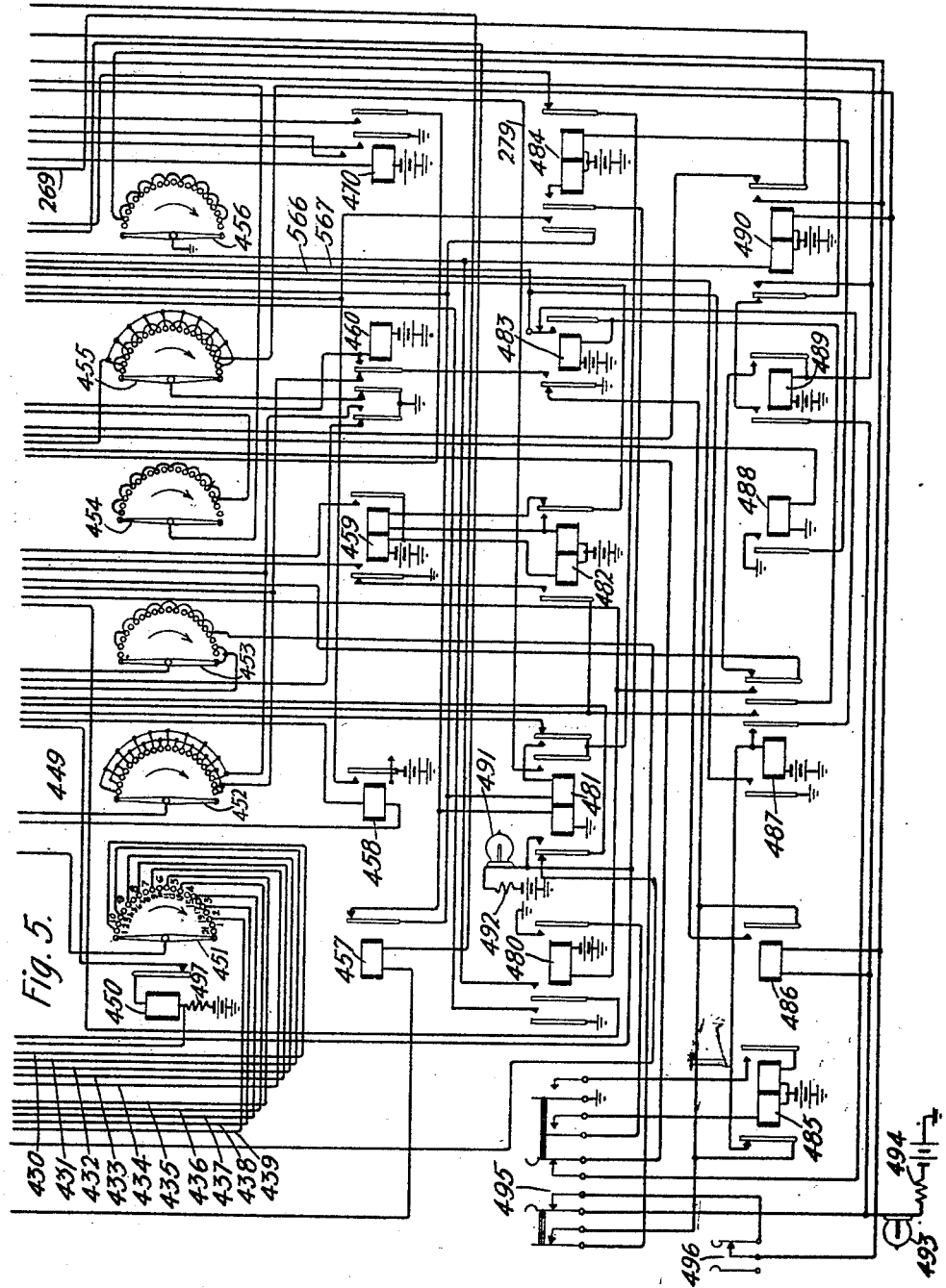
Figure 6:
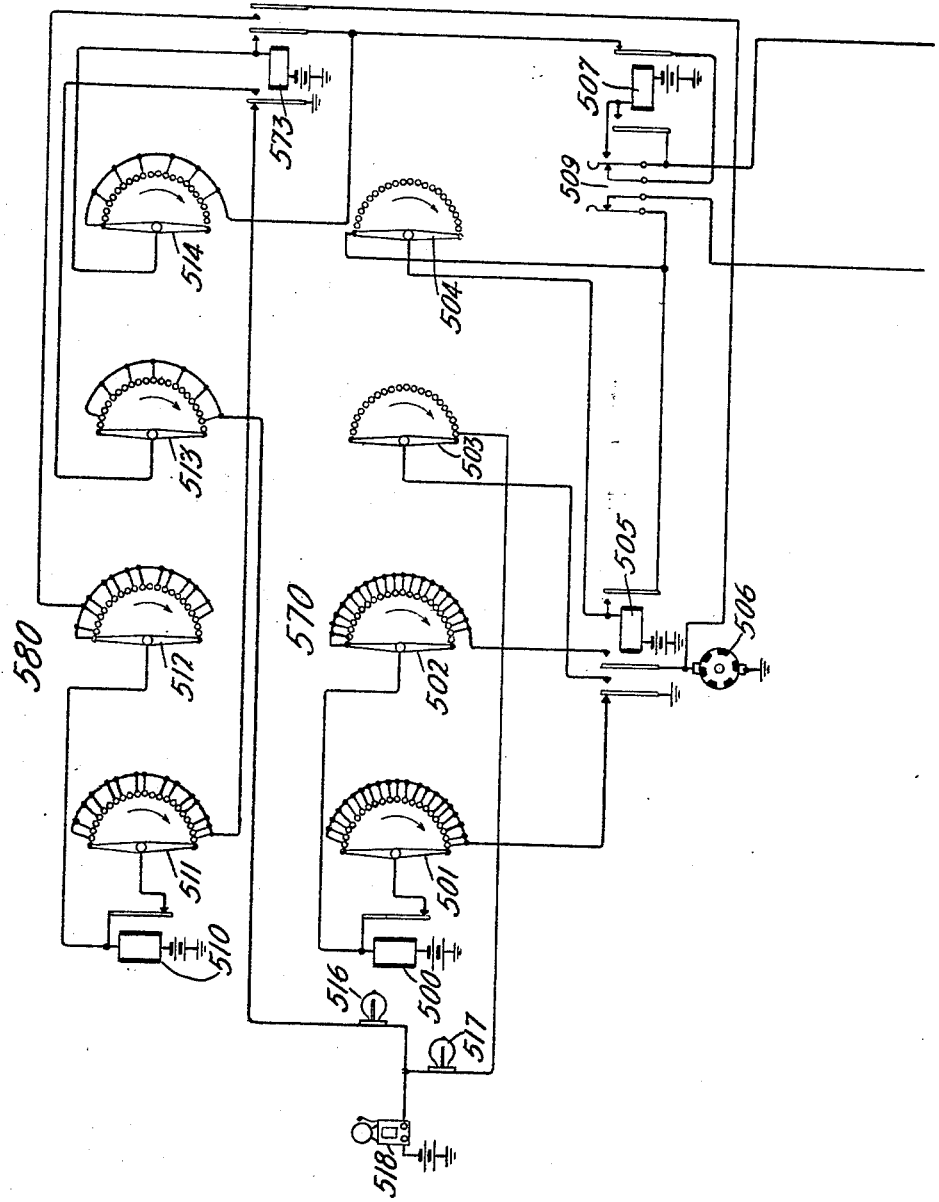
Fig. 6 illustrates a compound timing device operated in such manner that switch 570 is progressively positioned to count a predetermined period of time for the testing control circuit to seize a test selector switch and start the test of an incoming selector switch. Switch 580 is operated to time the period during which the incoming selector switch is under test.

Register switches 70 and 85 shown in Fig. 2, the selector control switch 449 shown in Fig. 5 and switches 570 and 580 of the timing device shown in Fig. 6 are of a well known step-by-step type. The switches shown in Figs. 3, 4, 7 and 15 are a well known type of sequence switch.

The incoming selector switch shown in Fig. 8, the final selector switch shown in Fig. 9, the district selector switch shown in Fig. 13 and the office selector switch shown in Fig. 14 are of the same character as the one shown and described in detail in Patent No. 1,123,696, issued January 5, 1915 to Edward B. Craft and John N. Reynolds. More specifically, these selector switches and their auxiliary circuits are detailed in detail in Patent No. 1,395,977, issued November 1, 1921 to Franklin A. Stearn and Frederick J. Scudder.

The selector switch shown in Figs. 11 and 12 is in general construction and operation of the same character as the one shown and described in detail in Patent No. 1,123,696 issued January 5, 1915 to Edward B. Craft and John N. Reynolds. More specifically, this selector switch and its auxiliary circuit is described in detail in Patent No. 1,461,528, issued July 10, 1923 to Frank S. Irvine.

*General description.*

The automatic routine test of the incoming selector switches is started by the actuation of keys 16 and 17. Some of the incoming selector switches to be tested are located in the same office as the testing control circuit and other incoming selector switches to be tested are located in a plurality of distant offices, outgoing from the office in which the testing control switch is located.

The actuation of keys 16 and 17 controls the movement of register switch 70 from its normal position to its first position. In position 1 of register switch 70, various circuits are established to position the switches 300, 449 and 400 of the testing control circuit and to associate a test selector switch Fig. 13 with the testing control circuit. Register brush 74 controls the brush selection of the test selector switch. Register brush 76 controls the group selection of the test selector switch. Register brush 78 controls the number of incoming selector switches tested during the time that register switch 70 is resting in a given position. Register 80 controls the resistance to be added to the trunk loop to compensate for low resistance trunk loops so that a maximum resistance is connected in the fundamental circuit during the time that the incoming selector switch is under test. Register 82 controls the movement of the connector switch and thus controls the selection of the test selector switch to be used during the test of certain incoming selector switches.

With register switch 70 in position 1, connector 300 is rotated from its normal position 1 to position 2 thus associating the test selector switch shown in Fig. 13 with the testing control circuit. The test selector switch is automatically tested by the testing control circuit to ascertain whether it is busy or idle. If it is idle, it is automatically removed from regular service. Upon seizure of the test selector switch, a relay is released in the testing control circuit to rotate the sequence switch shown in Fig. 4 in such manner as to further control connector 300. The connector is thus rotated to position 3 and in thus rotating establishes circuits to control further movement of the testing control circuit.

When the sequence switch, Fig. 4, has rotated to position 3, a circuit is established under the control of register brush 78 to position the selector control switch 449. The positioning of the selector control switch is for the purpose of pre-establishing the number of incoming selector switches to be tested while register switch 70 is resting in position 1.

The terminals 1307, 1308 and 1309 represent one set of terminals mounted in a horizontal row on the incoming selector switch frame. There are a large number of like sets of terminals on the incoming selector switch frame divided into what are known as panels. The panel of terminals is divided vertically into banks and the banks of terminals are divided vertically into groups. In one telephone system, the panel is subdivided into five banks and the bank is subdivided into ten groups. Above each group is a set of terminals known as overflow terminals. The purpose of the overflow terminals under ordinary service conditions is to arrest the upward movement of a selector switch elevator that has hunted over a complete group of terminals and found them busy.

The testing control circuit is designed to direct the test selector to the first terminal of a particular group of terminals that are connected to incoming selector switches. When the test of said first incoming selector switch is completed, the test selector is advanced to the second incoming selector switch, stepping forward one set of terminals under the control of the testing control circuit. In this manner the incoming selector switches connected to the terminals of one group are tested and the test selector steps from the last set of terminals in the group to the overflow terminal above the group. At this point of operation, certain apparatus in the testing control circuit is operated including switch 449. The test selector switch is stepped from the overflow terminals to the first terminal of the group above the group that has been tested. Each time that an overflow terminal is encountered, switch 449 steps two terminals. Therefore, if selector control switch 449 is initially arrested in its forward movement in position 9, six groups of incoming selector switches are tested before switch 449 is again returned to normal, since the switch 449 is provided with a contact bank comprising 22 terminal sets. Upon the restoration of switch 449, the test selector is restored to normal and register switch 70 is advanced one position to again direct the test selector to a second series of incoming selector switches to be tested. Selector control switch 449 is again positioned to control the number of groups of incoming selector switches tested during the period of time that register switch 70 is resting in position 2.

When an incoming selector switch is chosen for test, the testing control circuit first ascertains whether it is busy or idle.

If it is busy the testing control circuit will remain thus connected until it becomes idle. The incoming selector switch may be connected in service and the connection of the testing control device to the selector does not interfere with the service connection. A key is provided to be operated and released to step the testing control circuit off of an incoming selector switch that is permanently busy. Special provision is made in the testing control circuit to automatically pass busy incoming selector switches. A key is operated to add this feature to the automatically progressive test. If the incoming selector switch is idle, the apparatus shown in Fig. 7 is actuated to direct the incoming selector switch to a final selector switch. The apparatus of Fig. 7 also directs the final selector switch to select one of a plurality of auxiliary testing devices located on the final selector switch frame.

The auxiliary testing device selected, is actuated when the incoming selector switch is positioned, to connect ringing current to the line and thereupon automatically progresses through a series of tests upon the auxiliary circuits of the incoming selector switch. The test of the supervisory relay of the incoming selector switch is the last to be made and the operation and release of this relay establishes a circuit to operate the counting relays shown in Fig. 7. When a predetermined number of counting relays have been actuated including the counting relay FO, a circuit is established to actuate a train of relays shown in Fig. 5. Upon the actuation of said train of relays, the test selector is advanced to another incoming selector switch chosen for test.

In some offices it is necessary to use various types of test selector switches to reach all of the incoming selector switches to be tested. Three types of test selector switches are shown, a line finder district selector switch, a line switch district selector switch and an office selector switch. The line finder district selector switch and the line switch district selector switch are quite different in their circuit arrangement and therefore it is necessary to incorporate apparatus and circuits in the testing control circuit to differentiate between the different types of test selector switches upon connection to them. This, however, will be better understood from the detailed description.

The testing control device may be directed to any particular group of incoming selector switches by the manipulation of the keys shown in Fig. 1. Register switch 70, or register switch 85 may be chosen for rotation to a particular position. Also either connector 300 or connector 200 may be chosen for rotation to a particular test selector. The register switch and the connector switch, not chosen, remain in their normal positions. The actuation of one of keys 19 to 28 directs the test selector to any one of the ten groups. The number of groups tested is regulated by the operation of one of keys 29 to 38.

The timing circuit shown in Fig. 6 is actuated when start keys 16 and 17 are operated either to make an automatic routine test or a particular test. A predetermined time interval is allowed for the testing control circuit to advance in a progressive manner to seize a test selector, direct it to the incoming selector switch to be tested and seize said incoming selector switch. When this is accomplished a second timing device is started into operation to count off a predetermined time interval of sufficient duration to allow a progressive test of the incoming selector switch and its auxiliary circuits. Upon the operation of the second timing device, the first timing device is restored to normal and upon the completion of the incoming selector switch test, the second timing switch is restored to normal. During the time that the test selector is being advanced to the next incoming selector switch to be tested, the first timing device is again operated. In this manner all operations of the testing system are covered by a timing device that will sound an alarm at any time that an operation is not completed within a predetermined time interval.

When an unstandard condition has been encountered by the testing device, the alarm is sounded to attract the attention of a maintenance man to the circuit in trouble. The maintenance man records the unstandard condition and ascertains its origin if possible. The testing control device is arranged so that the test may be repeated any number of times if the incoming selector switch is found in an unstandard condition. When an unstandard condition is encountered that cannot be easily remedied, a record of the unstandard condition is made by the maintenance man and the testing control circuit manipulated by key 575 shown in Fig. 7, to advance to the next incoming selector switch in the sequence of test.

Having now described in a general way, the apparatus employed in conducting tests and the manner in which it is to be used, it is thought that the invention will be better understood by a consideration of the specific manner in which it functions.

DETAILED DESCRIPTION.

*Automatic routine test of incoming selector switches.*

Assuming that the test of the incoming selector switches of the office is to be made on an automatic routine basis, keys 16 and 17 are actuated by the test-man. A circuit is thus established for operating start relay 470 which may be traced from grounded battery through the winding of relay 470, right lower and upper contacts of sequence switch spring 221, left lower and upper contacts of sequence switch spring 327 to ground through left inner contacts of key 16. The operation of start relay 470 establishes a circuit for energizing relay 62. This circuit may be traced from grounded battery through the winding and contact of register magnet 71, left outer normal contact and armature of relay 61, winding of relay 62, contact of sequence switch spring 420 to ground through inner contacts and armature of relay 470. The resistance of the winding of relay 62 is comparatively high and therefore register magnet 71 is not energized at this time. The operation of relay 62 establishes an obvious circuit for operating relay 63. The operation of relay 63 establishes a locking circuit for itself which may be traced from grounded battery through its winding and right inner contact and armature to ground through the left outer contacts of key 16. Relay 63 completes a circuit from ground, through its left armature and contact winding of relay 40, to grounded battery. Relay 40 is energized in this circuit. The enerization of relay 63 also establishes a circuit to energize register magnet 71. This circuit may be traced from grounded battery through the winding and contacts of register magnet 71, left normal contact and armature of relay 61, register brush 72 and its associated contacts left outer and right middle contacts of key 13, left outer contact and armature of relay 40 to ground through left inner normal contacts of relay 39. The register switch 70 is thus rotated from its normal position to position 1.

With the register switch 70 in position 1, various circuits are established as hereinafter described in sequence. A circuit is established to energize the control magnet 301 of connector 300. This circuit may be traced from grounded battery through the winding of magnet 301, left lower contact of sequence switch spring 323, right upper and left lower contacts of sequence switch spring 225, conductor 75 of Figs. 3, 1 and 2 contact of terminal strip 77, register brush 82 and its associated contact, left outer contacts of key 17, left normal contacts of key 18, left inner contact and armature of relay 40 to ground through left inner contacts of relay 39. Connector 300 is thus rotated from position 1 to position 2 and is now positioned in such manner that the control leads are cut through from the testing control circuit to Fig. 13 so that the district selector switch shown in Fig. 13 may be tested and if found in a non-busy condition it is seized for use under the control of the testing circuit.

During the time that connector 300 is progressing, from position 1 to position 2, a circuit is established for operating relay 326 in multiple with the winding of magnet 301. This may be traced from the ground for energizing magnet 301 through the winding of relay 326 to grounded battery through the right upper contact of sequence switch spring 320. The operation of relay 326 establishes a circuit for operating relay 325 which may be traced from grounded battery through the winding of relay 325, lower contacts of sequence switch spring 318 to ground through left middle contact and armature of relay 326. A locking circuit is established for relay 325 from grounded battery through its winding and left contact and armature, left lower contact of sequence switch spring 324, right upper and left lower contacts of sequence switch spring 225, conductor 75 of Figs. 3, 1 and 2 and thence to ground at the left inner contacts of relay 39 as previously traced. Connector 300 upon reaching position 2 opens the circuit established for energizing relay 326 causing its release. The operation of relay 325 in the manner described is to insure the proper relation between the register switch and the connector switch preceding the test of the district selector, Fig. 13.

The operation of relay 325 establishes an energizing circuit for relay 458. This circuit may be traced from grounded battery through the armature and contact of relay 62, right contact and armature of relay 325, left outer normal contact and armature of relay 326, lower contact of sequence switch spring 417, winding of relay 458 to ground through resistance 440. The operation of relay 458 establishes an energizing circuit for relay 481. This circuit may be traced from grounded battery through the armature and contact of relay 458, lower contacts of sequence switch spring 411, left winding of relay 481 to ground. The operation of relay 481 establishes a circuit for energizing sequence switch magnet 400. This circuit may be traced from grounded battery through the winding of magnet 400, contact of sequence switch spring 416, left contact and armature of relay 481, to ground through right inner contacts of key 16. The energization of magnet 400 causes the movement of the sequence switch from position 1 to position 2. It will be noted that relay 458 is a slow operating relay. This, however, is not of any value when the district selector, Fig. 13, is used as a test selector switch but it is of value when the line finder selector switch, Figs. 11 and 12, is used as a test selector. This feature will be described later.

The testing control device has now positioned its apparatus to test the district selector to ascertain whether it is in a busy or non-busy condition. A busy district selector is characterized by a ground connected to conductor 339 from a line switch in a manner well known in the art. Therefore, if the testing control device encounters a busy district selector in its selection of a test selector, a circuit is established to maintain relay 481 in an operated position. This circuit may be traced from ground, at the line switch, over conductor 339, Fig. 13, conductor 339, Fig. 3, right upper contact of sequence switch spring 313, conductor 280, right normal contact and armature of relay 484, right outer armature and contact of relay 481, right winding of relay 481, upper contact of sequence switch spring 411, upper contact of sequence switch spring 417, left outer normal contact and armature of relay 326, armature and contact of relay 325, to battery through contact and armature of relay 62. The testing control device will remain positioned as described until the ground is removed by the line switch indicating that the district selector, Fig. 13, is no longer busy.

Assuming that the district selector, Fig. 13, is in a non-busy condition either when first tested or after relay 481 has been held in an operated position by a busy district selector and the busy condition on said district selector has been removed, relay 481 does not have a holding circuit and releases. The release of relay 481 establishes a circuit for actuating sequence switch magnet 400 which may be traced from grounded battery through the winding of magnet 400, left upper contact of sequence switch spring 416, left normal contact and armature of relay 481, to ground through right inner contacts of key 16. The sequence switch is thus rotated from position 2 to position 3 where a circuit is established for rotating connector 300 from position 2 to position 3. This circuit may be traced from grounded battery to the winding of magnet 301, contact of sequence switch spring 322 to ground through left upper contact of sequence switch spring 403. Connector 300 is thus rotated from position 2 to position 3.

It will be noted that upon the release of relay 481 a ground is connected to conductor 339 of the district selector to maintain it in a busy condition so that it cannot be seized by a line switch for a service connection. This circuit may be traced from ground through the right lower contact of sequence switch spring 403, right outer contact and armature of relay 481, right normal contact and armature of relay 484, right upper contact of sequence switch spring 313, conductor 339 of Figs. 3 and 13 to the terminal of the line switch. As connector 300 rotates from position 2 to position 3 the busy ground connected to the district through the contacts of relay 481 is replaced by a ground connected to the contacts of relay 326. This circuit may be traced from ground through the left innermost normal contact and armature of relay 326, right upper and left lower contacts of sequence switch spring 315, conductor 339 of Figs. 3 and 13, to the terminal of the line switch.

The ground for holding the district selector busy is connected in the manner described to maintain it busy as long as connector 300 remains in position 3. The sequence switch in Fig. 4 may be rotated a number of times, as will be described later, during the time that connector 300 is in position 3.

In position 3 of the sequence switch Fig. 4, a circuit is established for actuating magnet 450 of the selector control switch 449. This circuit may be traced from grounded battery through the resistance 497, winding and contacts of selector control magnet 450, right outer contacts of key 16, upper contacts of sequence switch spring 406 to ground. The selector control switch is thus rotated until the brush 451 arrives at a terminal to which a shunt ground is connected. The shunt ground for stopping the rotation of selector control switch 449 may be traced from ground through the left inner normal contacts of key 14, register brush 78 and associated terminal 1, terminal strip 79 from which it is cross-connected to terminal strip 81 and thence over conductor 431 to the third terminal of the selector control switch. When brush 451 makes contact with conductor 431, a circuit is established to shunt the winding of magnet 450 to arrest the rotary movement of the switch. This circuit may be traced from the ground connected to conductor 431, through brush 451, upper contacts of sequence switch spring 408, conductor 422, resistance 497 to grounded battery. Resistance coil 497 is sufficiently low in ohmic resistance to shunt sufficient current from the path traced for operating switch magnet 450 to arrest its operation and the switch will remain thus positioned until register switch 70 again changes its position, as will be hereinafter described.

As will be remembered from the general description, selector control switch 449 is positioned in the manner described to control the test selector, Fig. 13, with regard to the number of groups of incoming selectors that are tested when register switch 70 is in one of its selective positions. In this manner, when brush 451 is connected to conductor 431 nine groups of incoming selector switches are tested with register switch No. 70 in position 1. If brush 451 had been arrested in its forward movement when connected to conductor 432, eight groups of incoming selector switches are tested and if connected to conductor 433, seven groups; 434, six groups, etc. This will, however, be better understood from the following detailed description.

In position 3 of the sequence switch Fig. 4, a circuit is established for operating relay 480. This circuit may be traced from grounded battery through the winding of relay 480 to ground through the left lower contact of sequence switch spring 404. Relay 480 in attracting its left inner armature establishes a circuit for energizing sequence switch magnet 400. This circuit may be traced from grounded battery through the winding of magnet 400, lower contact of sequence switch spring 407, left inner contact and armature of relay 480, right lower contact of sequence switch spring 419 to ground through normal contact and armature of counting relay 0'. The sequence switch is thus rotated from position 3 to position 4.

Relay 480 in attracting its right outer armature establishes a circuit for energizing relay 490. This path may be traced from grounded battery through the left winding of relay 490 to ground through left outer contact and armature of relay 480. The operation of relay 490, establishes a circuit for energizing the winding of relay 489. This circuit may be traced from grounded battery through the winding of relay 489, left contact and armature of relay 490, brush 455 and its associated contact to ground through left middle contact and armature of relay 460. The remaining contacts of relay 490 are not effective at this time. It, however, remains in an operated position over the path previously traced until sequence switch 400 moves out of position 6.

It will be remembered that the test selector, Fig. 13, has been tested and found to be idle, also that connector 300 in position 3 connects the control leads from the test selector Fig. 13, to the testing control circuit over conductors 269 to 280, inclusive. Therefore, with sequence switch Fig. 4 in position 4, circuits are established to control the test selector for making brush selection. It will be noted that in position 1 of register brush 74 a circuit is established for the first counting relay. This is a part of the fundamental circuit for controlling the upward movement of the test selector, Fig. 13. This fundamental circuit may be traced from grounded battery through the left lower contact of sequence switch spring 421, winding of 0 counting relay, conductor 51, Figs. 7 and 2 through terminal strip 84 which is cross-connected to terminal strip 87, register brush 74 and its associated contact, lower and upper contacts of sequence switch spring 441, conductor 278, lower contact of sequence switch spring 302, conductor 331 of Figs. 3 and 13 terminating at commutator 1314. The updrive magnet 1302 is also energized in position 4 of the sequence switch Fig. 4. This circuit may be traced from grounded battery through updrive magnet 1302, conductor 349 of Fig. 13, conductor 349 of Fig. 3, left upper contact of sequence switch spring 305, conductor 375, upper contact of sequence switch spring 407, left inner contact and armature of relay 480, right lower contact of sequence switch spring 419 to ground through normal contact and armature of counting relay 0'. The test selector switch elevator is now driven upward establishing a circuit for operating the counting relays over the circuit previously traced by connecting brush 1311 intermittently to the conducting portions of commutator 1314. This circuit may be traced from ground through the lower contacts of sequence switch spring 1317, brush 1311, conducting portions of commutator segment 1314, and thence over the fundamental circuit previously traced through the winding of counting relay 0 to grounded battery connected to sequence switch spring 421. Counting relay 0 is thus operated upon the engagement of brush 1311 with the conducting portion of commutator segment 1314. The operation of counting relay 0 establishes a locking circuit for itself and an operating circuit for counting relay 0' effective when brush 1311 is disengaged from said conducting portion of commutator segment 1314. Brush 1311 while engaged with the conducting portion of commutator segment 1314 establishes a shunt circuit for the counting relay 0' as is well known in the art. The circuit for operating counting relay 0' may be traced from grounded battery through the left lower contact of sequence switch spring 421, winding of counting relay 0, winding of counting relay 0' to ground through the contact and armature of counting relay 0. Counting relay 0', in attracting its armature, opens the circuit established for energizing updrive magnet 1302, and the test selector switch is thus arrested in its upward movement. Counting relay 0' in operating also establishes a circuit for energizing the magnet of sequence switch 400. This circuit may be traced from grounded battery through the winding of magnet 400, right upper contact of sequence switch spring 412 to ground through contact and armature of counting relay 0'. The sequence switch is rotated from position 4 to position 5 and in its rotating opens the locking circuit for counting relays 0 and 0' causing their release.

The release of counting relay 0' establishes a circuit for energizing the magnet of sequence switch 400 which circuit may be traced from grounded battery through the winding of magnet 400, lower contact of sequence switch spring 407, left inner contact and armature of relay 480, right lower contact of sequence switch spring 419 to ground through normal contact and armature of counting relay 0'. The sequence switch 400 is thus rotated from position 5 to position 6.

In positions 5 and 6 of sequence switch 400 a circuit is established for trip magnet 1303 of the test selector, Fig. 13. This circuit may be traced from grounded battery through the winding of magnet 1303, conductor 352 of Figs. 13 and 3, left upper contact of sequence switch spring 306 conductor 274 to ground through the right lower contact of sequence switch spring 405. The energization of the trip magnet causes the tripping of brushes 1304, 1305 and 1306, upon a subsequent upward movement of the district selector switch, to bring said brushes into engagement with the bank terminals in the well known manner.

Sequence switch 400 in position 6, establishes circuits for test selector switch group selection. A circuit is again established for energizing the updrive magnet 1302 as previously traced, and the fundamental circuit is again established for operating the counting relays upon the upward movement of the selector switch elevator. This fundamental circuit may be traced from ground through the lower contact of sequence switch spring 1317, brush 1312, conducting portion of commutator 1315, conductor 337, Figs. 13 and 3, left upper contact of sequence switch spring 303, conductor 277, upper contacts of sequence switch spring 409, right inner normal contacts of key 14, register brush 76 and its associated contact, terminal strip 90, cross-connection through strip 92, conductor 51 of Figs. 2 and 7, counting relay 0, left lower contact of sequence switch spring 421 to grounded battery. The counting relay 0 in operating establishes a locking circuit for itself and an operating circuit for counting relay 0' which is effective upon further upward movement of the test selector switch and the disengagement of brush 1312 from the conducting portion of commutator segment 1315, as described, for brush selection. The operation of counting relay 0' opens the circuit established for energizing the updrive magnet 1302, thus arresting the upward movement of the test selector switch elevator. The operation of counting relay 0' further establishes a circuit for energizing the magnet of sequence switch 400 which may be traced through the winding of magnet 400, left upper contact of sequence switch spring 412, left outer contacts of key 14 to ground through the contact and armature of counting relay 0'. Sequence switch 400 is now rotated from position 6 to position 7 where it will remain during the test of the incoming selector switches of groups 0 to 8, in bank 0, which has been selected as described.

Brushes 1304, 1305 and 1306 of the test selector switch are now engaged with terminals 1307, 1308 and 1309 which, it is assumed, represents the trunk connection of the first incoming selector switch of the first group of a bank of incoming selector switch to be tested. As will be hereinafter described, the testing circuit may be directed by manipulation of the cross-connections from terminal strip 84 to terminal strip 87 and terminal strip 90 to terminal strip 92 to the first terminals of any group in any bank.

Upon the rotation of sequence switch 400 from position 6 to position 7, it will be noted that the actuating circuit for relay 480 is opened. The release of relay 480 opens the circuit of the left winding of relay 490 and relay 490 will release or remain actuated depending upon whether the incoming selector switch to be tested is idle or busy. A busy incoming selector switch is characterized by ground connected to the lower and upper contacts of sequence switch spring 707 to terminal 1307 and the circuit for maintaining relay 490 in an actuated position may be traced from this ground through brush 1304, conductor 367 of Fig. 13, conductor 367, Fig. 3, conductor 269, Fig. 3, conductor 269, Fig. 7, right armature and contact of relay 490, left inner contacts of key 495, contacts of key 496, right winding of relay 490 to battery. In this manner, when a busy incoming selector is encountered, relay 490 is held in an operated position to prevent the seizure of said incoming selector switch by the testing circuit. When the incoming selector switch, Fig. 8, is released from its busy condition, ground is removed from terminal 1307 and relay 490 releases. It also releases upon the original test when the incoming selector switch, Fig. 8, is idle.

Assuming that the incoming selector switch, Fig. 8, is idle and that relay 490 is released, the actuating circuit for relay 489 is opened. A locking circuit for relay 489 was, however, established upon the rotation of sequence switch 400 into position 7. This locking circuit may be traced from grounded battery through the winding, right armature and contact of relay 489, right, outer, normal contact and armature of relay 487 to ground through right upper contact of sequence switch spring 404. The release of relay 490 also establishes a circuit for maintaining the incoming selector switch, Fig. 8 busy, so that it will not be seized by another selector switch during the period of time that it is under test. The circuit for maintaining it busy may be traced from ground through the right lower contact of sequence switch spring 406, right normal contact and armature of relay 490, conductor 269 of Figs. 5, 4, 7 and 3, left upper contact of sequence switch spring 311, conductor 367 of Fig. 3, conductor 367 of Fig. 13, brush 1304 and terminal 1307. The release of relay 490 further establishes a circuit for operating relay 545, shown in Fig. 7. This circuit may be traced from grounded battery through the winding of relay 545, right inner contacts of key 495, left armature and contact of relay 489, left normal contact and armature of relay 490, brush 455 and its associated contact to ground through the left middle contact and armature of relay 460.

Relay 545 in attracting its left outer armature establishes a circuit for energizing sequence switch magnet 520. This circuit may be traced from grounded battery through the winding of magnet 520, right upper contact of sequence switch spring 534 to ground through the left outer armature and contact of relay 545, thus rotating the sequence switch 520 from position 1 to position 2. Relay 545 in attracting its left and right inner armatures extends the fundamental circuit for controlling the incoming selector switch, Fig. 8. This fundamental circuit is effective in position 2 of sequence switch 520.

It will be noted that counting relays 1 to 9 and 1' to 9' are associated with counting relays 0 and 0' with sequence switch 520 in position 1. They are thus associated so that any number of counting relays may be used in the control of brush and group selections of the test selector, Fig. 13. Upon the rotation of sequence switch 520 from position 1 to position 2, counting relays 0 and 0' are disassociated from counting relays 1 to 9 and 1' to 9' and a different combination of counting relays is used by associating counting relays SO, SO' and FO with the counting relays 1 to 9 and 1' to 9'. It is done in this manner on account of the variance in the control circuits connected to the armature and contacts of the 0' relay, from those connected to the contact and armature of the SO' and FO counting relays. The reason for the transfer is to prevent duplication of counting relays 1 to 0 from 1' to 9'. It will be noted that in the fundamental circuit for controlling the test selector no stepping relay is used, and that the movement of the test selector is directly under control of the counting relays as hereinbefore described. It will be noted that a stepping relay is used in the control of the incoming selector under test.

Figure 3:
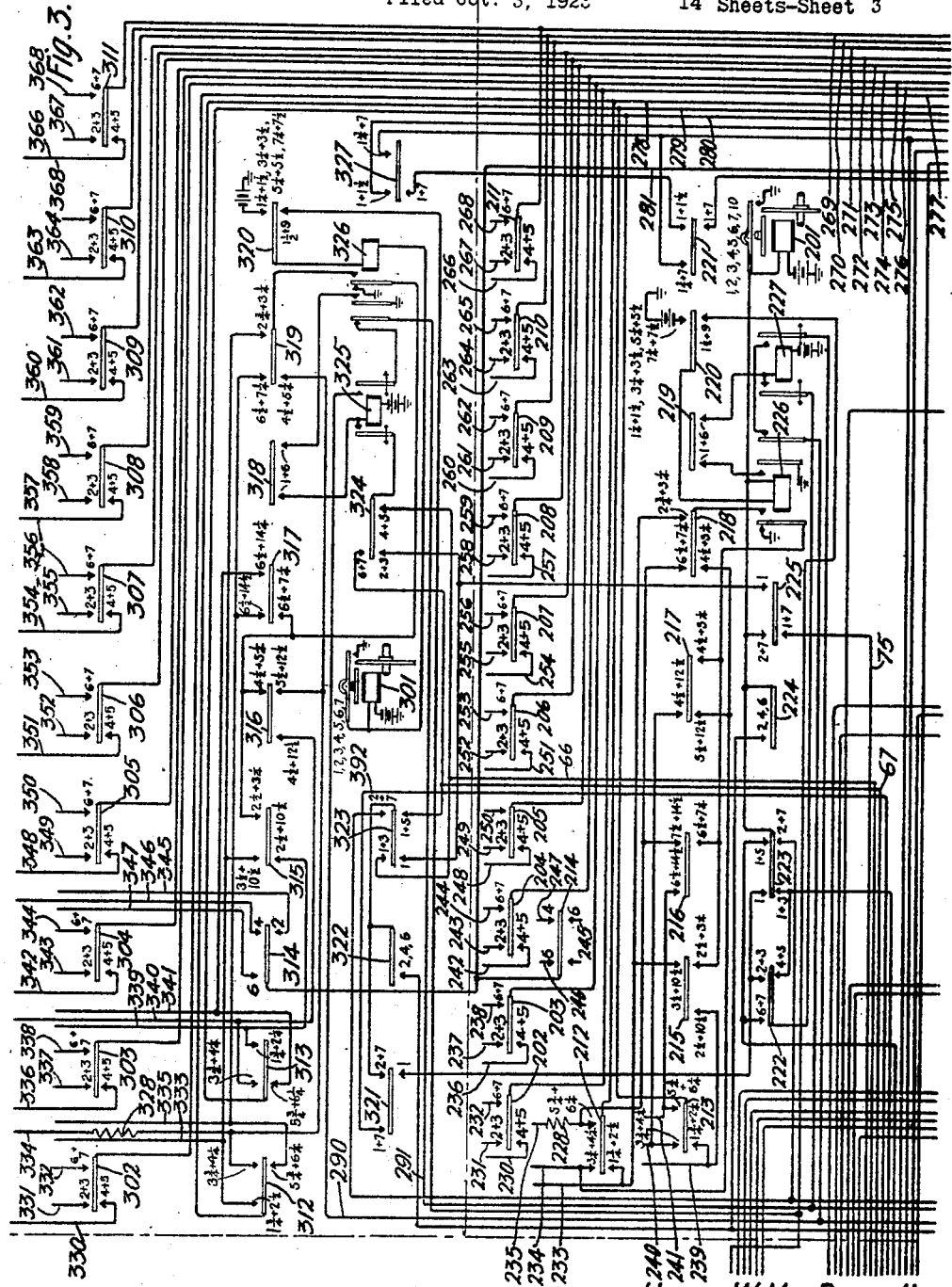
Fig. 3 shows connector 200 and connector 300. These connectors are of the sequence switch type and are controlled in such manner that particular selector switches are removed from service and associated with the testing control circuit.

The fundamental circuit for controlling the incoming selector switch, Fig. 8 may be traced from grounded battery through the right winding of relay 721, Fig. 8, upper contacts of sequence switch spring 702, resistance 724, upper contact of sequence switch spring 703, terminal 1309, brush 1306, conductor 361 of Fig. 13, conductor 361 of Fig. 3, left upper contact of sequence switch spring 309, conductor 271, right inner contact and armature of relay 545, left normal contact and armature of relay 546, left upper contact of sequence switch spring 532, winding of relay 543, left lower contact of sequence switch spring 533, normal contact and armature of counting relay SO', winding of stepping relay 542, brush and associated contact of register switch 80, terminal 94, cross-connection from terminal strip 94 to terminal strip 96, compensating resistances 549 and 548, right upper contact of sequence switch spring 536, left inner contact and armature of relay 545, conductor 270, left upper contact of sequence switch spring 310, conductor 364, Fig. 3, conductor 364, Fig. 13, brush 1305, terminal 1308, lower contact of sequence switch spring 704, resistance 725 to ground through lower contact of sequence switch spring 705. Upon establishment of this fundamental circuit, relay 721 of Fig. 8 and relay 542 of Fig. 7 are operated. Relay 543 does not operate at this time since it is polarized in the opposite direction to the current flow.

The incoming selector switch is now directed to the final selector switch and the final selector switch is directed to a test line connected to certain terminals on the final frame in place of lines ordinarily connected to these terminals. This test line may be connected to any terminals of the final frame. There are a plurality of the above mentioned test lines in a group so that if one is busy from use by another test circuit, an idle one may be selected by the final selector switch. The final selector switch is caused to hunt an idle test line in the same manner in which a group of private branch exchange lines is normally tested. Conductors 560 to 565 are connected to contacts of sequence switch springs 521, 522 and 523, and are also connected to certain ones of the counting relays. The counting relays to which they are connected depend upon the location of the test lines on the final frame. This, of course, is flexible and may be changed upon a change in location of the test line. The counting relays to which conductors 560 to 565 are connected will automatically direct the incoming and final selector switches to the test line connected in place of line 9992 on the final frame. This assumes that a group of the above mentioned test lines are connected in place of lines 9992, 3, 4, etc.

The operation of relay 721, as described, upon the establishment of the fundamental establishes a circuit for energizing sequence switch magnet 700. This circuit may be traced from grounded battery through the winding of magnet 700, lower contact of sequence switch spring 706, left outer contact and armature of relay 721 to ground through lower contact of sequence switch spring 707. The energization of magnet 700 rotates the sequence switch from position 1 to position 2. During the movement of sequence switch 700 from position 1 to position 2, a locking circuit is established for relay 721. This locking circuit may be traced from grounded battery through the right winding of relay 721, right upper and lower contacts of sequence switch spring 702, right contact and armature of relay 721, left upper and lower contacts of sequence switch spring 708, resistance 724, upper contact of sequence switch spring 703 and thence over the fundamental circuit to ground through the lower contact of sequence switch spring 705.

In position 2 of sequence switch 700, a circuit is established for energizing the updrive magnet 730. This circuit may be traced from grounded battery through the winding of updrive magnet 730, right upper contact of sequence switch spring 709, left outer contact and armature of relay 721 to ground through lower contact of sequence switch spring 707. The incoming selector switch is now driven in an upward movement and brush 736 intermittently engages the conducting and non-conducting portions of commutator 734.

The energization of stepping relay 542 upon the establishment of the fundamental circuit establishes a circuit for energizing counting relay 4. This may be traced from grounded battery, through left lower contact of sequence switch spring 531, right lower contact of sequence switch spring 538, winding of counting relay 4, normal contact and armature of counting relay 4', conductor 55, conductor 565, left upper and lower contacts of sequence switch spring 521, left upper contact of sequence switch spring 526, contact and armature of stepping relay 542 to ground through upper contact of sequence switch spring 525. Upon the initial engagement of brush 736 with a conducting portion of commutator 734, a shunt is established for releasing stepping relay 542. This shunt may be traced from ground through the lower contact of sequence switch spring 710, shown in Fig. 8, brush 736, conducting portion of commutator 734, lower contacts of sequence switch spring 708, where a junction point is established with the fundamental circuit. This ground connected to the fundamental circuit establishes an additional holding circuit for relay 721 and a shunt circuit for stepping relay 542 causing its release.

The operation of counting relay 4 as previously described, establishes a locking circuit for itself and an operating circuit for counting relay 4' which is effective upon the initial release of stepping relay 542. The circuit for operating counting relay 4' may be traced from grounded battery through the left lower contact of sequence switch spring 531, right lower contact of sequence switch spring 538, winding of counting relay 4, winding of counting relay 4', contact and armature of counting relay 4 to ground. The operation of counting relay 4' establishes a circuit for operating counting relay 3 upon a subsequent operation of stepping relay 542, when brush 736 is brought into engagement with a non-conducting portion of commutator 734. Upon a further upward movement of the incoming selector switch elevator, counting relays 3, 3', 2, 2', 1, 1', SO, SO' and FO are operated in the well known manner.

The operation of the SO' counting relay opens the fundamental circuit to release relay 721 when brush 736 is moved upward to a non-conducting portion of commutator 734, next above the conducting portion of this commutator that shunted the stepping relay 542 to operate the counting relay SO'. The release of relay 721 opens the energizing circuit for updrive magnet 730 to arrest the upward movement of the incoming selector switch elevator. The release of relay 721 also establishes a circuit for energizing sequence switch magnet 700. This may be traced from grounded battery through the winding of magnet 700, left upper contact of sequence switch spring 706 to ground through the left inner armature and contact of relay 721. Sequence switch 700 is thus rotated from position 2 to position 3.

The operation of counting relay FO establishes a circuit for energizing sequence switch magnet 520. This circuit may be traced from grounded battery through the winding of magnet 520, right lower contact of sequence switch spring 535 to ground through the contact and armature of counting relay FO. Sequence switch 520 is rotated from position 2 to position 3 and in thus rotating opens the locking circuit for the counting relays, causing their release.

The rotation of sequence switch 520 into position 3 and the release of the counting relays establishes an energizing circuit for sequence switch magnet 520. This may be traced from grounded battery through the winding of magnet 520, left lower contact of sequence switch spring 535 to ground through normal contact and armature of counting relay FO. The sequence switch is rotated from position 3 to position 4 and the fundamental circuit is again established as previously traced to cause incoming selector group selection.

Relays 721 and 542 are again operated upon the establishment of the fundamental circuit. The operation of relay 721 establishes a circuit for energizing the sequence switch magnet 700. This circuit may be traced from grounded battery through the winding of magnet 700, lower contact of sequence switch spring 706, left outer contact and armature of relay 721 to ground through lower contact of sequence switch spring 707. The sequence switch is rotated from position 3 to position 4 and in thus rotating establishes a locking circuit for relay 721. This locking circuit is the same as previously traced. In sequence switch position 4 a circuit is established for updrive magnet 730 which may be traced from grounded battery through the winding of updrive magnet 730, right upper contact of sequence switch spring 709, left outer contact and armature of relay 721 to ground at the lower contact of sequence switch spring 707. The incoming selector switch elevator is now driven in an upward movement and brush 741 is intermittently engaged with the conducting and non-conducting portions of commutator segment 740.

In positions 3 and 4 of sequence switch 700 an obvious circuit is established for energizing trip magnet 738. The energizing of trip magnet 738 causes the tripping spindle to rotate to a position for tripping brushes 742, 748 and 746 upon the subsequent upward movement of the elevator. The tripping of the brushes causes them to be brought into engagement with the bank terminals in the well known manner of such operation.

The operation of stepping relay 542 upon the initial establishment of the fundamental circuit establishes a circuit to operate counting relay 3. This circuit may be traced from grounded battery through the right lower contact of sequence switch spring 531, winding of counting relay 3, normal contact and armature of counting relay 3', conductor 54, conductor 564, right lower and left upper contacts of sequence switch spring 521, left upper contact of sequence switch spring 526, contact and armature of relay 542 to ground through upper contact of sequence switch spring 525. The operation of counting relay 3 establishes a locking circuit for itself and an operating circuit for counting relay 3' which is effective upon the engagement of brush 741 with a conducting portion of commutator segment 740. The engagement of this brush and commutator establishes a shunt to release stepping relay 542. This shunt path may be traced from ground through the lower contact of sequence switch spring 710, brush 741, commutator 740, right upper and left lower contacts of sequence switch spring 708 to a junction point with the fundamental circuit. Counting relay 3, 3', 2, 2', 1, 1', SO, SO' and FO will be operated as brush 741 intermittently engages with the conducting and non-conducting portions of commutator segment 740.

The operation of counting relay SO' opens the fundamental circuit to cause the release of relay 721 upon the upward movement of brush 741 to a non-conducting portion of commutator segment 740. The release of relay 721 opens the energizing circuit for updrive magnet 730 thus arresting the upward movement of the incoming selector switch elevator. Relay 721 also establishes an energizing circuit for sequence switch magnet 700. This circuit may be traced from grounded battery through the winding of magnet 700, left upper contact of sequence switch spring 706 to ground through the left inner contact and armature of relay 721. Sequence switch 700 is now rotated from position 4 to position 5.

The operation of counting relay FO establishes a circuit for energizing sequence switch magnet 520 which may be traced from grounded battery through the winding of magnet 520, right lower contact of sequence switch spring 535 to ground through the contact and armature of counting relay FO. Sequence switch 520 is rotated from position 4 to position 5 and in thus rotating opens the holding circuit for the counting relays causing their release. A circuit is again established for energizing sequence switch 520 which may be traced from grounded battery through the winding of magnet 520, left lower contact of sequence switch spring 535 to ground through normal contact and armature of counting relay FO. The sequence switch is now rotated from position 5 to position 6.

It will be remembered that the incoming selector sequence switch is in position 5. In this position of the sequence switch a circuit is established for operating relay 721 which may be traced from grounded battery through the left winding of relay 721 to ground through the right upper and lower contacts of sequence switch spring 711. The operation of relay 721 establishes an energizing circuit for sequence switch magnet 700. This may be traced from grounded battery through the winding of magnet 700, lower contact of sequence switch spring 706, left outer contact and armature of relay 721 to ground through the lower contact of sequence switch spring 707. The sequence switch is thus rotated from position 5 to position 6.

In position 6 the incoming selector switch is seeking an idle trunk associated with a final selector switch. A busy final selector switch is characterized by ground impressed on terminal 750. Assuming that an idle final selector switch has been immediately encountered, relay 721 is released. Since the trunk hunting feature of this selector switch is described in detail in the previously referred to Patent 1,395,977 it will be omitted from this description.

The release of relay 721 connects a busy ground to terminal 750 to prevent other incoming selector switches from stopping on the same terminal connected to the final selector switch in use for this test. This circuit may be traced from ground through the right upper contact of sequence switch spring 718, right normal contact and armature relay 721, right upper and lower contacts of sequence switch spring 712, brush 742 to terminal 750. The release of relay 721 also establishes an actuating circuit for sequence switch magnet 700 which may be traced from grounded battery through the winding of magnet 700, left upper contact of sequence switch spring 706 to ground through the left inner normal contact and armature of relay 721. The sequence switch is thus rotated from position 6 to position 7.

In sequence switch position 7 a circuit is established for operating relay 721. This may be traced from grounded battery through the left winding of relay 721, right upper and lower contact of sequence switch spring 711 to ground. The operation of relay 721 establishes an energizing circuit for sequence switch magnet 700 which may be traced from grounded battery through the winding of magnet 700, lower contact of sequence switch spring 706, left outer contact and armature of relay 721 to ground through the lower contact of sequence switch spring 707. The sequence switch is thus rotated from position 7 to position 8 where it will remain until the final selector switch has completed brush, tens and units selection. In position 8, a circuit is established to hold relay 721 in an operated position. This circuit may be traced from grounded battery through the right winding of relay 721, right upper and lower contacts of sequence switch spring 702, right contact and armature of relay 721, right lower contact of sequence switch spring 714, brush 748, terminal 749, upper left and lower right contacts of sequence switch spring 805, resistance 820 to ground through the lower left contact of sequence switch spring 827.

It will be remembered that the sequence switch shown in Fig. 7, is in position 6 and in this position the fundamental is established to control the final selector switch, Fig. 9, for brush selection. This fundamental circuit may be traced from grounded battery through the left upper contact of sequence switch spring 804, right winding of relay 818, left lower contact of sequence switch spring 803, left lower contact of sequence switch spring 802, terminal 747, brush 746, left upper contact of sequence switch spring 713, resistance 724, upper contact of sequence switch spring 703, terminal 1309, brush 1306, conductor 361 of Figs. 13 and 3, left upper contact of sequence switch spring 309, conductor 271, right inner contact and armature of relay 545, left normal contact and armature of relay 546, left upper contact of sequence switch spring 532, winding of relay 543, left lower contact of sequence switch spring 533, normal contact of counting relay SO', winding of stepping relay 542, register brush 80 and its associated contact terminal strip 94, cross-connection from terminal strip 94 to terminal strip 96, resistance 549, and 548, upper right contact of sequence switch spring 536, left inner contact and armature of relay 545, conductor 270, left upper contact of sequence switch spring 310, conductor 364, of Figs. 3 and 13, brush 1305, terminal 1308, lower contact of sequence spring 704, resistance 725, to ground at the lower contact of sequence switch spring 705. Relay 818 of Fig. 9 and relay 542 of Fig. 7 are operated upon the establishment of the fundamental; relay 543, however, does not operate since it is polarized in the opposite direction to the current flow.

Relay 818 in attracting its left armature establishes a circuit for operating relay 821. This may be traced from grounded battery through the left winding of relay 821, left upper contact of sequence switch spring 807, left contact and armature of relay 818 to ground through the upper contact of sequence switch spring 808. The operation of relay 821 establishes a locking circuit for itself from grounded battery through its left winding, normal armature and contact of relay 824, left contact and armature of relay 821, terminal 750, brush 742 to ground through the right lower and left upper contacts of sequence switch spring 712. Relay 821 in attracting its right armature establishes an energizing circuit for sequence switch magnet 800. This may be traced from grounded battery through the winding of magnet 800, lower contacts of sequence switch spring 809 to ground through the right contact and armature of relay 821. The final selector sequence switch is thus rotated from position 1 to position 2. Upon the movement of the sequence switch from position 1 to position 2, a holding circuit is established for relay 818. This circuit may be traced from grounded battery through the left upper contact of sequence switch spring 804, right winding of relay 818, lower contact of sequence switch spring 810, right contact and armature of relay 818, right lower contact of sequence switch spring 803, left lower contact of sequence switch spring 802 and thence to ground over the fundamental circuit previously traced.

In sequence switch position 2 a circuit is established for energizing updrive magnet 826. This may be traced from grounded battery through the winding of magnet 826, right upper contact of sequence switch spring 811, left contact and armature of relay 818 to ground through upper contact of sequence switch spring 808. The final selector switch elevator is now driven upward to make brush selection and brush 832 is intermittently brought into engagement with the conducting and non-conducting portions of commutator segment 830 thus intermittently establishing a shunt to release stepping relay 542. This shunt path may be traced from ground through the left upper contact of sequence switch spring 827, brush 832, conducting portions of commutator segment 830, right upper and left lower contacts of sequence switch spring 802 where it joins the fundamental circuit to hold relay 818 in an operated position and release stepping relay 542.

The initial operation of stepping relay 542 over the fundamental circuit establishes an energizing circuit for counting relay 4. This circuit may be traced from grounded battery through the left lower contact of sequence switch spring 531, right lower contact of sequence switch spring 538, winding of counting relay 4, normal contact and armature of counting relay 4', conductor 55, conductor 563, upper contacts of sequence switch spring 521, left upper contact of sequence switch spring 526, contact and armature of stepping relay 542 to ground through upper contact of sequence switch spring 525. The operation of counting relay 4 establishes a locking circuit for itself and an operating circuit for counting relay 4' which is effective upon the release of stepping relay 542. The engagement of brush 832 with the first conducting portion of commutator segment 830 establishes a shunt around the winding of stepping relay 542 causing its release. The operation of counting relay 4' establishes an operating circuit for counting relay 3 which is effective upon a subsequent operation of the stepping relay 542. As the final selector switch elevator is driven upward, brush 832 is intermittently engaged with the conducting and non-conducting portions of commutator segment 830 causing the intermittent operation and release of stepping relay 542. Counting relays 4, 4', 3, 3', 2, 2', 1, 1', SO, SO', FO are thus operated in the well known manner of operating counting relays. The operation of counting relay SO' opens the fundamental circuit to cause the release of relay 818 which is effective upon a subsequent disengagement of brush 832 from the conducting portion of commutator segment 830. The release of relay 818 opens the energizing circuit for updrive magnet 826, arresting the upward movement of the final selector switch elevator. The release of relay 818 also establishes an energizing circuit for sequence switch magnet 800 which may be traced from grounded battery through the winding of magnet 800, right upper contact of sequence switch spring 812, left normal contact and armature of relay 818 to ground through upper contact of sequence switch spring 808. Sequence switch 800 is thus rotated from position 2 to position 3. The release of counting relay FO establishes a circuit for energizing sequence switch magnet 520, as previously traced, to rotate the sequence switch from position 6 to position 7. The sequence switch in thus rotating opens the holding circuit for the counting relays which release. The release of counting relay FO establishes an energizing circuit for sequence switch magnet 520, as previously traced, to rotate the sequence switch from position 7 to position 8.

In position 8 the fundamental circuit is again established for final selector switch, tens selection. This fundamental circuit is the same as previously traced for the final selector switch, brush selection and upon its establishment relay 818 of the final selector switch circuit is operated and stepping relay 542 is operated in the manner previously described.

The operation of relay 818 establishes an energizing circuit for sequence switch magnet 800 which may be traced from grounded battery through the winding of magnet 800, right contact of sequence switch spring 812, left contact and armature of relay 818 to ground through the upper contact of sequence switch spring 808. The sequence switch is rotated from position 3 to position 4 and in thus rotating establishes a locking circuit for relay 818 as previously traced. In sequence switch position 4 a circuit is established for energizing updrive magnet 826. This may be traced from grounded battery through the winding of magnet 826, right upper contact of sequence switch spring 811, left contact and armature of relay 818 to ground through upper contact of sequence switch spring 808. The final selector switch elevator is now driven upward and brush 838 is intermittently brought into engagement with the conducting and non-conducting portions of commutator segment 837 to establish a shunt for stepping relay 542. This shunt may be traced from ground through the left upper contact of sequence switch spring 827, brush 838, commutator 837, right upper contact of sequence switch spring 803, left lower contact of sequence switch spring 802 where it joins the fundamental circuit for the establishment of the stepping relay shunt.

The initial operation of stepping relay 542 upon the closure of the fundamental circuit establishes a circuit for energizing counting relay 9. This circuit may be traced from ground through the upper contact of sequence switch spring 525, armature and contact of stepping relay 542, left upper contact of sequence switch spring 526, left upper contact of sequence switch spring 521, right lower contact of sequence switch spring 522, conductor 561, conductor 60, contact and armature of counting relay 9', winding of counting relay 9, to grounded battery through the right lower contact of sequence switch spring 531. The operation of counting relay 9 establishes a locking circuit for itself and an operating circuit for counting relay 9' which is effective upon the initial release of stepping relay 542 when brush 838 of the final selector switch establishes contact with the conducting portion of commutator 837. The operation of counting relay 9' establishes a circuit for actuating counting relay 8 upon a subsequent operation of stepping relay 542 and a circuit is thus established for the actuating of counting relay 8' upon the subsequent release of stepping relay 542. As the final selector sequence switch is driven upward the counting relays are operated in sequence in the manner described for counting relays 9, 9', 8 and 8'. The operation of counting relay SO' opens the fundamental circuit to release relay 818 of the final selector switch circuit as soon as the non-conducting portion of commutator 837 is engaged with brush 830.

The release of relay 818 opens the energizing circuit for updrive magnet 826 thus arresting the upward movement of the selector switch elevator. The release of relay 818 further establishes a circuit for energizing sequence switch magnet 800. This circuit may be traced from grounded battery through the winding of magnet 800, right upper contact of sequence switch spring 812, left normal contact of relay 818 to ground through upper contact of sequence switch spring 808. The final selector sequence switch is now rotated from position 4 to position 5.

The operation of counting relay FO establishes a circuit for actuating sequence switch magnet 520 as previously traced to rotate the sequence switch from position 8 to position 9. In thus rotating the locking circuit for the counting relays is opened causing their release. The release of relay FO establishes an actuating circuit for sequence switch magnet 520 as previously traced to rotate the sequence switch from position 9 to position 10.

In sequence switch position 10 the fundamental circuit is again established as previously traced for final selector switch units selection and relays 818 and 542 are again operated.

The operation of relay 818 establishes a circuit for energizing sequence switch magnet 800 which may be traced from grounded battery through the winding of magnet 800, lower contact of sequence switch spring 812, left contact and armature of relay 818 to ground through upper contact of sequence switch spring 808. The sequence switch is thus rotated from position 5 to position 6 and in thus rotating establishes a locking circuit for relay 818 as previously traced.

A circuit is now established for energizing the updrive magnet 839. This circuit may be traced from grounded battery through the winding of magnet 839, lower contact of sequence switch spring 817, left contact and armature of relay 818 to ground through upper contact of sequence switch spring 808. The final selector sequence switch is now driven upward to bring brush 832 intermittently into engagement with the conducting and non-conducting portions of commutator segment 830. A shunt circuit for releasing relay 542 is thus established when brush 832 is engaged with the conducting portions of commutator 830. This shunt circuit may be traced from ground through the left upper contact of sequence switch spring 827, brush 832, conducting portion of commutator segment 830, right upper and left lower contacts of sequence switch spring 802 where it joins the fundamental circuit as previously described.

The initial energization of stepping relay 542, upon establishment of the fundamental circuit, establishes a circuit for energizing counting relay 2. This circuit may be traced from ground through the upper contact of sequence switch spring 525, contact and armature of stepping relay 542, left upper contact of sequence switch spring 526, left upper contact of sequence switch spring 521, left lower contact of sequence switch spring 522, conductor 562, conductor 53, normal contact and armature of counting relay 2', winding of counting relay 2, right lower contact of sequence switch spring 538 to grounded battery through the left lower contact of sequence switch spring 531. The operation of counting relay 2 establishes a locking circuit for itself and an operating circuit for relay 2' which is effective upon the first release of stepping relay 542 when brush 832 is brought into engagement with conducting portion of commutator segment 830. The counting relays 2, 2', 1, 1', SO, SO' and FO are operated in the well known manner of operating counting relays. As the final selector switch elevator is driven in an upward movement the operation of counting relay SO' again opens the fundamental circuit to initiate the release of relay 818 as previously described.

The release of relay 818 arrests the upward movement of the final selector switch and establishes an energizing circuit for sequence switch magnet 800. This energizing circuit may be traced from grounded battery through the winding of magnet 800, right upper contact of sequence switch spring 812, left normal contact and armature of relay 818 to ground through upper contact of sequence switch spring 808. The sequence switch is thus rotated out of position 6 and into position 9 under the control of the sequence switch magnet contact.

The operation of relay FO establishes an energizing circuit for sequence switch magnet 520 as previously traced to rotate the sequence switch from position 10 to position 11. In thus rotating, the holding circuit for the counting relays is opened causing their release. The release of counting relay FO establishes an energizing circuit for sequence switch magnet 520 as previously traced to rotate the sequence switch from position 11 to position 12.

The final selector sequence switch in position 9 establishes a circuit for operating relay 818 which may be traced from grounded battery through the left upper contact of sequence switch spring 804, right winding of relay 818, right lower and left upper contacts of sequence switch spring 810 to ground through right contact and armature of relay 821. The operation of relay 818 establishes an energizing path for sequence switch magnet 800 which may be traced from grounded battery through the winding of magnet 800, lower contact of sequence switch spring 812, left contact and armature of relay 818 to ground through upper contact of sequence switch spring 808. The sequence switch is now rotated out of position 9 and into position 12 under the control of the sequence switch magnet contact.

In position 12 of the final selector sequence switch a line extending to the auxiliary testing device, Fig. 15, is tested to determine whether it is in a busy or idle condition. This testing device is connected to the terminals for line 9992 in place of the line conductors. Since, as previously described, there are a number of auxiliary testing devices the same as that shown in Fig. 15 connected to line terminals adjacent to line 9992, the PBX hunting feature of the final selector switch is employed to connect the final selector switch to an idle one of these testing devices. Busy line terminals connected to a testing device are characterized by grounded battery connected to terminal 843 derived from a final selector switch the same as Fig 9. This may be traced from grounded battery through the right upper contact of sequence switch spring 804, resistances 833 and 834, lower contacts of sequence switch spring 813, brush 842 to terminal 843. An idle line connected to a testing device is characterized by ground connected to terminal 843 through the winding of relay 1505 and the upper contact of sequence switch spring 1520.

Assuming that the first line connected to a testing device is busy, a circuit is established for holding relay 818 actuated. This circuit may be traced from grounded battery in a circuit the same as that shown on Fig. 9, through the right upper contact of sequence switch spring 804, resistances 833 and 834, lower contacts of sequence switch spring 813, brush 842, terminal 843, to brush 842, in the final selector switch now being described, through right lower and upper contacts of sequence switch spring 813, right armature and contact of relay 818, right upper contact of sequence switch spring 810, right winding of relay 818, left lower contact of sequence switch spring 803, left upper contact of sequence switch spring 802, winding of relay 824 to ground. Relay 824 does not receive sufficient current to operate in the circuit just traced since it is in multiple with the winding of relay 1505 which is of low resistance.

With relay 818 held in an operated position an energizing circuit for updrive magnet 839 is established. This energizing circuit may be traced from grounded battery through the winding of magnet 839, lower contact of sequence switch spring 807, left contact and armature of relay 818 to ground through the upper contact of sequence switch spring 808. The final selector switch elevator is now driven in an upward movement until brush 842 is brought into engagement with a line connected to an idle testing device characterized by ground connected to terminal 843. The holding circuit for relay 818 is thus opened to cause its release. Relay 818 in releasing opens the energizing circuit for updrive magnet 839, thus arresting the upward movement of the final selector switch elevator. The release of relay 818 also establishes an energizing circuit for sequence switch magnet 800 which may be traced from grounded battery through the winding of magnet 800, right upper contact of sequence switch spring 812, left contact and armature of relay 818, lower contact of sequence switch spring 808 to ground through right contact and armature of relay 821. The sequence switch is thus rotated from position 12 to position 13.

In sequence switch position 13 a circuit is established for energizing sequence switch magnet 800 which may be traced from grounded battery through the winding of magnet 800, lower contacts of sequence switch spring 809 to ground through the right contact and armature of relay 821, thus rotating the sequence switch to position 14 where a circuit is again established for actuating sequence switch magnet 800. This may be traced from grounded battery through the winding of magnet 800, right upper contact of sequence switch spring 812, left normal contact and armature of relay 818 to ground through upper contact of sequence switch spring 808. The sequence switch is now rotated from position 14 to position 15 where it will remain until the incoming selector, Fig. 8, has been tested.

It will be remembered that the incoming selector switch remained in position 8 during the control of the final selector switch. During this time, relay 721 remained actuated over the path traced from grounded battery through the right winding of relay 721, right upper and lower contacts of sequence switch spring 702, right contact and armature of relay 721, right lower contact of sequence switch spring 714, brush 748, terminal 749, upper left and lower right contact of sequence switch spring 805, resistance 820, left lower contact of sequence switch spring 827 to ground. This holding circuit for relay 721 was opened when the final selector sequence switch rotated from position 8 to position 9 and at this time relay 721 was deenergized to establish an energizing circuit for sequence switch magnet 700. This energizing circuit may be traced from grounded battery through the winding of magnet 700, left upper contact of sequence switch spring 706 to ground through left inner contact and armature of relay 721. The incoming selector sequence switch 700 is thus rotated from position 8 to position 9.

In position 9 of the incoming selector sequence switch, battery and ground is reversed with relation to the fundamental circuit. This is done in service and in this testing system to signal the control circuit when final selections are completed and relay 721 released. Since the incoming selector sequence switch is rotated out of position 8, the fundamental circuit reverts to the control of the incoming selector, Fig. 8. It will be remembered that the sequence switch Fig. 7 is now resting in position 12. This fundamental circuit may be traced from grounded battery through the right winding of relay 721, lower contacts of sequence switch spring 715, resistance 725, lower contact of sequence switch spring 704, terminal 1308, brush 1305 conductor 364 of Figs. 13 and 3, left upper contact of sequence switch spring 310, conductor 270, left inner contact and armature of relay 545, right upper contact of sequence switch spring 536, resistances 548 and 549, terminal strip 96, cross-connection from terminal strip 96 to terminal strip 94, register brush 80 and its associated contact, winding of stepping relay 542, normal contacts of counting relay SO′, left lower contact of sequence switch spring 533, winding of polarized relay 543, left upper contact of sequence switch spring 532, left normal contact and armature of relay 546, right inner contact and armature of relay 545, conductor 271, left upper contact of sequence switch spring 309, conductor 361 of Figs. 3 and 13, brush 1306, terminal 1309, upper contact of sequence switch spring 703, resistance 724, left upper and lower contacts of sequence switch spring 708, upper contacts of sequence switch spring 712 to ground. It will be noted that the current flow through the winding of relay 543 is in the opposite direction to that traced through its winding, during incoming and final selector switch selections. Therefore, relays 543, 542 and 721 are now operated.

The operation of relays 542 and 543 combine to establish a circuit for operating counting relay SO. This circuit may be traced from ground through the right upper contact of sequence switch spring 526, contact and armature of stepping relay 542, left lower contact of sequence switch spring 527, contact and armature of polarized relay 543, left lower contact of sequence switch spring 524, winding of counting relay SO to grounded battery through the left lower contact of sequence switch spring 531. The operation of counting relay SO establishes a locking circuit for itself and an operating circuit for counting relays SO′ and FO which is effective upon the release of stepping relay 542 as hereinafter described. The operation of relay 721, as described upon the establishment of the fundamental circuit, establishes a circuit for energizing relay 751. This circuit may be traced from grounded battery through the winding of relay 751, right upper contact of sequence switch spring 716, right contact and armature of relay 721 to ground through upper contacts of sequence switch spring 712. The operation of relay 751 establishes a circuit for energizing sequence switch magnet 700. This circuit may be traced from grounded battery through the winding of magnet 700, contact and armature of relay 751 to ground through left lower and upper contacts of sequence switch spring 712. The sequence switch is thus rotated from position 9 to position 10. The sequence switch upon rotating out of position 9 opens the fundamental circuit and thus opens the energizing circuit for stepping relay 542 and polarized relay 543. The stepping relay 542 quickly releases to remove the ground shunt around the windings of counting relays SO′ and FO which now operate. The operating path for counting relays SO′ and FO may be traced from grounded battery through the left lower contacts of sequence switch spring 531, windings of counting relays SO, SO′ and FO to ground through the contact and armature of counting relay SO. The operation of counting relay SO′ opens the fundamental circuit to prevent further action in the incoming selector switch circuit until the sequence switch in the test control circuit, Fig. 7, has been properly positioned. The operation of counting relay FO establishes an energizing circuit for sequence switch magnet 520, the same as previously traced. The rotation of sequence switch from position 12 to position 13 causes the fundamental to be opened at the sequence switch contacts and the locking circuit for the counting relays is opened to cause their release. The release of counting relay FO establishes an energizing circuit for sequence switch magnet 520 as previously traced to rotate the sequence switch from position 13 to position 14.

In position 14 of the test control sequence switch, Fig. 7, trunk closure is simulated to further control the auxiliary circuit of the incoming selector switch, Fig. 8. This circuit may be traced from grounded battery through the right winding of relay 721, upper contacts of sequence switch spring 702, resistance 724, upper contact of sequence switch spring 703 and thence over the fundamental circuit, previously traced through right contact and armature of relay 545, Fig. 7, left normal contact and armature of relay 546, right upper contact of sequence switch spring 532, upper contact of sequence switch spring 533, winding of polarized relay 543, left upper contact of sequence switch spring 536, left armature and contact of relay 545 and thence over the fundamental circuit as previously traced through the lower contact of sequence switch spring 704, Fig. 8, resistance 725 to ground through the lower contact of sequence switch spring 705. The polarized relay 543 and relay 721 are operated in the circuit traced.

The operation of polarized relay 543 establishes an energizing circuit for counting relays SO, SO' and FO. This circuit may be traced from grounded battery through the left lower contact of sequence switch spring 531, windings of counting relays SO, SO' and FO, right lower contact of sequence switch spring 524, contact and armature of polarized relay 543, to ground through right lower contact of sequence switch spring 527. The operation of counting relay SO establishes an obvious locking circuit for itself and counting relays SO' and FO so that they will remain operated after the release of polarized relay 543 and until sequence switch 520 has rotated out of position 14. The operation of counting relay SO' opens the fundamental circuit to release polarized relay 543. The operation of counting relay FO establishes a circuit for energizing the sequence switch magnet 520 as previously traced, to rotate the sequence switch from position 14 to position 15. The movement of the sequence switch out of position 14 opens the locking circuit for the counting relays, causing their release. The release of counting relay FO establishes a circuit for energizing sequence switch magnet 520, as previously traced to rotate the sequence switch from position 15 to position 16. This sequence switch will remain in position 16 until the incoming selector switch, Fig. 8, has been tested and a signal received from the operation and release of the incoming selector switch supervisory relay to indicate that all tests have been successful and that unstandard conditions do not exist in the incoming selector switch under test.

The operation of relay 721, upon the establishment of trunk closure, establishes an energizing circuit for relay 751. This circuit may be traced from grounded battery through the winding of relay 751, right upper contacts of sequence switch spring 716, right contact and armature of relay 721 to ground through the upper contacts of sequence switch spring 712. The operation of relay 751 establishes an energizing circuit for sequence switch magnet 700 which may be traced from grounded battery through the winding of magnet 700, contact and armature of relay 751 to ground through the left lower and upper contacts of sequence switch spring 712, thus rotating the sequence switch from position 10 to position 11.

In sequence switch position 11, relay 721 is held in an operated position over a circuit traced from grounded battery through its left winding, normal armature and contact of relay 755, left upper contact of sequence switch spring 709, left outer contact and armature of relay 721, upper contact of sequence switch spring 707 to the busy ground maintained on terminal 1307 by the testing control circuit, as previously described.

Preceding sequence switch position 11 of the incoming selector switch, Fig. 8, the said incoming selector switch has been controlled and tested by the test control device shown in Fig. 7 and other figures of the test control device as described. In position 11 and subsequent positions of the incoming selector sequence switch, the normal function of the incoming selector is to apply ringing potential to the line conductors to ring the bell at a subscriber's station and remove said ringing potential immediately upon the removal of the receiver from the subscriber's station switchhook. Fig. 15 is designed to automatically and progressively operate to simulate the subscriber's station including the removal of the receiver from the switchhook.

It will be noted that the fundamental circuit over which the incoming selector switch is controlled is carried through resistances 548, 549, 550 or 551 or a combination of one or more of said resistances in each position of registers 70 and 85. These resistances are used to compensate for varying trunk groups for testing purposes.

The automatic selector switches to be tested are not always located in the office with the testing control device and may be located in several distant offices. Thus, it is apparent that the trunk group extending from one office to various distant offices is not always of the same resistance, and to properly test the automatic switches the trunk loops are equalized in such a manner that a more severe test is made than in the ordinary service encountered by the automatic switch.

The testing device shown in Fig. 15 is started in its progressive operation by the application of ringing potential and ringing ground from the incoming selector and from that point it automatically applies tests to the incoming selector switch and its auxiliary circuits and apparatus. As the incoming selector progressively operates it must respond to these tests if its apparatus is in correct adjustment.

Ringing ground is applied to the tip conductor of the incoming selector switch Fig. 15, at the right upper contact of sequence switch spring 713 establishing a circuit for operating relay 1506. This may be traced from ringing ground through the right upper contact of sequence switch spring 713, brush 746, terminal 747, lower contacts of sequence switch spring 802, brush 852, terminal 859, conductor 1502, left upper contact of sequence switch spring 1529, left winding of relay 1506 to grounded battery. The operation of relay 1506 establishes a circuit for energizing sequence switch magnet 1500 which may be traced from grounded battery through the winding of magnet 1500, left upper contact of sequence switch spring 1524 to ground through left contact and armature of relay 1506. The sequence switch is thus rotated from position 1 to position 2 and from position 2 to position 3 under the control of the sequence switch magnet contact. The operation of relay 1506 indicates that ringing ground is properly connected at the incoming selector switch. It will be noted that sequence switch 1500 in rotating from position 1 to position 2 opens the actuating circuit for relay 1506 causing its release.

In position 1 of sequence switch 1500 a circuit is also established for operating relay 1507 from the immediate ringing potential. This circuit may be traced from ringing potential through the left lower contact of sequence switch spring 762, winding of relay 755, lower contact of sequence switch spring 702, right contact and armature of relay 721, right lower contact of sequence switch spring 714, brush 748, terminal 749, upper contacts of sequence switch spring 805, brush 853, terminal 857, conductor 1503, condenser 1550, winding of relay 1507, right upper contact of sequence switch spring 1530 to ground. As previously described, relay 1506 released between sequence switch positions 1 and 2, a circuit is however, established in position 2 for re-operating relay 1506 which may be traced from grounded battery through the left winding of relay 1506, upper contact of sequence switch spring 1527, contact and armature of relay 1507, right lower contact of sequence switch spring 1529, conductor 1502 and thence to ringing ground at sequence switch spring 713 over the circuit previously traced. As sequence switch 1500 rotates out of position 2¼ a holding circuit for relay 1506 is established from grounded battery through the left winding and right contact and armature of relay 1506, left lower contact of sequence switch spring 1527, contact and armature of relay 1507, right lower contact of sequence switch spring 1529, conductor 1502 and thence to the ringing ground at incoming sequence switch spring 713. Relays 1506 and 1507 remain operated during the period of application of the immediate ringing potential. It will be noted that the sequence switch is rotated from position 1 to position 3 and that during the time of this rotation, relay 1507 must operate from the ringing potential to establish the described circuit for operating and holding relay 1506. Therefore, when sequence switch 1500 arrives in position 3 the holding circuit for relay 1506 is the only established means for maintaining this relay in an operated position. The test of the application of immediate ringing is made in the manner described so that the testing device will remain in position 3 if said immediate ringing potential is not impressed upon the line and the fact that the testing device remains in position 3 indicates this to the testman.

The immediate ringing potential is connected to the line during the period of time controlled by interrupter 753 in sequence switch positions 11 and 12 of the incoming selector switch. The operation of interrupter 753 rotates the incoming selector sequence switch from position 11 to position 13. This circuit may be traced upon the first operation of interrupter 753 in position 11 from ground through the interrupter contact 752 left upper contact of sequence switch spring 716, winding of relay 751 to battery operating relay 751. The operation of relay 751 establishes an actuating circuit for sequence switch magnet 700 which may be traced from grounded battery through the winding of magnet 700, contact and armature of relay 751 to ground through left lower and upper contacts of sequence switch spring 712. The sequence switch is rotated from position 11 to position 12 and in thus rotating opens the energizing circuit for relay 751 causing its release. The subsequent operation of interrupter 753 establishes a circuit for moving the sequence switch from position 12 to position 13. This may be traced from ground through the contact 760 of interrupter 753, lower contact of sequence switch spring 716, winding of relay 751 to grounded battery again operating relay 751. The operation of relay 751 establishes an energizing circuit for sequence switch magnet 700 which may be traced from grounded battery through the winding of magnet 700, contact and armature of relay 751 to ground through the left lower and upper contacts of sequence switch spring 712. As the sequence switch rotates out of position 12 the immediate ringing potential is opened at the left lower contact of sequence switch spring 762. The energizing circuit for relay 751 is also opened causing its release.

Relay 755 is termed the ringing relay, its purpose being to disconnect the ringing current when the receiver is removed from the switchhook at the subscriber's station. It, therefore, should not operate during the time that the ringing potential is carried through its winding for the purpose of ringing the bell at the subscriber's station. It will be noted in the testing features hereinafter described that false operation of relay 755 will cause the testing device, Fig. 15, to be arrested in its progression.

During the period of immediate ringing, it will be remembered that relays 1506 and 1507 are held in an operated position. Relay 1506 in attracting its left armature establishes a circuit for rotating sequence switch 1500 from position 3 to position 4. This circuit may be traced from grounded battery through the winding of magnet 1500, upper contact of sequence switch spring 1524, left contact and armature of relay 1506 to ground. In position 4 a circuit is established for operating relay 1509. This may be traced from grounded battery through the contact of sequence switch spring 1526, winding of relay 1509, right normal contact and armature of relay 1510, lower contact of sequence switch spring 1524, left contact and armature of relay 1506 to ground. The operation of relay 1509 establishes a locking circuit for itself through its right inner contact and armature to ground, through the left inner contact and armature of relay 1511. Relay 1509 in operating does not establish any other effective circuit at this time. Upon the termination of the immediate ringing period relays 1506 and 1507 are released. The release of relay 1506 establishes a circuit for operating relay 1510. This may be traced from ground through the left normal contact and armature of relay 1506, upper contact of sequence switch spring 1525, left outer armature and contact of relay 1509, winding of relay 1510, contact of sequence switch spring 1526 to grounded battery. Relay 1510 in operating establishes a locking circuit for itself through its left inner contact and armature to ground through right contact and armature of relay 1512. The operation of relay 1510 does not establish any other effective circuit at this time.

The test of the immediate ringing has now been completed and the apparatus in the testing device, Fig. 15, is positioned to proceed with further tests. This indicates correct adjustment of the apparatus tested. The immediate ringing is used in the normal functioning of this type of incoming selector circuit to immediately ring the subscriber's bell when the incoming selector and final selector are connected to subscriber's line. After a time interval this immediate ringing potential is replaced by ringing potential applied to the line through the commutator segment of an interrupter. The interrupted ringing current remains connected to the line conductors until such time as the receiver is removed from the switchhook or the calling party disconnects. A number of calls are established preceding the application of the interrupted ringing.

In position 13 of the incoming selector sequence switch, interrupted ringing potential and ringing ground is applied to the line, and a circuit is established for again operating relay 1507 of the testing device positioned in sequence switch position 4. This path may be traced from ringing potential through conducting segments of interrupter 756, right lower contact of sequence switch spring 762, relay 755, lower contacts of sequence switch spring 702, right contact and armature of relay 721, right lower contact of sequence switch spring 714, brush 748, terminal 749, upper contacts of sequence switch spring 805, brush 853, terminal 857, conductor 1503, condenser 1550, winding of relay 1507, to ground through right upper contact of sequence switch spring 1530. The operation of relay 1507 establishes a circuit for operating relay 1506 which may be traced from ringing ground through the right upper contact of sequence switch spring 713, brush 746, terminal 747, lower contacts of sequence switch spring 862, brush 852, terminal 859, conductor 1502, right lower contact of sequence switch spring 1529, armature and contact of relay 1507, left outer contact of sequence switch spring 1527, winding of relay 1506 to grounded battery. The operation of relay 1506 establishes a circuit for operating relay 1511 which may be traced from grounded battery through the contact of sequence spring 1526, winding of relay 1511, left outer normal contact and armature of relay 1512, right contact and armature of relay 1510, lower contact of sequence switch spring 1524, to ground through left contact and armature of relay 1506. It will be noted that the operation of relay 1511 causes the release of relay 1509. Relays 1506 and 1507 remain operated during the period of time that interrupter 756 is rotated with the conducting segment connected to the contact of sequence switch spring 762. At the end of this period of time, relays 1506 and 1507 release, establishing a circuit for rotating sequence switch 1500 from position 4 to position 5.

The foregoing operation and release of relays 1506 and 1507 is to prepare the testing circuit, Fig. 15, to move its sequence switch into testing position 5 with assurance that the test may be made when the conducting segment of interrupter 756 is first connected to the contact of sequence switch spring 762. In this manner the full time period of ringing is connected to testing device. As is well known in the art, sequence switch 700 may move into position 13 at a time when interrupter 756 has partly rotated over the conducting portion of its segment with relation to the contact of sequence switch spring 762.

The circuit established for rotating sequence switch 1500 into position 5 may be traced from grounded battery through the winding of magnet 1500, lower contact of sequence switch spring 1525, left outer contact and armature of relay 1511, left outer normal contact and armature of relay 1509, upper contact of sequence switch spring 1525, left normal contact and armature of relay 1506 to ground. The sequence switch in rotating from position 4 to 5 opens the holding circuit for relays 1510 and 1511 causing their release.

With sequence switch 1500 in position 5, the testing device is prepared to make a test for premature or false operation of the ringing relay 755, and since the time interval for moving sequence switch 1500 from position 4 to position 5 is of shorter duration than the time occupied by interrupter 756 for moving from one conducting segment to the next, this premature operation test will take place when said next conducting segment of interrupter 756 is connected to the contact of sequence switch spring 762. This premature operation test will also be known in this description as a premature tripping test.

Ringing potential from interrupter 756 now establishes a circuit for operating relay 1507. This may be traced from ringing potential through the conducting portion of interrupter 756, left lower contact of sequence switch spring 762 and thence to conductor 1503 of Fig. 15 as previously traced, thence through condenser 1550, winding of relay 1507, left upper contact of sequence switch spring 1530, conductor 1502 and thence to ringing ground at sequence switch spring 713 over the path previously traced. The operation of relay 1507 establishes a circuit for operating relay 1506 which may be traced from grounded battery through the left winding of relay 1508, upper contact of sequence switch spring 1527, contact and armature of relay 1507 to ground through right upper contact of sequence switch spring 1521. The operation of relay 1506 establishes a circuit for energizing sequence switch magnet 1500 which may be traced from grounded battery through the winding of magnet 1500, upper contact of sequence switch spring 1524 to ground through left contact and armature of relay 1506. The sequence switch is thus rotated from position 5 to position 6 and in rotating from position 5 to position 6 opens the circuit traced for operating relay 1506. This relay, however, in position 6 is connected to interrupter 1551 and is operated and released upon each rotation of this interrupter. Its operating path may be traced from grounded battery through the left winding of relay 1506, left lower contact of sequence switch spring 1534, conducting segment of interrupter 1551 to ground through the right lower contact of sequence switch spring 1528. Upon the first operation of relay 1506 under the control of interrupter 1551, a circuit is established for operating relay 1509. This circuit may be traced from grounded battery through the contact of sequence switch spring 1526, winding of relay 1509, right normal contact and armature of relay 1510, lower contact of sequence switch spring 1524, to ground through left contact and armature of relay 1506. Relay 1509 establishes a locking path for itself to ground at the right normal armature of relay 1512. When interrupter 1551 rotates to a non-conducting portion of the segment, relay 1506 is released establishing a circuit for energizing relay 1510. This energizing circuit may be traced from grounded battery through the contact of sequence switch spring 1526, winding of relay 1510, left outer contact and armature of relay 1509, upper contact of sequence switch spring 1525 to ground through left normal contact and armature of relay 1506. Relay 1510 establishes an obvious locking circuit for itself which need not be traced and also in attracting its left outer armature establishes a circuit for the premature tripping test which is effective upon the subsequent operation of relay 1506. The second operation of relay 1506 under the control of interrupter 1551 establishes a circuit for making the premature trip test upon ringing relay 755. The circuit established for making this premature trip test is of such value in resistances that the test of the adjustment of relay 755 is more severe than is encountered in actual service. This circuit may be traced from ringing potential through the conducting segment of interrupter 756, right lower and upper contacts of sequence switch spring 762, winding of relay 755 and thence over the path previously traced to conductor 1503 in Fig. 15, through resistance 1560, 1561, 1562 and 1563, lower contact of sequence switch spring 1531, right normal contact and armature of relay 1511, left outer armature and contact of relay 1510, upper contact of sequence switch spring 1533 and thence over conductor 1502 to ringing ground at sequence switch spring 713 as previously traced.

During the period of time that relay 1506 is held in an operated position for the premature trip test, a circuit is established for operating relay 1511. This may be traced from grounded battery through the contact of sequence switch spring 1526, winding of relay 1511, left outer normal contact and armature of relay 1512, right contact and armature of relay 1510, lower contact of sequence switch spring 1524 to ground through left contact and armature of relay 1506. The operation of relay 1511 opens the holding circuit for relay 1509 causing its release. The operation of relay 1511 also opens the circuit through which the premature trip test is being applied to ringing relay 755.

One premature trip test has now been completed. This is the first of three premature trip tests that are made during the automatic progression of the testing device, Fig. 15. The advantage of making three premature trip tests is in the probability that each one of these tests will start at a different point in the alternating current wave and thus in one or more of these tests the alternating current is connected through the winding of relay 755 when the current wave is at its peak value. In this manner the maximum surge of current is sent through the winding of relay 755 upon the application of the premature trip test.

It will be remembered that during the first premature trip test, relay 1506 operated twice under the control of interrupter 1551 and that during its second operation relay 1511 opens the premature trip test. It is now necessary to count off sufficient time to allow interrupter commutator 756 to rotate through the full ringing period and thence into the silent period or non-conducting portion of the interrupter before advancing the sequence switch, Fig. 15, into the sequence switch position for the next premature trip test. Relays 1509, 1510, 1511 and 1512 are used in conjunction with relay 1506 and interrupter 1551 to count this allotted time. The second release of relay 1506 establishes an operating circuit for relay 1512. This may be traced from grounded battery through the contact of sequence switch spring 1526, winding of relay 1512, upper contact of sequence switch spring 1535, left outer contact and armature of relay 1511, left outer normal contact and armature of relay 1509, upper contact of sequence switch spring 1525 to ground through normal contact and armature of relay 1506. The operation of relay 1512 opens the holding circuit for relay 1510 causing its release. A third operation of relay 1506 under the control of interrupter 1551 reoperates relay 1509 over the circuit previously described for operating this relay. A third release of relay 1506 establishes a circuit for operating relay 1510 as previously traced. A fourth operation of relay 1506 establishes a circuit for rotating sequence switch 1500 from position 6 to position 7. This circuit may be traced from grounded battery through the winding of magnet 1500, lower contact of sequence switch spring 1523, left outer contact and armature of relay 1512, right contact and armature of relay 1510, lower contact of sequence switch spring 1524, to ground through left contact and armature of relay 1506. The movement of the sequence switch from position 6 to position 7 releases relays 1506, 1509, 1510, 1511 and 1512.

It will be noted that the testing device, Fig. 15, is connected in sequence switch position 7 the same as position 5 and thus the sequence switch is rotated from position 7 to position 8 in the same manner as from position 5 to position 6.

In position 8 the second premature trip test is made in the same manner as described in position 6 and the sequence switch is rotated to position 9 upon the completion of the second premature trip test at the termination to the allotted time allowed for the operation of relays 1509, 1510, 1511 and 1512.

In position 9 of sequence switch 1500 the action is the same as in positions 5 and 7. Relay 1507 is operated from the ringing potential and relay 1506 from the local circuit path previously traced to rotate sequence switch 1500 from position 9 to position 10.

In position 10 of sequence switch 1500 the third premature trip test is made in the same manner as described for the first premature trip test in sequence switch position 6 and at the termination of the third premature trip test the sequence switch 1500 is rotated from position 10 to position 11.

It will be noted that if relay 755 had operated to disconnect the ringing current during any of the three premature trip tests, the testing device, Fig. 15, would be arrested in its progression and thus indicate that relay 314 is not in proper adjustment.

Relay 1507 is again bridged across conductors 1502 and 1503 in position 11 of sequence switch 1500 and will be operated from ringing potential when interrupter 756 rotates to the next succeeding conducting portion of its commutator segment. The operating circuit for relay 1507 from the ringing potential is the same as previously traced for its operation. A circuit is now established for actuating relay 1506 which may be traced from grounded battery through the left winding of relay 1506, upper contact of sequence switch spring 1527, contact and armature of relay 1507 to ground through right upper contact of sequence switch spring 1521. A circuit is now established for rotating sequence switch 1500 from position 11 to position 12. This circuit may be traced from grounded battery through the winding of magnet 1500, upper contact of sequence switch spring 1524 to ground through the left contact and armature of relay 1506.

A test is now made of the tripping or operating adjustment of ringing relay 755. This is done automatically by the testing device, Fig. 15, in position 12 of the sequence switch through resistances bridging the tip and ring conductor for a limited time interval. The resistances are of such value that the more severe test of the operating adjustment of ringing relay 755 is made than would be encountered in actual service. The feature of limiting the time that the tripping test is applied is for the purpose of locating ringing relays that are sluggish in their action. A requirement in service maintenance is that the ringing potential be disconnected immediately upon removal of the receiver from the switchhook. This requirement is to prevent the ringing potential being tripped subsequently to the called party placing the receiver to the ear.

It will be noted that relay 1506 is again under the control of interrupter 1551 in sequence switch position 12. The first operation of relay 1506 establishes a circuit for operating relay 1509 as previously traced. The subsequent release of relay 1506 establishes a circuit for operating relay 1510, as previously traced. The operation of relay 1510 establishes a circuit for bridging resistances 1560 and 1561 across the line to tip of ringing relay 755. This circuit may be traced from ringing potential through the conducting portion of the commutator of interrupter 756, right, lower contact of sequence switch spring 762, ringing relay 755, lower contacts of sequence switch spring 702, right contact and armature of relay 721, right lower contact of sequence switch spring 714, brush 748, terminal 749, upper contacts of sequence switch spring 805, brush 853, terminal 857, conductor 1503, resistances 1560 and 1561, upper contact of sequence switch spring 1531, right normal contact and armature of relay 1511, left outer contact and armature of relay 1510, upper contact of sequence switch spring 1533, conductor 1502, terminal 859, brush 852, lower contacts of sequence switch spring 802, terminal 747, brush 746, to ringing ground through right upper contact of sequence switch spring 713. The ringing relay 755 to be in correct adjustment must operate before interrupter 1551 disconnects from its conducting segment. Relay 1506 releases through the disconnection of interrupter 1551 and the release of relay 1506 establishes a circuit for operating relay 1511 to open the circuit established for operating the ringing relay 755. The circuit for operating relay 1511 is the same as previously traced. The operation of relay 1511 opens the holding circuit for relay 1509 causing its release.

Assuming that relay 755 is in proper adjustment its operation opens the holding circuit for relay 721 causing its release to open the circuit through which ringing potential is imposed upon the line conductors. The release of relay 721 also establishes a circuit for actuating sequence switch magnet 700. This may be traced from grounded battery through the winding of magnet 700, left upper contact of sequence switch spring 706 to ground through the armature and contact of relay 721. The sequence switch is thus rotated out of position 13 and will continue to rotate to position 16 under the control of the magnet contact. During the time that the sequence switch is rotated through positions 14 and 15 a circuit is established for operating relay 721 which may be traced from grounded battery through the left winding of relay 721 to ground through the right upper and lower contacts of sequence switch spring 711. The operation of relay 721 establishes a locking circuit for itself which may be traced from grounded battery through its left winding, lower contact of sequence switch spring 709, left outer contact and armature of relay 721, upper contact of sequence switch spring 707, terminal 1307, to the busy ground maintained on terminal 1307 as previously described. Relay 721 remains operated over the path traced until the testing control circuit is disconnected. A circuit is now established from battery and ground at repeating coil 758 over the talking conductors to testing device, Fig. 15. This circuit is obvious and need not be traced.

Again referring to the testing device, Fig. 15, it will be remembered that relays 1510, 1511 and 1506 are held in an operated position. A test will now be made to ascertain whether relay 755 operated to disconnect ringing current from the line conductors. This test is made by again bridging relay 1507 across the line conductors. If the ringing relay 755 did not operate when the operating or tripping test was applied, the ringing current remains connected to the line conductors and thus relay 1507 is again operated. Preparatory to making this test it is necessary to discharge condenser 1500 because this condenser will be charged from one side of the AC wave. If relay 755 has properly disconnected the ringing potential and rotated the incoming selector as described to position 16, battery will be connected from repeating coil 758 to the line conductors. Therefore, should the condenser be charged in such direction that this battery and ground will cause it to discharge through the winding of relay 1507, said discharge would at times cause the operation of relay 1507. Since relay 1507 should only operate from ringing current if said ringing current has not been disconnected, the operation of relay 1507 from condenser discharge would be a false indication. Condenser 1550 is discharged by bridging it across the tip and ring conductors. If the tip and ring conductors have not been disconnected from ringing potential it will not be discharged. However, if the ringing potential has been disconnected from the tip and ring conductors and battery and ground connected to said conductors, the discharge of condenser 1550 will take place. This circuit may be traced from conductor 1503 through condenser 1550, left normal contact and armature of relay 1508, right contact and armature of relay 1511, left outer contact and armature of relay 1510, upper contact of sequence switch spring 1553 to conductor 1502. Subsequent to the discharge of condenser 1550, relay 1507 is bridged across the line conductors by the operation of relay 1508. The circuit for actuating relay 1508 may be traced from grounded battery through the contact of sequence switch spring 1526, winding of relay 1508, right outer normal contact and armature of relay 1508, left outer normal contact and armature of relay 1512, right contact and armature of relay 1510, lower contact of sequence switch spring 1524 to ground through left contact and armature of relay 1506. The circuit is now established for bridging relay across the line conductors. This circuit may be traced from conductor 1503 through condenser 1550, winding of relay 1507, lower contact of sequence switch spring 1530, left contact and armature of relay 1508, right contact and armature of relay 1511, left outer contact and armature of relay 1510, upper contact of sequence switch spring 1533 to conductor 1502.

Should relay 1507 be operated, such operation would indicate that ringing relay 755 had not operated to cut off the ringing potential when resistances 1560 and 1561 were bridged across the line conductors. To indicate this, the operation of relay 1507 establishes a circuit for operating relay 1513. This path may be traced from ground through the right upper contact of sequence switch spring 1521, contact and armature of relay 1507, right lower contact of sequence switch spring 1527, right contact and armature of relay 1508, winding of relay 1513, lower contact of sequence switch spring 1532, right winding of relay 1506 to grounded battery. Relay 1506 thereafter remains locked to the contact of relay 1513 over the path which may be traced from grounded battery through the right winding of relay 1506, lower contact of sequence switch spring 1532, winding of relay 1513, right armature and contact of relay 1508 to ground through armature and contact of relay 1513. This prevents the sequence switch 1500 from moving beyond position 13 and thus the non-operation of ringing relay 755 will be indicated to the test man.

Assuming that the ringing relay 755 did properly operate when the described tripping test was connected to the line conductors, relays 1507 and 1513 are not operated and relay 1506 remains under the control of interrupter 1551. It will be remembered that relays 1510 and 1511 are operated and relay 1506 is operated through interrupter 1551. Upon the release of relay 1506 a circuit is established for operating relay 1512 as previously traced. The operation of relay 1512 releases relay 1510. A subsequent operation of relay 1506 under the control of interrupter 1551 establishes a circuit for operating relay 1509 as previously traced and the subsequent release of relay 1506 establishes an operating circuit for relay 1510, as previously traced. Upon the subsequent operation of relay 1506 under the control of interrupter 1551 a circuit is established for actuating sequence switch magnet 1500. This may be traced from grounded battery through the winding of magnet 1500, lower contact of sequence switch spring 1523, left outer contact and armature of relay 1512, right contact and armature of relay 1510, lower contact of sequence switch spring 1524 to ground through left contact and armature of relay 1506. The sequence switch 1500 is thus rotated from position 12 to position 13, releasing relays 1509, 1510, 1511 and 1512. The subsequent release of relay 1506 establishes a circuit for actuating sequence switch magnet 1500. This may be traced from grounded battery through the winding of magnet 1500, lower contact of sequence switch spring 1525 to ground through left normal contact and armature of relay 1506. The sequence switch is thus rotated from position 13 to 14.

Supervisory relay 759, in the incoming selector circuit, Fig. 8, is now tested by the testing device, Fig. 15. The supervisory relay 759 is first saturated by connecting a comparatively high current through its winding so that it will retain considerable residual magnetism during the time it is under test. This is done to simulate a short subscriber's line thereby preparing the supervisory relay 759 for test of its most difficult operating requirement. The circuit established for saturating supervisory relay 759 is in position 14 of sequence switch 1500 and may be traced from grounded battery through the right lower winding of repeating coil 758, winding of relay 759 and resistance 764 in multiple, upper contact of sequence switch spring 714, brush 748, terminal 749, upper contacts of sequence switch spring 805, brush 853, terminal 857, conductor 1503, resistance 1560, upper contact of sequence switch spring 1529, conductor 1502, terminal 859, brush 852, lower contacts of sequence switch spring 802, terminal 747, brush 746, lower contact of sequence switch spring 713, right upper winding of repeating coil 758 to ground. This circuit remains established until relay 1506 is again operated under the control of interrupter 1551. The operation of relay 1506 establishes a circuit for energizing sequence switch magnet 1500 which may be traced from grounded battery through the winding of magnet 1500, upper contact of sequence switch spring 1524 to ground through contact and armature of relay 1506. The sequence switch is thus rotated from position 14 to position 15 and upon a subsequent release of relay 1506, an obvious circuit is established for energizing sequence switch magnet 1500 to rotate the sequence switch from position 15 to position 16.

Upon the rotation of sequence switch 1500 out of position 14, the circuit established for saturating supervisory relay 759 is opened. A circuit of high resistance, however, remains established through the winding of supervisory relay 759, through which it must release. This releasing circuit may be traced from grounded battery, through the right lower winding of repeating coil 758, winding of relay 759 and resistance 764 in multiple, left upper contact of sequence switch spring 714, brush 748, terminal 749, upper contacts of sequence switch spring 805, brush 853, terminal 857, conductor 1503, resistances 1560, 1561, 1562, 1563 and 1564, winding of relay 1513, lower and upper contacts of sequence switch spring 533, conductor 1502, terminal 859, brush 852, lower contacts of sequence switch spring 802, terminal 747, brush 746, lower contact of sequence switch spring 713, right upper winding of repeating coil 758 to ground. Relay 1513 is operated in this circuit.

Relay 1506 is released during the rotation of the sequence switch from position 15 to position 16. A circuit is established in position 16 for again operating relay 1506. This circuit may be traced from grounded battery, through the left winding of relay 1506, to ground through the left upper contact of sequence switch spring 1521. The operation of relay 1506 establishes an obvious circuit for rotating sequence switch 1500 from position 16 to 17.

A circuit is now established in position 17, of sequence switch 1500 for intermittently operating and releasing the supervisory relay 759. The circuit for operating relay 759 may be traced from grounded battery, through the right lower winding of repeating coil 758, winding of relay 759 and resistance 764 in multiple and thence over the talking conductors of the incoming selector of Fig. 8 and the final selector of Fig. 9 to conductor 1503 of testing device Fig. 15, thence through resistances 1560, 1561 and 1562, right lower contact of sequence switch spring 1534, interrupter 1551, left lower contact of sequence switch spring 1528, winding of relay 1513, lower and upper contacts of sequence switch spring 1533, and thence to ground at repeating coil 758 over the tip talking conductors previously traced. Each time interrupter 1551 establishes a circuit through the conducting portion of its commutator, relay 759 is operated. A high resistance circuit is also established in position 17 through which the supervisory relay 759 must release to test its releasing adjustment. This high resistance circuit is the same as previously traced.

*Automatic advance of test control circuit.*

It will be remembered that the sequence switch shown in Fig. 7 is in position 16 awaiting the completion of the test of the incoming selector switch and auxiliary circuits of Fig. 8. Assuming that the supervisory relay 759 is in correct adjustment and that it does operate and release properly, its operation establishes a circuit for operating relay 543 shown in Fig. 7. This circuit may be traced from ground through the contact and armature of relay 759, resistance 724, left upper winding of repeating coil 758, right lower contacts of sequence switch spring 703, terminal 1309, brush 1306, conductor 361 of Figs. 13 and 3, left upper contact of sequence switch spring 309, conductor 271, right normal contact and armature of relay 545, left normal contact and armature of relay 546, left upper contact of sequence switch spring 532, winding of relay 543, right lower contact of sequence switch spring 533, lower contacts of sequence switch spring 536, left inner contact and armature of relay 545, conductor 270, left upper contact of sequence switch spring 310, conductor 364 of Figs. 3 and 13, brush 1305, terminal 1308, upper contact of sequence switch spring 704, left lower winding of repeating coil 758, upper contacts of sequence switch spring 715, resistance 725, left upper contact of sequence switch spring 705, to grounded battery.

The operation of polarized relay 543 establishes a circuit for operating counting relay 3. This circuit may be traced from ground through the right lower contact of sequence switch spring 527, contact and armature of relay 543, lower contact of sequence switch spring 523, conductor 560, conductor 54, normal contact and armature of counting relay 3', winding of counting relay 3, right lower contact of sequence switch spring 531 to grounded battery. The operation of counting relay 3 establishes a locking circuit for itself and an operating circuit for counting relay 3', which is effective upon the release of relay 543. The initial release of supervisory relay 759, as previously described, opens the energizing circuit for polarized relay 543 causing its release. The subsequent operation and release of supervisory relay 759 during a test of said relay intermittently operates and releases relay 543. The intermittent operation and release of relay 543 causes the counting relays 3, 3', 2, 2', 1, 1', SO, SO' and FO to be operated in the well known manner of operating counting relays. The operation of counting relay SO' is not effective in this circuit operation. Since the test of supervisory relay 759 is the last test to be made of the apparatus associated with the incoming selector switch, the circuit established by its contact and armature is used to operate the testing control circuit in such manner as to direct the test selector, Fig. 13, to be connected to the next incoming selector switch to be tested.

The operation of counting relay FO establishes a circuit to operate relay 487, shown in Fig. 5. This circuit may be traced from ground through the armature and contact of counting relay FO, right lower and upper contacts of sequence switch spring 537, right outer normal contact and armature of relay 547, conductor 566, of Figs. 7, 4 and 5, left normal contact and armature of relay 485, winding of relay 487 to grounded battery. Relay 487 establishes a locking circuit for itself which may be traced from grounded battery through its winding, right inner contact and armature, right continuity contacts of relay 483 to ground through left contact and armature of relay 487. Relay 487 in attracting its right outer armature opens the holding circuit for relay 489 to cause its release. This holding circuit is maintained during the test of each incoming selector switch. The release of relay 489 opens the energizing circuit for relay 545 causing its release. Relay 487 further establishes a circuit for operating relay 480. This may be traced from grounded battery through the winding of relay 480, right outer contact and armature of relay 487 to ground through the right upper contact of sequence switch spring 404. It will be remembered in connection with the circuit traced that the sequence switch of Fig. 4 is resting in position 7. The operation of relay 487 further establishes a circuit for energizing sequence switch magnet 520. This may be traced from grounded battery through the winding of magnet 520, left upper contact of sequence switch spring 535, conductor 567 of Figs. 7, 4 and 5, to ground through left contact and armature of relay 487. The sequence switch is rotated from position 16 to 17 under the control of the circuit traced. In positions 17 and 18 a circuit is established for rotating the sequence switch to its normal position 1. This circuit may be traced from grounded battery through the winding of magnet 520, right upper contact of sequence switch spring 535 to ground through the left inner contacts of key 16. Upon the rotation of sequence switch 520 into position 1 a circuit is established to operate relay 459. This circuit may be traced from grounded battery through the right winding of relay 482, Fig. 5, right winding of relay 459, right normal contact and armature of relay 482, lower contact of sequence switch spring 530, Fig. 7, conductor 567 of Figs. 7, 4 and 5 to ground through contact and armature of relay 487. Relay 482 does not operate in the circuit traced on account of the high resistance value of the winding of relay 459. The purpose of establishing the circuit traced the right winding of relay 482 is to build up the magnetism sufficiently to cause it to operate very quickly when a circuit is established through its left winding as hereinafter described. The operation of relay 549 establishes a circuit for updrive magnet 1302 of Fig. 13. This circuit may be traced from grounded battery through the winding of magnet 1302, conductor 349 of Figs. 13 and 3, left upper contact of sequence switch spring 305, conductor 275, upper contact of sequence switch spring 407, left inner contact and armature of relay 480, left lower contact of sequence switch spring 419 to ground through contact and armature of relay 459. The test selector switch elevator, Fig. 13, is now driven in an upward movement thus establishing a holding circuit for relay 459 and an energizing circuit for relay 482. This circuit may be traced from grounded battery through the left winding of relay 482 and from grounded battery through the left winding of relay 459, through the right contact and armature of relay 459, lower contact of sequence switch spring 410, conductor 276, left upper contact of sequence switch spring 304, conductor 343 of Figs. 3 and 13, conducting portion of commutator segment 1313, brush 1310 to ground through lower contact of sequence switch spring 1317. Relay 482 is thus operated and a holding circuit for itself is established from grounded battery through its right winding, contact and armature, lower contact of sequence switch spring 530, Fig. 7, conductor 467 of Figs. 7, 4 and 5 to ground through the left contact and armature of relay 487. Upon further upward movement of the test selector switch elevator, brush 1310 moves from the conducting portion of commutator 1313 to a non-conducting portion of said commutator, opening the holding circuit for relay 459 to cause its release. The release of relay 459 opens the circuit established for energizing the updrive magnet 1302, thus arresting the upward movement of the selector switch elevator. Brushes 1304, 1305 and 1306 are now connected to the terminals associated with the trunk conductors of an incoming selector switch next above the one that has been tested.

The release of relay 459 further establishes a circuit for actuating the winding of relay 483. This circuit may be traced from ground through the left normal contact and armature of relay 459, contact and armature of relay 482, right middle contact and armature of relay 487, winding of relay 483 to grounded battery. The operation of relay 483 establishes a holding circuit for itself which may be traced from grounded battery through its winding and right armature and contact to ground through the left armature and contact of relay 487. This holding circuit is effective until relay 487 is released. The operation of relay 483 also opens the holding circuit for relay 487, causing its release. The release of relay 487 opens the holding circuit for relays 480 and 482 to cause their release.

It will be noted that during the period of time that relay 480 is in an operated position, a circuit is established for energizing test relay 490. This circuit may be traced from grounded battery through the left winding of relay 490 to ground through the left outer contact and armature of relay 480. The operation of relay 490 establishes a circuit through its left contact and armature to operate relay 489 the same as previously described. The operation of relay 489 establishes a locking circuit for itself the same as previously described. Thus, when the test selector, Fig. 13 connects the testing device to the second incoming selector switch to be tested, relay 490 is in an operated position. If the incoming selector switch to be tested is in a busy condition a holding circuit is established for relay 490, the same as previously described. If the incoming selector switch to be tested is idle, relay 490 is released and the test of the incoming selector switch and its auxiliary circuits will proceed as previously described.

*Release of incoming selector switch upon advance of test control circuit.*

It will be remembered that relay 721 shown in Fig. 8 is held in an operated position to the busy ground traced from sequence switch spring 406 through right normal contact and armature of relay 490 to terminal 1307. Therefore, upon the operation of relay 490 the energizing circuit for relay 721 is opened causing its release. The release of relay 721 establishes an energizing circuit for sequence switch magnet 700. This may be traced from grounded battery through the winding of magnet 700, left upper contact of sequence switch spring 706 to ground through the left inner normal contact and armature of relay 721. This circuit remains established throughout sequence switch positions 16 and 17, thus rotating the sequence switch into position 18. In sequence switch position 18 a circuit is established for down drive magnet 761. This circuit may be traced from grounded battery through the winding of magnet 761, to ground through the right upper and lower contacts of sequence switch spring 710. The incoming selector switch elevator is thus returned to its normal resting position and brush 741 is brought into engagement with commutator segment 763. A circuit is now established for actuating sequence switch magnet 700 to rotate the sequence switch to its normal position 1. This circuit may be traced from grounded battery through the winding of magnet 700, right upper contact of sequence switch spring 706, commutator segment 763, brush 741 to ground through lower contact of sequence switch spring 710.

*Release of final selector switch.*

It will be remembered that relay 821 of Fig. 9 has been held in an actuated position over the sleeve conductor extending to ground at sequence switch spring 712; the rotation of the incoming selector sequence switch to its normal position opens the energizing circuit for relay 821 causing its release. The release of relay 821 establishes an energizing circuit for relay 818. This circuit may be traced from grounded battery through the left winding of relay 818, upper contacts of sequence switch spring 809 to ground through the right contact and armature of relay 821. The operation of relay 818 establishes an energizing circuit for sequence switch magnet 800 which may be traced from grounded battery through the winding of magnet 800, lower contact of sequence switch spring 812, left contact and armature of relay 818 to ground through upper contact of sequence switch spring 808. The sequence switch is rotated from position 15 to position 16 and in thus rotating opens the operating circuit for relay 818 causing its release. The release of relay 818 establishes an energizing circuit for sequence switch magnet 800 which may be traced from grounded battery through the winding of magnet 800, right upper contact of sequence switch spring 812, left normal contact and armature of relay 818 to ground through upper contact of sequence switch spring 808. The sequence switch is rotated from position 16 to position 17 and thus an obvious circuit is established for rotating the sequence switch into position 18. A circuit is now established for down drive magnet 844 which may be traced from grounded battery through the winding of magnet 844, lower contact of sequence switch spring 811, right upper contact of sequence switch spring 807 to ground through left upper contact of sequence switch spring 827. The final selector switch elevator is thus returned to its normal position and brush 838 is brought into engagement with commutator segment 847 to establish a circuit for energizing sequence switch magnet 800. This circuit may be traced from grounded battery through the winding of magnet 800, left upper contact of sequence switch spring 812, commutator segment 847, brush 838 to ground through left upper contact of sequence switch spring 827. The final selector sequence switch is now rotated to its normal position 1.

*Release of auxiliary testing device.*

The downward movement of the final selector switch elevator disengages brush 842 from terminal 843 removing the holding circuit from relay 1505 to cause its release. The release of relay 1505 establishes an energizing circuit for sequence switch magnet 1500 which may be traced from grounded battery through the winding of magnet 1500, upper contact of sequence switch spring 1523, right normal armature and contact of relay 1505 to ground through the lower contact of sequence switch spring 1521. This circuit remains established through sequence switch position 18 and the sequence switch is thus rotated to its normal position 1.

The incoming selector switch shown in Fig. 8 has now been tested and returned to normal so that it may again be used in service. The final selector switch shown in Fig. 9 has been used to associate the incoming selector switch with the auxiliary testing device connected to the terminals of the final frame and after the completion of tests, said final selector switch is returned to its normal position so that it may again be used in service. The auxiliary testing device connected to the final frame is also returned to its normal position so that it may again be used to test other incoming selector switches.

The test of one incoming selector switch and its auxiliary circuits is now completed and upon said completion of tests, apparatus is automatically operated to control the advance of the test selector switch, Fig. 13, to the incoming selector switch next above the incoming selector switch tested. Upon the completion of the test of a second incoming selector switch the test selector is again automatically advanced to a third incoming selector switch to be tested. Thus, the testing control circuit and the auxiliary testing circuit connected to the final frame cooperate in their action to automatically test the incoming selector switches connected to the terminals in a sub-group of a bank of terminals.

As brought out in the general description, a panel of terminals connected to incoming switches is divided into groups and above each group is a set of terminals known as the overflow. The commutator segment 1314 is correspondingly equipped with a conducting segment known as the overflow. In service the selector switch when hunting an idle trunk stops upon reaching the overflow terminal. In automatic testing it is desirable to advance the switch such as shown in Fig. 13 from one sub-group of terminals to the next above without restoring the elevator to normal.

When the incoming selector switches connected to the terminals of a group have been tested, the test selector switch is advanced to the overflow terminals in the manner described for advancing the test selector switch from the first to the second incoming selector switch tested. A circuit is thus established for energizing relay 460 shown in Fig. 5. This circuit may be traced from grounded battery, through the winding of relay 460, upper and lower contacts of sequence switch spring 414, brush 454 and its associated contact, conductor 287, left upper contact of sequence switch spring 302, conductor 331 of Figs. 3 and 13, conducting portion of commutator segment 1314, brush 1311 to ground through the lower contact of sequence switch spring 1317. The operation of relay 460 establishes a circuit to energize the selector control switch magnet 450. This circuit may be traced from grounded battery through the resistance 497, winding and contacts of magnet 450, lower contacts of sequence switch spring 408, brush 452 and its associated contact to ground through left outer contact and armature of relay 460. The selector control switch now steps to the next position where the energizing circuit through its magnet is opened arresting its forward movement. The energizing circuit for relay 460 is also opened causing its release. The release of relay 460 establishes a circuit for operating relay 487. This circuit may be traced from grounded battery through the winding of relay 487, right normal contact and armature of relay 485, right outer contacts of key 495, brush 453 and its associated contact, lower contacts of sequence switch spring 418 to ground through left outer normal contact and armature of relay 460. Relay 487 in attracting its right inner contact establishes a locking circuit for itself which may be traced from grounded battery through its winding and right inner contact and armature, right normal continuity contact of relay 483 to ground through left contact and armature of relay 487. The operation of relay 487 further establishes an energizing circuit for relay 480. This circuit may be traced from grounded battery through the winding of relay 480, right outer contact and armature of relay 487 to ground through right upper contact of sequence switch spring 404. The operation of relay 480 establishes an energizing circuit for relay 490. This circuit may be traced from grounded battery through the left winding of relay 490 to ground through the left outer contact and armature of relay 480. The purpose of relay 490 will be hereinafter described. The operation of relay 487 further establishes a circuit for energizing relay 459. This circuit may be traced from grounded battery through the right windings of relays 482 and 459, right normal contact and armature of relay 482, lower contact of sequence switch spring 530, conductor 567 of Figs. 7, 4 and 5 to ground through left contact and armature of relay 487. The operation of relay 459 establishes an energizing circuit for updrive magnet 1302. This may be traced from ground though the left armature and contact of relay 459, left lower contact of sequence switch spring 419, left inner contact and armature of relay 480, upper contact of sequence switch spring 407, conductor 275, left upper contact of sequence switch spring 305, conductor 349 of Fig. 3 and Fig. 13, winding of updrive magnet 1302 to grounded battery. The test selector elevator is thus driven upward to bring brush 1310 into engagement with the conducting portion of commutator segment 1313. An energizing circuit is thus established for relay 482 and a holding circuit established for relay 459. This circuit may be traced from grounded battery through the left windings of relays 482 and 459 in multiple, right contact and armature of relay 459, lower contact of sequence switch spring 410, conductor 276, left upper contact of sequence switch spring 304, conductor 343 of Figs. 3 and 13, conducting portion of commutator segment 1313, brush 1310 to ground through lower contact of sequence switch spring 1317. The operation of relay 482 establishes a locking circuit for itself which may be traced from grounded battery through its right winding, contact and armature, lower contact of sequence switch spring 530, conductor 567 of Figs. 7, 4 and 5 to ground through left contact and armature of relay 487. Relay 482 in attracting its left armature establishes a circuit not effective until the release of relay 459. Upon further upward movement of the test selector elevator, brush 1310 becomes disengaged from the conducting portion of commutator segment 1313. The holding circuit for relay 459 is thus opened to cause its release. The release of relay 459 establishes an energizing circuit for relay 483. This circuit may be traced from grounded battery through the winding of relay 483, right middle contact and armature of relay 487, left armature and contact of relay 482 to ground through left normal contact and armature of relay 459. Relay 483 in operating establishes a holding circuit for itself which may be traced from grounded battery through its winding and right contact and armature to ground, through the left contact and armature of relay 487. The operation of relay 483 also opens the holding circuit for relay 487 causing its release. The release of relay 487 opens the holding circuit for relay 482 and the energizing circuit for relay 480 to cause their release. The operation of relay 483 further establishes a circuit to energize selector control switch magnet 450. This circuit may be traced from grounded battery through resistance 497, winding and contacts of magnet 450, lower contacts of sequence switch spring 408, brush 452 and its associated contacts, left inner normal contact and armature of relay 460 to ground through left contact and armature of relay 483. The selector control switch is thus rotated one position where it remains until the incoming selector switches connected to the second group of terminals are tested.

The upward movement of the test selector switch elevator, described in the previous paragraph, positions the brushes 1304, 1305 and 1306 on the terminals connected to the first incoming selector switch of the second group. It will be remembered that the operation of relay 480 establishes an energizing circuit for relay 490. The operation of relay 490 establishes an energizing circuit for relay 489. This may be traced from grounded battery through the winding of relay 489, left contact and armature of relay 490, brush 455 and its associated contact, to ground through left middle contact and armature of relay 460. Relay 489 in operating establishes a locking circuit for itself which may be traced from grounded battery through its winding and right contact and armature, right outer normal contact and armature of relay 487 to ground through right upper contact of sequence switch spring 404.

It will be noted that upon the release of relay 480 the energizing circuit for relay 490 is opened. It will also be noted that the release of relay 480 occurred subsequent to the positioning of the test selector switch brushes upon the terminals of the first incoming selector switch of the second group. Therefore, when the energizing circuit for relay 490 is disestablished, it will release unless the holding circuit has been established through its right winding to the sleeve terminal 1307 of the incoming selector switch to be tested. If said incoming selector switch is busy this holding circuit is the same as previously traced. Assuming that the first incoming selector switch of the second group is in a non-busy condition, relay 490 releases to establish a circuit for relay 545, shown in Fig. 7. The control and test of the first incoming selector switch and auxiliary circuit associated therewith now proceeds the same as previously described and upon the completion of said test, the test selector switch, Fig. 13, is advanced to the second incoming selector switch of the second group. In this manner the incoming selector switches connected to the second group of terminals are tested and the test selector switch, Fig. 13, is advanced to the overflow terminals above said second group.

It will be remembered that the selector control switch 449 is initially positioned to engage brush 451 with conductor 431 in position 3 of said switch and that when thus positioned nine groups of incoming selector switches are tested without returning the test selector switch elevator, Fig. 13 to its normal position. The test selector switch elevator is directed to the first incoming selector switch in the first group and advances in single steps including intermediate overflow terminals as previously described, until the incoming selector switches connected to the nine groups of terminals have been tested and the test selector switch, Fig. 13, is resting upon the overflow terminals above the ninth group of terminals.

As the automatic testing and advance of the test selector switch progresses, the selector control switch 449 is advanced two positions each time an overflow terminal is encountered. This is done in the manner described in connection with advancing the test selector switch from the overflow terminals above the first group tested to the first terminals of the group above. From this it will be noted that when the test selector switch is brought to rest upon the overflow terminals above the ninth group of terminals the selector control switch 449 is resting in position 19.

Circuits are now established to return the test selector switch elevator, Fig. 13, to its normal position and to advance the register switch 70 to its second position to automatically direct the control of a second series of tests, including the resetting of the selector control switch 449 to control the number of groups tested.

A circuit is first established to operate relay 460. This may be traced from grounded battery through the winding of relay 460, upper and lower contacts of sequence switch spring 414, brush 454 and its associated contact, conductor 278, right upper contact of sequence switch spring 302, conductor 321, Figs. 3 and 13, conducting portion of commutator segment 1314, brush 1311 to ground through lower contact of sequence switch spring 1317. The operation of relay 460 establishes an energizing circuit for switch magnet 450. This may be traced from grounded battery through resistance 497, winding and contacts of magnet 450, lower contacts of sequence switch spring 408, brush 452 and its associated contact to ground through the left outer contact and armature of relay 460. Switch 449 is now rotated from position 19 to position 20 and in thus rotating opens the actuating circuit for relay 460, causing its release. The release of relay 460 establishes a circuit to energize sequence switch magnet 400. This circuit may be traced from grounded battery through the winding of magnet 400, brush 423 and its associated contact, lower contacts of sequence switch spring 418 to ground through left outer contact and armature of relay 460. The sequence switch, Fig. 4, is thus rotated from position 7 to position 8. A circuit is now established to energize the down-drive magnet 1310 which may be traced from grounded battery through the winding of downdrive magnet 1301, conductor 355 of Figs. 13 and 3, left upper contact of sequence switch spring 307, conductor 273, left lower contact of sequence switch spring 405 to ground. The test selector switch, Fig. 13, is returned to its normal position and brush 1312 is brought into engagement with commutator segment 1316 to establish an energizing circuit for sequence switch magnet 400. This circuit may be traced from grounded battery through the winding of magnet 400, right upper contact of sequence switch spring 416, conductor 272, left upper contact of sequence switch spring 308, conductor 358, Fig. 3 and Fig. 13, commutator segment 1316, brush 1312 to ground through lower contact of sequence switch spring 1317. The sequence switch, Fig. 4, is now rotated from position 8 to position 9. In sequence switch position 9 a circuit is established to energize the register switch magnet 71 of Fig. 2. This circuit may be traced from grounded battery through the winding of magnet 71, left inner normal contact and armature of relay 61, upper contacts of sequence switch spring 413 to ground through right inner contacts of key 17. The register switch 70 is thus advanced one terminal where it will remain to control the second series of tests of incoming selector switches. Also in sequence switch position 9 a circuit is established to energize the selector control switch magnet 450. This circuit may be traced from grounded battery through resistance 497, winding and contacts of magnet 450, lower contacts of sequence switch spring 408, brush 452 and its associated contact to ground through right lower contact of sequence switch spring 404. This circuit remains established until the selector control switch 449 is returned to its normal starting position, where a circuit is established for energizing sequence switch magnet 400. This circuit may be traced from grounded battery through the winding of magnet 400, brush 453 and its associated normal contact, lower contacts of sequence switch spring 418 to ground through the left outer normal contact and armature of relay 460. The sequence switch shown in Fig. 4 is now rotated from position 9 to position 10 and from position 10 to position 1 under the control of the magnet contact.

The apparatus of the testing device is now prepared for a new setting to test the incoming selector switches connected to a second series of groups of terminals. The control of this setting is the same as described with register switch 70 in position 1.

One test selector such as that shown in Fig. 13 is used to associate the testing control device with all of the incoming selector switches to be tested in a panel. As previously described a panel constitutes a plurality of banks and a bank constitutes a plurality of groups. Therefore, the test selector switch elevator will be directed upward and returned to normal a number of times during the test of the incoming selector switches connected to the terminals of a panel. Each time it is driven upward a number of groups of incoming selector switches are tested. It will be noted on terminal strip 98 that a plurality of the individual terminals are connected to one conductor such as those connected to conductor 75. As previously described, register 82 controls the positioning of connector 300 and connector 200 so that during the time register switch 70 is rotating through a series of positions associated with terminals connected to a single conductor the connector switch 300 or 200 remains positioned in accordance with such control and the same test selector switch will be directed upward from normal, the number of times equal to the number of positions transversed by the register switch 70.

The cross-connecting diagram shown in Fig. 2 indicates that one test selector switch is used during the rotation of register swtch 70 from position 1 to position 5, inclusive, and when the register switch is rotated to position 6, connector 300 is rotated to a position where a second test selector switch is associated with the testing control device. The circuit for controlling connector 300 may be traced from grounded battery through the winding of sequence switch magnet 301, left upper contact of sequence switch spring 323, conductor 66 of Figs. 3, 1 and 2, terminal strip 98, brush and contact of register 82, left outer contacts of key 17, left normal contacts of key 18, left inner contacts of relay 40 which is held in an operated position, to ground through the left inner normal contacts of relay 39. The sequence switch of connector 300 is thus rotated from position 3 to position 4. A circuit is also established to energize relay 326 in multiple with sequence switch magnet 301. This circuit may be traced from the ground established for actuating the winding of sequence switch magnet 301 through the winding of relay 326 to grounded battery in position 3 of the upper contact of sequence switch spring 320. Relay 326 in operating establishes a circuit for relay 325 which may be traced from grounded battery through the winding of relay 325, lower contacts of sequence switch spring 318 to ground through the left middle contact and armature of relay 326. A locking circuit for relay 325 is established from grounded battery through its winding, left contact and armature, right lower contact of sequence switch spring 324 and thence to the operating ground for relay 326. The purpose of relay 325 is to establish a circuit to test the condition of the test selector switch upon a synchronized positioning of the register switch 70 and the connector switch 300. Upon the rotation of connector switch 300 from position 3 to position 4 the energizing circuit for relay 326 is opened, causing its release.

In position 4 of connector 300 the testing control device is associated with the test selector shown in Figs. 11 and 12. This test selector is what is known as a line finder district and differs in many respects from the line switch district shown in Fig. 13. In order to employ either a line switch district or a line finder district as a test selector a universal circuit is shown in this testing device to test either of these circuits to ascertain whether they are in a busy or idle condition and thereafter to associate them with the testing device.

A circuit is first established by the testing device to ascertain whether the line finder selector switch, Figs. 11 and 12, are in a busy or non-busy condition. On account of the dual operation in this selector switch, the function of testing its condition is more complicated than that described for testing the condition of the line switch district shown in Fig. 13. Since Patent 1,461,528, issued on July 10, 1923, to Frank S. Irvine describes the detailed operation of the selector switch and an associated auxiliary circuit shown on Figs. 11 and 12, a detailed operation will not again be covered in this description. A circuit is first established to energize the left winding of relay 1218, shown in Fig. 11. This circuit may be traced from grounded battery through the left winding of relay 1218, conductor 346, Figs. 12 and 3, right upper contact of sequence switch spring 314, conductor 281, winding of relay 488 to ground. Relay 488 and 1218 are operated in the circuit traced. The operation of relay 1218 establishes a lockout circuit to prevent the test selector switch Figs. 11 and 12, from seizure by a service connection during the time that it is used by the testing device. If the test selector is busy when an attempt is made by the testing device to seize it, relay 1218 will be in an operated condition from an energizing source established by a service connection and therefore the circuit established by the testing device, as described will have no effect upon relay 1218 excepting to maintain it in an operated position when it is released from said service connection. The operation of relay 488 is employed as an automatic signal to the testing device that it has been associated with a line finder district to be used as a test selector. In attracting its armature, a circuit is established for energizing relay 484. This circuit may be traced from grounded battery through the right winding of relay 484 to ground through the armature and contact of relay 488. The operation of relay 484 opens at its right contact and armature a circuit extending through the line switch district and and establishes at its outer left contact and armature a circuit for testing the condition of a line finder district selector.

As previously described, the movement of the register switch 70 occurred when the sequence switch, shown in Fig. 4, rotated into position 9 and upon the arrival of this sequence switch in position 1 a circuit is established to operate relay 62, shown in Fig. 2. This circuit may be traced from grounded battery through the winding and contacts of register switch magnet 71, left outer normal contacts of relay 61, winding of relay 62, lower contact of sequence switch spring 420 to ground through right inner contacts and armature of relay 470. Register switch magnet 71 does not operate in the circuit traced on account of the high resistance of relay 62. Relay 63 is already in an operated position so that relay 62 in attracting its right outer armature does not effect a change. Relay 62 in attracting its right inner armature establishes circuits for operating relays 458 and 457.

The circuit for operating relay 457 may be traced from grounded battery through the right inner armature and contact of relay 62, conductor 290 of Figs. 4 and 3, right contact and armature of relay 325, left outer normal contact and armature of relay 326, conductor 291, winding of relay 457, conductor 272, left upper contact of sequence switch spring 308, conductor 357 of Figs. 3 and 12, commutator segment 1216, brush 1212 to ground. The operation of relay 457 opens the short circuit around the winding of relay 481. The purpose of operating relay 457 is for assurance that the testing selector switch elevator, Fig. 12, is in its normal resting position. If it is not in its normal resting position, brush 1212 is not in engagement with segment 1216 and an energizing circuit is not established to operate relay 457. The testing control device then awaits the restoration of the test selector switch to normal. The circuit for energizing relay 458 may be traced from the grounded battery through right inner contact and armature of relay 63, conductor 290 of Fig. 4 and Fig. 3, right contact and armature of relay 325, left outer normal contact and armature of relay 326, conductor 291, lower contact of sequence switch spring 417, winding of relay 458, resistance 440 to ground.

Relay 458 is slow in operating to allow a period of time for a dual operation of the test selector, Figs. 11 and 12. This dual operation occurs when the test selector is seized for a service connection just previous to an attempted seizure by the testing control device. Relay 1218 may have been operated by seizure from a service connection. The operation of relay 1217 characterizes the line finder selector switch as busy to the testing device, and a period of time elapses between the operations of relay 1218 and relay 1217. The operation of relay 458 establishes a circuit to operate test relay 481. This circuit may be traced from grounded battery through the armature and contact of relay 458, left outer contact and armature of relay 484, left winding of relay 481 to ground.

The operation of test relay 481 establishes an energizing circuit for sequence switch magnet 400. This circuit may be traced from grounded battery through the winding of magnet 400 lower contact of sequence switch spring 416, left contact and armature of relay 481 to ground through right inner contacts of key 16. The sequence switch, Fig. 4, is thus rotated from position 1 to position 2 and in thus rotating the energizing circuit for relay 458 is opened to cause its release. The release of relay 458 opens the energizing circuit traced through the left winding of test relay 481. If the test selector Figs. 11 and 12, is in a busy condition, a circuit is established through the right winding of relay 481 to maintain it in an operated condition. This circuit may be traced from grounded battery through the right inner armature and contact of relay 62, conductor 290, right contact and armature of relay 325, left normal outer contact and armature of relay 326, conductor 291, upper contact of sequence switch spring 417, upper contact of sequence switch spring 411, right winding of relay 481, right outer and inner contacts and armatures of relay 481, conductor 279, right upper contact of sequence switch spring 312, resistance 328, conductor 334 of Figs. 3, 12 and 11, to ground through the left inner contact and armature of relay 1217.

When the test selector switch, Figs. 11 and 12, is in an idle condition, relay 1217 is not operated, therefore, a circuit will not be established through the right winding of relay 481 and it will release. During the operation of relay 481 a circuit is established to light lamp 491 which may be traced from grounded battery through resistance 492, lamp 491, left contact and armature of relay 481 to ground through the right inner contacts of key 16. The purpose of lamp 491 is to indicate that the testing device is connected to a busy test selector since relay 481 will remain operated until the test selector becomes idle. The release of relay 481 extinguishes lamp 491 and opens the holding circuit for relay 484, causing its release. The release of relays 481 and 484 establishes a circuit for maintaining relay 1218 in an operated condition to lockout seizure by service selectors. This circuit may be traced from ground through the right lower contact of sequence switch spring 403, right outer contact and armature of relay 481, right contact and armature of relay 484, conductor 280, left upper contact of sequence switch spring 313, conductor 340 of Figs. 3, 12 and 11, winding of relay 1218 to grounded battery. The release of relay 481 further establishes a circuit to energize the sequence switch magnet 400. This circuit may be traced from grounded battery through the winding of magnet 400, left upper contact of sequence switch spring 416, left contact and armature of relay 481 to ground through the right inner contacts of key 16. The sequence switch shown in Fig. 4 is now rotated from position 2 to position 3.

In position 3 of the sequence switch shown in Fig. 4, a circuit is established to rotate connector 300 from position 4 to position 5. This circuit is the same as traced to rotate the connector 300 from position 2 to position 3. The test selector switch, Figs. 11 and 12, is now controlled in a manner described for the control of the test selector, Fig. 13. The operation of the testing control device is also the same as previously described for the initial test and the test of the incoming selector switches connected to the terminals of a second frame is started.

The test selector switch, Figs. 11 and 12, have access to all incoming selector switches terminating on the terminals of the banks in a panel and is automatically and successively associated with said incoming selector switches by the testing control device in cooperation with the auxiliary testing device shown in Fig. 15.

During the test of the incoming selector switches associated with this panel, register switch 70 progresses from position 6 to position 11 and upon completion of said tests rotates to position 12.

In position 12 of the register switch 70, a circuit is established to energize sequence switch magnet 301 of connector 300. This circuit may be traced from grounded battery through the winding of magnet 301, right lower contact of sequence switch spring 323, conductor 67 of Figs. 3, 1 and 2, terminal strip 98, register brush 82 and its associated contact left outer contacts of key 17, left normal contacts of key 18, left inner contact and armature of relay 40 to ground through left inner normal contacts of relay 39. The connector switch 300 is rotated from position 5 to position 6.

In position 6 of the connector 300, a test selector switch is associated with the testing control circuit. This test selector switch is known as an office selector switch and is fully described in Patent No. 1,395,977, issued November 1, 1921 to Franklin A. Stearn and Frederick J. Scudder. The office selector switch, Fig. 14, when used as a test selector is tested by the testing control device for busy or non-busy conditions in the same manner as described for the test of the busy or non-busy condition of the district selector switch, Fig. 13. It is also seized and controlled from the testing control device in the same manner as that described for the district selector switch, Fig. 13.

When the office selector switch is found to be idle and has been seized by the testing control device, connector 300 is rotated to position 7 in the same manner as previously described and remains in position 7 during the time that the office selector, Fig. 14, is used as a test selector. The office selector switch is directed to the first incoming selector switch to be tested in the panel to which it has access. After the office selector switch Fig. 14 has tested the incoming selector switches to which it has access, it is returned to normal and the apparatus of the testing control circuit advanced to a fourth test selector. Accordingly, the register switch 70 is advanced from position 12 to position 13.

In position 13 of the register switch 70 a circuit is established to return connector 300 to its normal position. This circuit may be traced from grounded battery through the winding of sequence switch magnet 301, upper contacts of sequence switch spring 321, conductor 292 of Figs. 3, 1 and 2, terminal strip 98, register brush 82 and its associated contact left outer contacts of key 17, left normal contacts of key 18, left inner contact and armature of relay 40 to ground through left inner normal contacts of relay 39. Connector 300 is thus rotated from position 7 to position 8 under the control of the circuit traced and from position 8 to position 1 under the control of the sequence switch magnet contact. With connector 300 in position 1 a circuit is established to actuate sequence switch magnet 201 of connector 200. This circuit may be traced from grounded battery through the winding of magnet 201, left upper contact of sequence switch spring 223, lower and left upper contacts of sequence switch spring 321, and thence over conductor 292 to ground as previously traced. Connector 200 is thus rotated from position 1 to position 2.

In position 2 of connector 200, a test selector switch is connected to the testing control device in the same manner as previously described for connector 300 and the various synchronizing and testing features are also the same as previously described. When it is determined that the test selector is idle, connector 200 is rotated to position 3 and the test selector is then controlled to associate various incoming selector switches with the testing control device. During the time that the connector 200 is thus associated, register switch 70 rotates from position 13 to position 19. In position 19 of register switch 70 a circuit is established to rotate the switch to position 21. This circuit may be traced from grounded battery through switch magnet 71 and its associated contacts, left outer normal contact and armature of relay 61, register brush 72 and its associated contacts in positions 19 and 20 to ground. The rotary movement of the register switch 70 is thus arrested in position 21.

In position 21 of register switch 70 a circuit is established for operating relay 61. This circuit may be traced from grounded battery through the winding of relay 61, register brush 82 and its associated contact, left outer contacts of key 17, left normal contacts of key 18, left inner contact and armature of relay 40 to ground through left inner normal contacts of relay 39. Relay 61 in operating establishes a locking circuit for itself which may be traced from grounded battery through its winding and right inner contact and armature, right inner contact and armature of relay 40, left normal contacts of key 18, left inner contact and armature of relay 40 to ground through left inner normal contacts of relay 39. The purpose of relay 61 is to transfer the control leads from register switch 70 to register switch 85 so that the automatic test may proceed by rotating register switch 85 from test to test as described for register switch 70. Relay 61 in addition to transferring the control leads establishes a start circuit for register switch 85. This may be traced from grounded battery through the winding and contacts of register magnet 86, left outer contact and armature of relay 61, register brush 72 and its associated contact in position 21, register brush 87 and its associated normal contact to ground through right outer contact and armature of relay 61. Register switch 85 is thus rotated from its normal position to position 1. In position 1 of register 85, connector 200 is rotated from position 3 to position 4 in the same manner as described for previous rotary movements of connectors. A different test selector switch is now tested and seized for use in a series of tests of incoming selector switches.

As the test of the incoming selector switches progresses in this panel, register switch 85 is advanced in the same manner as that described for advancing register switch 70 and thus register switch 85 is advanced to position 6 where a circuit is established to test and seize a different test selector switch. This is done in the same manner as previously described by rotating connector 200 into position 6 and upon the completion of tests in that panel, register switch 85 is rotated to position 12.

In position 12 of register switch 85 a circuit is established to return the register switch to normal. This circuit may be traced from grounded battery through the winding and contacts of register magnet 86, left outer contact and armature of relay 61, register brush 72 and its associated contact in position 12, register brush 87 and its associated contacts to ground. Register switch 85 is thus rotated from position 12 to position 21. It will be noted that whenever a cross-connection is omitted a ground is connected to the terminals associated with register brushes 72 or 87 so that the register switch will rotate under the control of its self-interrupting contact.

When register 85 has arrived in position 12, a test of all of the incoming selector switches of the office have been tested by this automatically operated testing device. Therefore, a signal is lighted to so advise the maintenance man attending to this duty. A circuit is established for lighting lamp 49, shown in Fig. 1. This circuit may be traced from grounded battery through lamp 49, register brush 97 and its associated contact, left outer contacts of key 17, left normal contacts of key 18, left inner contact and armature of relay 40 to ground through left inner normal contacts of relay 39.

Upon reaching this point of operation the switches shown in Figs. 7, 5 and 4 are returned to normal and the relays shown in these figures are released. The incoming selector switch under test has been released and the test selector switch returned to normal. Connector 200 remains in position 7 and register switches 70 and 85 remain in position 21. Upon noting the lighting of lamp 49, the maintenance man may do one of two things—operate key 18 or restore keys 16 and 17.

The operation of key 18 starts the testing control circuit on a new cycle of tests to retest all of the incoming selector switches of the office. The holding circuit for relay 61 is opened causing its release. The release of relay 61 establishes a circuit for rotating register switch 85 to normal. This may be traced from grounded battery through the winding and contact of register magnet 86, left middle normal contact and armature of relay 61, register brush 93 and its associated contact, to ground through left inner contacts of key 14. Register switch 85 is thus rotated from position 21 to its normal position. A circuit is also established for restoring the register 70 to its normal position. This circuit may be traced from grounded battery through the winding and contacts of register magnet 71, left outer normal contact and armature of relay 61, register brush 72 and its associated contact in position 12, left contacts of key 18, through the left inner contact and armature of relay 40 to ground through the left inner normal contacts of relay 39.

Key 18 is now released by the maintenance man and register switch 70 is started on a new cycle of tests, the same as previously described.

Upon the completion of one cycle of tests, it may be desirable to terminate the testing of incoming selectors and therefore with register switches 70 and 85 resting in position 21 and connector 200 resting in position 7, keys 16 and 17 are restored to normal and key 15 is operated. The operation of key 15 establishes an obvious circuit for energizing the winding of relay 39. The circuits established by the operation of relay 39 will be described later. The restoring of key 17 establishes a circuit for energizing the winding of sequence switch magnet 201. This circuit may be traced from grounded battery through the winding of magnet 201, right lower contact of sequence switch spring 223, upper contact of sequence switch spring 401 to ground through right inner contacts of key 17. Connector 200 will now be rotated from position 7 to position 8 under the control of the circuit traced and from position 8 to position 1 under the control of the sequence switch magnet contact. The rotation of connector 200 out of position 7 opens the holding circuit for start relay 470, causing its release. The release of start relay 470 now opens the holding circuit for relay 63 causing its release. The release of relay 63 opens the holding circuit for relay 40 to cause its release. The release of relay 40 now opens the holding circuit for relay 61 to cause its release. The release of relay 61 establishes a circuit to restore register 85 to normal. This circuit may be traced from grounded battery through the winding and contacts of register magnet 86, left middle contact and armature of relay 61, register brush 93 and its associated contact, to ground through left inner contacts of key 14.

Key 15 is now restored to normal and a circuit is thus established to restore register 70 to normal. It will be noted that a locking circuit for relay 39 is established through the contacts of register 70 in position 21 so that relay 39 does not release upon the restoration of key 15. This locking circuit may be traced from grounded battery through the winding and right inner contact and armature of relay 39, register brush 78 and its associated contact to ground through left inner contact of key 14. The circuit established for restoring register 70 to normal may be traced from grounded battery through the winding and contacts of register magnet 71, left outer contact and armature of relay 61, register brush 73 and its associated contact, right upper contact and armature of relay 39 to ground through the left inner normal contacts of key 15. Register switch 70 in restoring to its normal position opens the holding circuit for relay 39, thus causing its release. The testing control device is now completely restored to normal.

*Automatic timing circuit.*

An auxiliary circuit for timing the operation of the testing control device and timing the test of the incoming selector switch is shown in Fig. 6. The timing circuit shown in Fig. 6 is continuously in operation at all times after the start keys 16 and 17 are actuated. The initial circuit established for actuating the timing device, Fig. 6, energizes relay 505. This circuit may be traced from grounded battery through the winding of relay 505, brush 504 and its associated contact in its normal position, left contacts of key 509, right outer normal contact and armature of relay 545 to ground through right outer contacts of key 17. Relay 505 in operating establishes a locking circuit for itself which may be traced from grounded battery through its winding and right armature and contact, left contacts of key 509 and thence to ground at key 17 over the circuit traced for the operation of relay 505. Relay 505 in operating also establishes a circuit to energize the winding of switch magnet 500. This may be traced from grounded battery through the winding of magnet 500, brush 502 and its associated contact, left inner contact and armature of relay 505, conducting portion of interrupter 506 to ground. Interrupter 506 is constantly rotating and therefore the circuit traced is intermittently established and disestablished to energize and deenergize magnet 500. Each energization and deenergization of magnet 500 rotates switch 570 one step in the well known manner of operating step-by-step switches. A predetermined time interval is allowed for switch 570 to rotate one cycle. This time interval is dependent upon the speed of interrupter 506. It is, however, regulated to allow sufficient time for the testing control circuit to advance to the point of seizing a test selector such as shown in Figs. 11, 12, 13 or 14, and seizing an incoming selector switch to be tested.

It will be remembered that upon the seizure of an incoming selector switch and the release of test relay 490, a circuit is established for actuating relay 545, shown in Fig. 7. The operation of relay 545 is the start relay for actuating apparatus to control the test of the incoming selector switch shown in Fig. 8. If timing switch 570 rotates to position 21 previous to the operation of relay 545 a circuit is established to actuate bell 518 to notify the maintenance man that an unstandard condition exists in the testing control device. This circuit may be traced from ground through the left outer armature and contact of relay 505, brush 503 and its associated contact in position 21, lamp 517, alarm bell 518 to grounded battery. It will be noted that in position 21 of switch 570 the control circuit for actuating switch magnet 500 is opened. The switch therefore stands in position 21 to retain the alarm circuit established until the attention of an attendant is attracted. The operation of key 509 by an attendant opens the holding circuit for relay 505, thus causing its release. The release of relay 505 establishes an energizing circuit for switch magnet 500 which may be traced from grounded battery through the winding and contacts of magnet 500, brush 501 and its associated contact in position 21 to ground through the left outer normal contact of relay 505. The operation of key 509 also establishes an operating circuit for relay 507 which is not effective in the circuit traced. It will be noted that upon the release of key 509 and the restoring to normal of switch 570, a circuit is again established to operate relay 505 unless the start key 17 is restored to normal. The operation of relay 505 controls a second rotation of timing switch 570 and the alarm is again sounded unless the unstandard condition is properly cared for.

Assuming that relay 545 is operated previous to the rotation of timing switch 570 to the position of the alarm circuit, the holding circuit for relay 505 is opened to cause its release. The release of relay 505 establishes a circuit for rotating switch 570 to normal. This circuit may be traced from grounded battery through the winding and contacts of switch magnet 500, brush 501 and its associated contacts to ground through the left outer normal contact and armature of relay 505. Switch 570 is thus returned to its normal position.

The operation of relay 545 further establishes a circuit to energize relay 573. This circuit may be traced from grounded battery through the winding of relay 573, brush 514 and its associated contact, left normal contact and armature of relay 507, left lower contact of sequence switch spring 508, right outer contact and armature of relay 545 and thence to ground at key 17. The operation of relay 573 establishes a locking circuit for itself from grounded battery through its winding and right inner contact and armature to ground over its energizing circuit previously traced. The operation of relay 573 further establishes an energizing circuit for switch magnet 510. This circuit may be traced from grounded battery through the winding of magnet 510, brush 512 and its associated contact, right contact and armature of relay 573, conducting segment of interrupter 506 to ground. Timing switch 580 is now rotated to count a time interval sufficient to test the incoming selector switch and its auxiliary circuits. Interrupter 506 is constantly rotating to intermittently establish and disestablish the circuit traced. Upon each energization and deenergization of switch magnet 510, switch 580 steps one position. The time period for rotating switch 580 from its normal position to the position connected to the alarm is of short duration but is sufficient to allow ample time for testing the incoming selector switch, Fig. 8. Should the incoming selector switch not be completely tested during the time interval occupied by the rotation of switch 580 from its normal position to the point connected to the alarm bell a circuit is established from ground to the left armature and contact of relay 573, brush 513 and its associated contact, lamp 516, alarm bell 518 to grounded battery. It will be noted that the circuit for operating switch magnet 510 is opened at the alarm position on the switch therefore the switch will remain positioned to ring the alarm until key 509 is operated by the maintenance man. The operation of key 509 establishes an obvious circuit for operating relay 507. Relay 507 in operating establishes a locking circuit for itself from grounded battery through its winding and left contact and armature, left lower contact of sequence switch spring 508 to ground through the contacts of key 17 when the sequence switch, Fig. 7, is in positions 1 or 2. If the sequence switch, Fig. 7, is in any of positions 2 to 18, the circuit to ground is completed through the right lower contact of sequence switch spring 508. The operation of relay 507 opens the locking circuit for relay 573, causing its release. The release of relay 573 establishes an energizing circuit for switch magnet 510 which may be traced from grounded battery through the winding and contacts of magnet 510, brush 511 and its associated contacts to ground through the left contact and armature of relay 573. Switch 580 is now arrested in its rotary movement in a second normal position. Relay 507 is maintained in an operated position through its locking circuit until the sequence switch, Fig. 7, is rotated to its normal position.

It will be recognized that an unstandard condition in the incoming selector switch under test will arrest the progressive movement of the sequence switch shown in Fig. 7, since the movement of this sequence switch is dependent upon the progressive movement of the incoming selector switch, Fig. 8, and the auxiliary testing device, Fig. 15.

When the alarm has been sounded by the rotation of switch 580 to indicate an unstandard condition in the incoming selector switch under test, the maintenance man makes such notes as are necessary and operates key 575. The purpose of key 575 is to restore the sequence switch shown in Fig. 7, to its normal position and advance the test control device to the incoming selector switch next above the incoming selector switch in which an unstandard condition has been found. The operation of key 575 establishes an obvious circuit for operating relay 546. The operation of relay 546 establishes a locking circuit for itself from grounded battery through its winding and right contact and armature to ground through the right lower contact of sequence switch spring 527. Relay 546 in operating also opens the fundamental circuit established to control the incoming selector switch, Fig. 8. This will prevent further operation of the incoming selector switch circuit as the sequence switch, Fig. 7, rotates to normal. The circuit established to rotate the sequence switch to its normal position may be traced from grounded battery through the winding of magnet 520, right lower contact of sequence switch spring 524 to ground at lower outer contacts of key 575. The sequence switch is thus rotated from the position in which it is resting into position 16. In sequence switch position 16 a circuit is established to operate counting relay SO. This circuit may be traced from grounded battery through the left lower contact of sequence switch spring 531, winding of counting relay SO to ground through the contacts of key 575. The operation of counting relay SO establishes a locking circuit for itself and an operating circuit for counting relays FO and SO' which is effective upon the release of key 575. The maintenance man, upon noting that the sequence switch, Fig. 7, has rotated to position 16, releases key 575. The release of key 575 removes the shunt around the windings of counting relays FO and SO', allowing them to operate. The operation of counting relay FO establishes a circuit for operating relay 487. This circuit may be traced from grounded battery through the winding of relay 487, left contact and armature of relay 485, conductor 566 of Figs. 5, 4 and 7, right outer normal contact and armature of relay 547, right upper and lower contacts of sequence switch spring 537 to ground through contact and armature of counting relay FO. The operation of relay 487 establishes an energizing circuit for sequence switch magnet 520. This circuit may be traced from grounded battery through the winding of magnet 520, left upper contact of sequence switch spring 535, conductor 567 of Figs. 7, 4 and 5, to ground through the left contact and armature of relay 487. The sequence switch is thus rotated from position 16 to position 17 where a circuit is established to again energize sequence switch magnet 520. This circuit may be traced from grounded battery through the winding of magnet 520, right upper contact of sequence switch spring 535 to ground at start key 16. This circuit is maintained in position 18 and the sequence switch is rotated from position 17 to its normal position 1. In sequence switch position 1, a circuit is established to energize relay 459 which may be traced from grounded battery through right windings of relays 482 and 459, right normal contact and armature of relay 482, lower contact of sequence switch spring 530, conductor 567, of Figs. 7, 4 and 5 to ground through the left contact and armature of relay 487. The operation of relay 459 establishes circuits for elevating the test selector to the incoming selector switch next above the incoming selector switch in which an unstandard condition exists. The circuit for elevating the test selector switch is the same as previously traced in the normal operation of the testing control device.

Returning to the timing switch 580, if the incoming selector switch under test is in a standard condition, the test will be completed previous to the time allowed for rotating the switch to the position where the alarm is connected in circuit. Under this condition the sequence switch shown in Fig. 7 rotates to its normal position 1 previous to the time that the timing switch 580 rotates to the alarm position. It will be noted that sequence switch spring 508 in rotating from position 18 to position 1 opens the locking circuit for relay 573, causing it to release. A circuit is thus established to rotate switch 580 to its next normal position. This circuit may be traced from grounded battery through the winding and contacts of magnet 510, brush 511 and its associated contacts to ground through the left normal contact and armature of relay 573.

It will be noted that upon the completion of test and release of one incoming selector, relay 545 is released thus establishing a circuit to start timing switch 570 in operation. Upon the seizure of the next incoming selector switch to be tested, relay 545 is again operated and the energizing circuit for relay 505 is opened to cause its release and return the switch 570 to normal. Timing switch 580 is then started to cover the time interval for testing the incoming selector switch. In this manner all operations of the testing device are covered by the time alarm circuit so that in case of an unstandard condition in any part of the operation, the alarm will be sounded.

In the initial description of the complete operation of the testing device, the utility of relay 544 shown in Fig. 7 was not described. Relay 544 is only brought into the circuit operation when the incoming selector switch under test is unable to find an idle final selector switch such as shown in Fig. 9. It is well known in the art that the final selector switches terminate in groups of terminals on the incoming frame and that the incoming selector switch has a hunting feature in order to locate an idle final selector switch. If all of the final selector switches in the group are busy, the incoming selector switch is then arrested in its upward movement upon the overflow terminals above said group. When the incoming selector switch is thus arrested upon the overflow terminals, relay 721 is released and the incoming selector sequence switch rotates from position 6 to position 7. In positions 7 and 8, a circuit is established through commutator segment 734 to rotate the sequence switch into position 9. When the incoming selector switch, Fig. 8, is trunk hunting, the sequence switch shown in Fig. 7 is in position 6 and therefore, with the incoming selector switch in position 9 and the test control circuit in position 6, a circuit is established to operate polarized relay 543 shown in Fig. 7. This circuit may be traced from grounded battery through the right winding of relay 721, lower contacts of sequence switch spring 715, resistance 725, lower contact of sequence switch spring 704 and thence over the fundamental circuit as previously traced to the left inner contact and armature of relay 545, right upper contact of sequence switch spring 536, terminal strip 96, cross connected to terminal strip 94, register brush 80 and its associated contact, winding of relay 542, normal contact and armature of counting relay SO', left lower contact of sequence switch spring 533, winding of polarized relay 543, left upper contact of sequence switch spring 532, left normal contact and armature of relay 546, right inner contact and armature of relay 545 and thence over the fundamental circuit to the tip conductor of the incoming selector switch as previously traced through the upper contact of sequence switch spring 703, resistance 724, left upper and lower contacts of sequence switch spring 708 to ground through the upper contacts of sequence switch spring 712. The operation of polarized relay 543 establishes a circuit to operate relay 544. This may be traced from grounded battery through the winding of relay 544, upper contact of sequence switch spring 524, contact and armature of relay 543 to ground through right lower contact of sequence switch spring 527. The operation of relay 544 establishes a locking circuit for itself traced from grounded battery through its winding and left inner contact and armature to ground over the energizing path. The operation of relay 544 further establishes a short-circuit across the fundamental to maintain relay 721 of the incoming selector switch in an operated position for trunk closure, thus causing the incoming selector switch to restore to normal upon the release of relay 544. This short-circuit may be traced from the tip conductor of the fundamental circuit through the right inner contact and armature of relay 545, right contact and armature of relay 544, left inner contact and armature of relay 545 to the ring conductor of the fundamental circuit. The operation of relay 544 further establishes a circuit to operate counting relays SO, SO' and FO. This may be traced from ground through the lowest contacts of key 575, left outer contact and armature of relay 544, windings of counting relays FO, SO' and SO, left lower contact of sequence switch spring 531 to grounded battery. The operation of counting relay FO establishes a circuit to energize sequence switch magnet 520 as previously traced in position 6 of this sequence switch. The rotation of the sequence switch into position 7 opens the circuit for the counting relays operated, thus causing their release. The release of counting relay FO establishes a circuit for energizing sequence switch magnet 520 as previously traced to rotate the sequence switch into position 8. In position 8 a circuit for operating counting relays SO, SO' and FO is again established through left outer contact and armature of relay 544. In this manner counting relays FO, SO' and SO continue to operate and release until the sequence switch is rotated into position 12 where it will remain until key 575 is operated by the maintenance man to further rotate the sequence switch. The operation of key 575 advances the sequence switch in the manner previously described to associate the testing control device with the incoming selector switch next above the one under test. The purpose in holding relay 544 operated during the rotation of the sequence switch, Fig. 7, into position 12 is to maintain the short-circuit across the fundamental of the incoming selector switch until such time as it can rotate to a position where it can restore itself to normal when relay 721 is released.

Repeat operation.

When an incoming selector switch under test is arrested in its progression on account of an unstandard condition as described or on account of being driven to the overflow terminal, it may be desirable to continue the test of the same incoming selector switch. This is known as a repeat test and is accomplished by the operation of repeat key 576.

The actuation of key 576 establishes an obvious circuit for energizing relay 547. Relay 547 in operating establishes a locking circuit for itself which may be traced from grounded battery through its winding and right inner contact and armature to ground through lower contact of sequence switch spring 529. If the sequence switch, Fig. 7, is in a position preceding position 16, key 575 is operated to rotate said sequence switch into position 16 as previously described. The operation of relay 547 prevents the advance of the test selector switch by opening a circuit ordinarily established in position 16 of the sequence switch, Fig. 7, for operating relay 487 of Fig. 5. This circuit is opened at the right outer contact and armature of relay 547. The operation of relay 547 establishes a circuit for energizing sequence switch magnet 520 in position 16. This circuit may be traced from grounded battery through the winding of magnet 520, left upper contact of sequence switch spring 535, right outer contact and armature of relay 547, right upper and lower contacts of sequence switch spring 537 to ground through the contact and armature of counting relay FO. Counting relay FO is operated upon the release of key 575 as previously described. A circuit is now established to rotate the sequence switch from position 17 through position 18 to position 1. This circuit may be traced from grounded battery through the winding of sequence switch magnet 520, right upper contact of sequence switch spring 535 to ground through the contacts of start key 17, previously traced. During the rotation of the sequence switch through positions 17 and 18 a circuit is established to operate test relay 490. This circuit may be traced from grounded battery through the left winding of relay 490, left lower and upper contacts of sequence switch spring 537 to ground through right middle contact and armature of relay 547. The test relay 490 is operated to ascertain whether the incoming selector has been seized for service connection during the time that it is released by the testing device and again seized for a repeat test. If the incoming selector switch is found to be idle, the test relay 490 releases in the manner previously described and relay 545 is operated to start a new test of the incoming selector switch and its auxiliary circuits.

Automatically passing busy incoming selector switches.

During the course of a routine test of incoming selector switches in an office a number of incoming selector switches are encountered by the test control device that are busy. With key 496 shown in Fig. 5 in its normal position, the testing device upon encountering a busy incoming selector switch remains connected thereto until said incoming selector switch becomes idle. It then seizes the incoming selector switch for test as previously described. Key 496, when operated, removes the short-circuit across the winding of relay 486 and thus when a busy incoming selector switch is encountered, a circuit is established to operate relay 486 to cause the testing control device to advance the test selector switch to an incoming selector switch next above the one found busy. Preceding the tracing of the circuit for operating relay 486, it may be stated that relays 490 and 489 are in an operated position. The circuit for actuating relay 486 may now be traced from grounded battery through the right winding of relay 490, winding of relay 486, right contact and armature of relay 490, conductor 269 of Figs. 5, 4, 7 and 3, left upper contact of sequence switch spring 311, conductor 367 of Figs. 3 and 13 (assuming Fig. 13 as the test selector) brush 1304 to ground, characterizing terminal 1307 as busy to a service connection. During the time that the test selector switch is connected to a busy incoming selector switch, a circuit is established to light lamp 493. This may be traced from grounded battery through resistance 494, lamp 493 thence over the path previously traced to the ground characterizing terminal 1307 as busy. The operation of relay 486 establishes a circuit to operate relay 487. This may be traced from grounded battery through the winding of relay 487, left normal contact and armature of relay 485, contact and armature of relay 486 to ground through left normal contact and armature of relay 483. The operation of relay 487 establishes circuits the same as previously traced to advance the test selector switch to the incoming selector switch next above the one found busy.

Key 496 may be operated throughout the entire automatic routine test of the incoming selector switches in an office and therefore the testing control device will automatically pass all incoming selector switches found busy.

*Manually passing busy incoming selector switches.*

During the routine test of the incoming selector switches of an office, busy incoming selector switches are encountered by the testing control device. If key 496 is normal, the testing control device will remain connected to the busy incoming selector switch until it becomes idle. Key 495 is, however, provided to advance the test selector from a busy incoming selector switch to the next incoming selector switch above the busy selector switch. The lighting of lamp 493 indicates that the test selector switch is connected to a busy incoming selector switch. The circuit for lighting lamp 493 may be traced from grounded battery through resistance 494, lamp 493, left contact and armature of relay 490 and thence to ground characterizing the incoming selector switch as busy. The operation of key 495 removes the short-circuit across the winding of relay 486 thus establishing a circuit through its winding the same as described upon the operation of key 496. The operation of relay 486 establishes a circuit for relay 487 which may be traced from grounded battery through its winding, left contact and armature of relay 485, contact and armature of relay 486 to ground through left contact and armature of relay 483. The operation of relay 487 establishes a locking circuit for itself which may be traced from grounded battery through its winding and right inner contact and armature, right normal contact of relay 483 to ground through the left contact and armature of relay 487. The operation of relay 487 further establishes a circuit for operating relay 480. This circuit may be traced from grounded battery through the winding of relay 480, right outer contact and armature of relay 487 to ground through the right upper contact of sequence switch spring 404. The operation of relay 480 establishes an energizing circuit for relay 485. This circuit may be traced from grounded battery through the left winding of relay 485, right middle contacts of key 495 to ground through the right contact and armature of relay 480. Relay 485 in operating establishes a locking circuit for itself from grounded battery through its right winding, contact and armature to ground through the right outer contacts of key 495. A circuit is now established to energize relay 459. This may be traced from grounded battery through the right windings of relays 482 and 459, right normal contact and armature of relay 482, lower contact of sequence switch spring 530, conductor 567 of Figs. 7, 4 and 5, to ground through the left contact and armature of relay 487. Relay 459 in operating establishes an energizing circuit for the updrive magnet of the test selector as previously described and upon the upward movement of the test selector a circuit is established from ground through the conducting portion of a commutator segment thence through the right contact and armature of relay 459, left windings of relays 459 and 482 in parallel to grounded battery, as previously described. A holding circuit is thus established for relay 459 and an operating circuit for relay 482. Relay 482 upon operating establishes a holding circuit for itself from grounded battery through its right winding, contact and armature, lower contact of sequence switch spring 530, conductor 567 of Figs. 7, 4 and 5, to ground through the left contact and armature of relay 487. Upon further upward movement of the test selector switch elevator, the holding ground is removed from the left winding of relay 459 causing its release. The release of relay 459 opens the energizing circuit for the test selector switch updrive magnet thus arresting its upward movement when it has been moved upward to the terminals connected to the incoming selector switch next above the busy incoming selector switch. The release of relay 459 establishes a circuit to operate relay 483. The operation of relay 483 opens the holding circuit for relay 487 causing its release and the release of relay 487 opens the holding circuit for relays 480 and 483 to cause their release. Upon the release of relay 480 the energizing circuit for relay 490 is opened as previously described. The incoming selector switch is now tested to ascertain whether it is in a busy or non-busy condition and if in a non-busy condition, relay 490 releases to start the test of said incoming selector switch and its auxiliary circuits. The energization of relay 545 shown in Fig. 7 does not however, take place until key 495 is restored to normal since the energizing circuit for this relay is extended through the contacts of key 495. Upon noting that the circuit has properly functioned, the maintenance man restores key 495, thus establishing a previously described circuit to operate relay 545 and start the test. The release of key 495 also opens the holding circuit for relay 485 causing its release. The purpose in maintaining relay 485 in an operated position during the time that key 495 is in an operated position is to prevent the reoperation of relay 487 when a second busy incoming selector switch is encountered.

*Manual operation of testing control device.*

The testing control device may be operated by the actuation of certain of the keys shown in Fig. 1. The purpose of these keys is to enable manual direction of the testing control device to test a certain group of incoming selector switches. Keys 1 to 13 control the positioning of register switch 70 or 85. Keys 19 to 28 control the group of incoming selector switches in a certain bank to which the test selector is directed. Keys 29 to 38 control the number of overflow terminals that shall be over-ridden by the test selector, thus determining the number of groups of incoming selector switches that shall be tested.

The actuation of any one of keys 1 to 10 along with the actuation of key 12 controls register switch 70 in such manner that it will stop in one of positions 1 to 10 depending upon which of keys 1 to 10 is actuated. To control register switch 70 in such manner that it will stop in one of positions 11 to 20, key 11 must be actuated in addition to key 12 and one of keys 1 to 10. The same operation controls register switch 85 with the exception that key 13 is operated instead of key 12. This method of control makes it possible to rotate either register switch 70 or register switch 85 selectively.

Assuming that the testing control device is to be directed to make a test of incoming selector switches in a particular group and assuming the group to be group 3 in bank 4 of panel F indicated in Fig. 10, the following keys are actuated: 1, 11, 13, 20, 30, 14, 16, and 17. The actuation of key 14 connects ground through the contacts of keys 1 to 10 the terminals associated with register brushes 72 and 87. The actuation of key 1 removes the ground from the terminals in position 1 and 11 associated with register brushes 72 and 87. The actuation of key 11 connects ground to the right contacts of key 1 and in turn to the terminals in position 1 associated with register brushes 72 and 87. Therefore, a ground is connected to the terminals associated with register brushes 72 and 87 in all positions except position 11. The actuation of keys 16 and 17 establish start circuits for the entire system including an energizing circuit for start relay 470. This energizing circuit may be traced from grounded battery through the winding of relay 470, right lower and upper contacts of sequence switch spring 221, left lower and upper contacts of sequence switch spring 327 to ground at the left inner contacts of key 16. The operation of start relay 470 establishes a circuit for relay 61 to control register 85 for this particular test. This circuit may be traced from grounded battery through the winding of relay 61, right inner contacts of key 13, right inner normal contacts of key 18 to ground through the right inner contact and armature of start relay 470. As will be remembered, the operation of relay 61 transfers the control leads from the register switch magnet 71 to register switch magnet 86. Therefore, it will be noted that the operation of key 13 establishes circuits that will control register 85. Register 70 remains in its normal position.

Upon the operation of relay 61, a start circuit is established which will rotate register switch 85. This circuit may be traced from grounded battery through the winding and contacts of register magnet 86, left outer contact and armature of relay 61, register brush 72 and its associated contact, left inner contacts of key 13, register brush 87 and its associated contact, to ground through right outer contact and armature of relay 61. The register switch 85 is thus rotated from its normal position to position 1. In positions 1 to 10 circuits are established to rotate register 85 which may be traced from grounded battery through the winding and contacts of register magnet 86, left outer contact and armature of relay 61, register brush 72 and its associated contact, left inner contacts of key 13, register brush 87 and its associated contacts 1 to 10, right inner contacts of keys 1 to 10, right outer contacts of keys 2 to 10 to ground through left inner contacts of key 14 and right inner contacts of key 1, inner contacts of key 11 to the same ground as key 14. Register switch 85 is thus rotated into position 11.

Register switch 85 is arrested in its rotary movement in position 11 on account of the absence of ground on terminal 11 associated with register brush 87. The absence of ground at this register position also removes the shunt ground from the winding of relay 62 as previously described, thus causing the operation of relay 62. The operation of relay 62 establishes a battery circuit for the test of the test selector when apparatus is properly positioned, also the operation of relay 62 establishes an obvious circuit to operate relay 63 and the operation of relay 63 establishes a locking circuit for itself and operating circuits for relays as previously described.

In position 11 of register 87, a circuit is established to rotate connector 200 to the third test selector associated with said connector. This circuit may be traced from grounded battery through the winding of sequence switch magnet 201, right upper contact of sequence switch spring 223, terminal strip 88, brush and associated contact in position 11 of register 97, left outer contacts of key 17, left normal contacts of key 18, left inner contact and armature of relay 40 to ground through the left inner normal contacts of relay 39. It will be noted that the energizing circuit for sequence switch magnet 201 is established until connector 200 rotates out of position 5. The connector is thus arrested in its rotary movement in position 6 which is the position wherein the third test selector of connector 200 is associated with the testing control device. Relay 226 is operated, over an obvious circuit, in multiple with sequence switch magnet 201 during the rotation of connector 200 from position 1 to 6. The purpose of this is to prevent the establishment of a circuit from ground through its left contact and armature to the first and second test selectors associated with connector 200.

It will be noted from the above description that one register switch may be rotated independent of another register switch. Also that one connector switch may be rotated independent of other connector switches. Only two register switches have been shown. There may be, however, any number of register switches connected in the same manner as register switch 85. A relay the same as relay 61 is used with each additional register switch the same as 85, to transfer the control from the preceding to the succeeding register switch magnet. Each register switch is arrested in position 21 after completing its cycle of tests. Only two connector switches are shown. There may be, however, any number of connector switches, the same as connector 200 and the multiple control for automatic routine testing and individual control for particular tests of the additional connectors is the same as that shown and described for connector 200.

Register brush 97 in position 11 has selected the test selector to be used in this particular test and thus the panel in which the test will be made has been selected. Register brush 89 in position 11 is connected to counting relay 4 and since register brush 89 controls brush selection, this particular test is made in the fifth bank. The circuits established for making brush selection have been previously described and it is thought unnecessary to redescribe them.

Register brush 91, which was described in the automatic routine test for controlling group selection, is not used when a particular test is controlled through the key sets. As previously described, key 22 is actuated for group selection. It will be remembered that the sequence switch in Fig. 4 is resting in position 6 when test selector group selection is made, thus the circuit for making group selection may be traced from the test selector to conductor 238 of connector 200, through the right upper contact of sequence switch spring 203, conductor 277, upper contacts of sequence switch spring 409, right outer contacts of keys 28, 27, 26, 25, 24, and 23, right inner contacts of key 22, conductor 54 of Fig. 1, conductor 54 of Fig. 7, normal armature and contact of counting relay 3', winding of counting relay 3, right lower contact of sequence switch spring 421 to grounded battery. The counting relays are operated as previously described. As the test selector is driven in an upward movement, the operation of counting relay 0' opens the fundamental circuit and arrests the upward movement of the test selector switch elevator in the manner previously described. The operation of counting relay 0' also establishes a circuit to energize the sequence switch magnet 400 to rotate the sequence switch from position 6 to position 7. This energizing circuit for magnet 400 is not effective until key 14 is restored to normal. The purpose in arresting the progression of the testing control device at this point is to facilitate the movement of the test selector switch elevator by hand to a particular incoming selector switch in the group so that the testing device may be quickly associated with a questionable incoming selector switch.

Upon the release of key 14, the energizing circuit for sequence switch magnet 400 may be traced from grounded battery through the winding of magnet 400, left upper contact of sequence switch spring 412, left outer contacts of key 14 to ground through the contact and armature of counting relay 0'.

As described in the automatic routine test, the position of register brush 93 controls the number of groups of incoming selector switches that are tested each time the test selector selects a new series of tests. The manner in which register brush 93 controls this is through the control of selector control switch 449 shown in Fig. 5. In a particular test register brush 93 is not used. It is, however, supplemented by the operation of one of keys 29 to 38. In this particular test, key 30 is actuated to arrest the movement of selector control switch 449 in position 17. Thus there are two groups of incoming selector switches to be tested. As will be remembered, the actuating circuit for magnet 450 is established in position 3 of the sequence switch, Fig. 4. This may be traced from grounded battery through the winding and contacts of magnet 450, right outer contacts of key 30, upper contact of sequence switch spring 406 to ground. The circuit through key 30, to arrest the rotation of selector control switch 449, may be traced from ground through the outer contacts of keys 38, 37, 36, 35, 34, 33, 32 and 31, inner contacts of key 30, conductor 438 of Figs. 2, 4 and 5, brush 451 and its associated contact in position 17, upper contacts of sequence switch spring 408, resistance 497 to grounded battery. An effectual shunt is placed around the winding of switch magnet 450 to prevent its further operation.

Register brush 95 as positioned controls the synchronizing of the positioning of connector 200 with the positioning of register switch 85 preceding the establishment of the circuit for testing busy or idle condition of the test selector.

Keys 1 to 10, 11 to 13, 19 to 28, and 29 to 38 are mechanically locked and electrically released. Upon the operation of any one key in each strip of keys the contacts 42, 44, 46 and 48 are closed. When the sequence switch, Fig. 4, rotates to position 7, which is the test position, a circuit is established to energize key release magnets 41, 45 and 47. This circuit may be traced from grounded battery through the upper contact of sequence switch spring 402, shown in Fig. 4, right outer normal contacts of key 14, conducting portions of interrupter 50, windings 47, 45 and 41 in multiple, contacts 48, 46 and 42 to ground. Keys 1, 22 and 30 are now released. Key release magnet 43 is not energized at this time since key 13 must remain in an actuated position to maintain the actuating circuit for relay 61.

Upon the completion of the test, key 15 is operated and keys 16 and 17 are released to restore the testing control device to normal, as previously described. The operation of key 15 establishes an obvious circuit to operate relay 39. The apparatus of the testing control circuit and the test selector now return to normal, the same as previously described. Upon the release of key 15, a circuit is established to actuate key release magnet 43. This may be traced from grounded battery through the left inner contacts of key 15, left outer contact and armature of relay 29, winding of key release magnet 43, contacts 44 to ground. It will be noted that the locking circuit for relay 29 is maintained until keys 11 and 12 are released. This locking circuit may be traced from grounded battery through the winding and right inner contact and armature of relay 29 to ground through the contacts of keys 11 and 12 on the key strip. The release of key 13 along with the release of keys 11 and 12 opens the holding circuit for relay 61. Relay 39 is now released and the test control device may now be used for other tests.

*Restore to normal during automatic test.*

Assuming that an automatic test is partly completed with register switch 70 in position 4, connector 300 in position 3, the sequence switch of Fig. 4 in position 7, the selector control switch 449 in position 17, the sequence switch, Fig. 7 in position 8 for final tens selection and the test selector, Fig. 13, connected to an incoming selector switch.

It is desirable at times to stop the automatic test in order to use the testing control device for a particular test. To do this, the maintenance man restores keys 16 and 17 and operates key 15. The testing control device does not immediately restore to normal but will continue to test the incoming selector switch to which it is connected until said test is completed. When the sequence switch, Fig. 7, has progressed to position 16 and the supervisory relay of the incoming selector switch has operated, the counting relays including counting relays SO, SO' and FO, a circuit is established to operate relay 487 shown in Fig. 5, as previously traced. The operation of relay 487 establishes a circuit to energize sequence switch magnet 520 as previously traced to rotate the sequence switch from position 16 to position 17. In position 17, an energizing circuit is established for sequence switch magnet 520 which may be traced from grounded battery through the winding of magnet 520, left upper contact of sequence switch spring 534 to ground at the right outer normal contact of key 17, thus rotating the sequence switch into position 18. In position 18 an energizing circuit is established for sequence switch magnet 400. This circuit may be traced from grounded battery through the winding of magnet 400, left lower contact of sequence switch spring 412, upper contacts of sequence switch spring 528 and thence to ground through the right outer normal contact of key 17. The sequence switch shown in Fig. 4 now rotates from position 7 to position 8. In position 8 a circuit is established to actuate the downdrive magnet of the test selector, Fig. 13, as previously traced. When the test selector, Fig. 13, has been restored to normal a circuit is established to rotate the sequence switch, Fig. 4, from position 8 to position 9. This circuit is established from ground through the lower contact of sequence switch spring 1317, brush 1312, commutator 1316 and thence through the connector to conductor 272, right upper contact of sequence switch spring 416, winding of sequence switch magnet 400 to grounded battery. The sequence switch is thus rotated from position 8 to position 9. In sequence switch position 9 a circuit is established to rotate the selector control switch 449 to normal. This circuit may be traced from grounded battery through resistance 497, winding and contacts of switch magnet 450, lower contacts of sequence switch spring 408, brush 452 and its associated contacts to ground at the upper contact of sequence switch spring 405 and right lower contact of sequence switch spring 404. Also in position 9 of the sequence switch, Fig. 4, a circuit is established to restore connector 300 to normal. This circuit may be traced from grounded battery through the winding of sequence switch magnet 301, right upper contact of sequence switch spring 323, contact of sequence switch spring 401 to ground at right inner normal contact of key 17. When switch 449 has returned to normal, a circuit is established to energize sequence switch magnet 400. This circuit may be traced from grounded battery through the winding of magnet 400, brush 453 and its associated contact, lower contacts of sequence switch spring 418 to ground through the left outer normal contact and armature of relay 460. The sequence switch, Fig. 4, is now rotated from position 9 to its normal position 1 and a circuit is established to restore the sequence switch, Fig. 7, from position 18 to position 1. This circuit may be traced from grounded battery through the winding of magnet 520, left lower contact of sequence switch spring 534 to ground through left upper contact of sequence switch spring 404. Connector 300 in restoring to normal opened the holding circuit for start relay 470 to cause its release. All apparatus now restores to normal with the exception of register switch 70. A circuit is now established through position 1 of the sequence switch in Fig. 4 to restore register switch 70 to normal. This circuit may be traced from grounded battery through the winding and contacts of register magnet 71, left outer normal contact and armature of relay 61, register brush 72 and its associated contacts of keys 1 to 10, left outer contacts of key 15, left inner contacts of key 17 to ground in position 1 of sequence switch spring 403.

What is claimed is:

1. In a control system, groups of switches, a switch controlling register having a plurality of positions, means to selectively position a group of switches in accordance with the registrations set up in each position of said register, means to set said register in a selected position, and means to automatically advance said register from position to position.

2. In a controlling system, groups of switches, a switch controlling register having a plurality of positions, means to selectively position a group of switches in accordance with the registrations set up in each position of said register, means to set said register in its first position, and means to automatically advance said register from position to position.

3. In a controlling system, groups of switches, a switch controlling register having a plurality of positions, means to selectively associate said switches in a particular combination in each position of said register, means to selectively position said combination of switches in accordance with the registration set up in each position of said register, means to set said register in its first position, and means to automatically advance said register from position to position.

4. In a system for testing groups of individual apparatus units, means comprising a switching device to select one of said groups, automatic means to successively select each apparatus unit in the selected group, means to test each apparatus unit selected, and automatically operable means to advance said selecting means from group to group.

5. In a system for testing groups of individual apparatus units, said groups being divided into sub-groups, means to select one of said groups, automatically operable means to advance said selecting means from group to group and automatic means to successively test each apparatus unit in all sub-groups of the selected group.

6. In a system for testing groups of automatic switches, means comprising a switching device to select one of said groups, and automatic means to successively select each automatic switch in the selected group, means to test each automatic switch selected, and automatically operable means to advance said selecting means from group to group.

7. In a system for testing groups of individual apparatus units, means to automatically and progressively select particular combinations of said groups, and means to successively test each unit of apparatus included in the selected combination.

8. In a system for testing groups of automatic switches, means to automatically and progressively select particular combinations of said groups, and means to successively test the automatic switches included in the selected combinations.

9. In a system for testing groups of automatic switches, said groups being divided into sub-groups, means for automatically and progressively selecting particular combinations of said sub-groups, and means for successively testing the automatic switches included in said combinations.

10. In a telephone system, groups of apparatus, an automatically progressive counting device, means to position said counting devices, means to automatically and progressively select particular combinations of said groups, the number of groups comprising a particular combination being determined by the position and automatic progression of said counting device.

11. In a system for testing groups of apparatus, an automatically progressive counting device, means to position said counting device, means to automatically and progressively select particular combinations of said groups means to determine the number of groups which comprise a particular combination by the position and automatic progression of said counting device, and means to successively test the apparatus included in the selected combination.

12. In a system for testing groups of apparatus, said groups being divided into sub-groups, means to select one of said groups, means to successively test each apparatus in said sub-groups, and means to determine the number of sub-groups of apparatus to be tested in each group.

13. In a system for testing groups of apparatus, said groups being divided into sub-groups, test groups, each comprising a combination of sub-groups within a group, a plurality of test groups in various ones of said groups, means to automatically and successively select said test groups, and means to successively test each apparatus in said test groups.

14. In a system for testing groups of apparatus, said groups being divided into sub-groups, test groups each comprising a combination of sub-groups within a group, a plurality of test groups in various ones of said groups, means to automatically and successively select said test groups, and means to automatically predetermine the number of sub-groups of apparatus constituting a test group.

15. In a system for testing groups of apparatus, a progressively operable register, means to position said register, means to select a group of apparatus in accordance with the setting of said register, means to successively test each apparatus in the selected group, and means to advance said register upon the completion of said tests.

16. In a system for testing groups of apparatus, said groups being divided into sub-groups, a progressively operable register, means to position said register, means to select a group of apparatus in accordance with the setting of said register, automatic means to successively test each apparatus in all sub-groups in the selected group, and means to advance said register upon completion of said test.

17. In a system for testing groups of apparatus, said groups being divided into sub-groups, a progressively operable register, means to position said register, means to select a group of apparatus in accordance with the setting of said register, a switching device to govern the number of sub-groups of apparatus tested in each of said groups, and means to position said switching device in accordance with the setting of said register.

18. In a system for testing groups of apparatus, said groups being divided into sub-groups, test groups comprising a plurality of sub-groups, a progressively operable register, means to position said register, means to select a test group in accordance with the setting of said register, means to predetermine the number of sub-groups of apparatus that constitute a test group, and means to advance said register to select a different test group upon the completion of testing the apparatus of said predetermined number of sub-groups.

19. In a system for testing automatic switches, a test selector having access to said switches, a progressively operable register, means to position said register, means to operate said test selector to select an automatic switch in accordance with the setting of said register, means to test said automatic switch, and means to directively control said test selector in accordance with successive registrations.

20. In a system for testing groups of automatic switches, a test selector having access to said groups, a progressively operable register, means to position said register, means to operate said test selector to select a group of automatic switches in accordance with the setting of said register, means to test the automatic switches of said group, and means to directively control said test selector in accordance with successive registrations.

21. In a system for testing groups of automatic switches, a test selector having access to a plurality of combinations of said groups, a progressively operable register, means to position said register, means to operate said test selector to select one of said combinations of groups in accordance with the setting of said register, means to successively test each automatic switch in the selected combination of groups, and means to directively control said test selector in accordance with successive registrations.

22. In a system for testing automatic switches, a plurality of test selectors each having access to certain ones of said switches, a registering device, means to position said registering device, means to select a test selector in accordance with the setting of said registering device, means to operate said test selector to seize an automatic switch, and means to test said automatic switch.

23. In a system for testing automatic switches, a plurality of test selectors each having access to certain of said automatic switches, a progressively operable register, means to position said register, means to select one of said test selectors in accordance with the setting of said register, means to operate said test selector to select an automatic switch in accordance with the setting of said register, means to test said automatic switch, means to directively control said test selector in accordance with successive registrations, and means to select other test selectors and directively control them in accordance with successive registrations.

24. In a system for testing automatic switches, a plurality of test selectors, each having access to certain of said automatic switches, a progressively operable register, means to position said register, means to select one of said test selectors in accordance with the setting of said register, means to operate said test selector to select an automatic switch in accordance with the setting of said register, means to test said automatic switch, means to directively control said test selector in accordance with successive registrations, and means to select other test selectors and directively control them in accordance with successive registrations.

25. In a system for testing groups of automatic switches, said groups being divided into sub-groups, a test selector, means to operate said test selector to select a group of automatic switches, means to successively seize and test the automatic switches in the first sub-group of said group, means comprising a switching device to govern the number of sub-groups of automatic switches tested in said group, means under the control of said switching device to operate said test selector to successively select a plurality of other sub-groups of automatic switches in said group, and means to successively seize and test said automatic switches.

26. In a system for testing groups of automatic switches, a plurality of test selectors each having access to particular combinations of said groups, a progressively operable register, means to position said register, means to select a test selector in accordance with the setting of said register, means to operate said test selector to selectively seize the automatic switches in a particular combination of groups, and means to test said automatic switches.

27. In a system for testing automatic switches, a plurality of automatic selector switches ordinarily used in service, automatic means to successively remove said automatic switches from service and use each one removed from service as a test selector, means to operate said test selectors to successively select said automatic switches to be tested, and means to successively seize and test said automatic switches.

28. In a system for testing groups of automatic switches, a plurality of automatic selector switches ordinarily used in service, automatic means to successively remove said automatic switches from service and use each one removed from service as a test selector, means to operate said test selectors to successively select said groups of automatic switches to be tested, and means to successively seize and test the automatic switches within said groups.

29. In a system for testing groups of automatic switches, said groups being divided into varying combinations of sub-groups, a progressively operable register, means to position said register, a plurality of test selectors, means to select one of said test selectors in accordance with the setting of said register, means to operate said test selector to select a group of automatic switches in accordance with the setting of said register, means to successively seize and test the automatic switches in the first sub-group of said group, means comprising a switching device to govern the number of sub-groups of automatic switches tested in said group, means under the control of said switching device to operate said test selector to successively select a plurality of other sub-groups of automatic switches in said group, means to successively seize and test said automatic switches, and means to advance said register upon the completion of said tests for like operation in testing the automatic switches in other groups.

30. In a system for testing groups of apparatus, said groups being divided into sub-groups, a progressively operable register, means to position said register, a plurality of test selectors, each having access to certain of said groups, means to select one of said test selectors in accordance with the setting of said register, means to operate said test selector to select a group of apparatus in accordance with the setting of said register, means to successively seize and test each apparatus in the first sub-group of said group, means to operate said test selector to successively select a plurality of other sub-groups of apparatus in said group, means to successively seize and test said apparatus, means to advance said register upon the completion of said tests for like operation in the testing of the apparatus in other groups to which said test selector has access, means to advance said register to select other test selectors for like operation when testing the apparatus in other groups, and means comprising a switching device to govern the number of sub-groups of apparatus tested in each group.

31. In a system for testing automatic switches, different classes of test selectors each having access to certain ones of said switches, means to successively select said test selectors, and means to seize each test selector, when selected, in accordance with automatically discriminating controlling means.

32. In a system for testing automatic switches, different classes of test selectors, each having access to certain ones of said switches, a testing device, means to associate said testing device with any one of said test selectors, and discriminating means in said testing device operated in accordance with the class of test selector with which said testing device is associated.

33. In a system for testing automatic switches, different classes of test selectors, each having access to certain ones of said switches, a testing device, means to associate said testing device with any one of said test selectors, discriminating means in said testing device operated in accordance with class of test selector with which said testing device is associated, and means to seize any one of said test selectors in accordance with the operation of said discriminating means.

34. In a system for testing automatic switches, different classes of test selectors ordinarily used as automatic switches for service connections, said test selectors each having access to certain ones of said automatic switches to be tested, a testing device, means to associate said testing device with any one of said test selectors, discriminating means in said testing device operated in accordance with the class of test selector with which said testing device is associated, means to seize any one of said test selectors in accordance with the operation of said discriminating means, and means to prevent seizure of said test selector for service connections.

35. In a system for testing automatic switches, different classes of test selectors ordinarily used as automatic switches for service connections, said test selectors each having access to certain ones of said automatic switches to be tested, means to successively select said test selectors, and means to seize each test selector, when selected, in accordance with automatically discriminating controlling means.

36. A testing arrangement for testing the operation of automatic selector switches comprising means to select a switch and direct the movable contacts thereof to a predetermined set of stationary contacts connected to a testing device, and means operative when said switch is in a standard condition to automatically select another of said switches and direct the movable contacts thereof to a predetermined set of stationary contacts connected to a testing device.

37. A testing arrangement for testing the operation of automatic selector switches comprising means to select a switch and direct the movable contacts thereof to a predetermined set of stationary contacts connected to a testing device, means operative when said switch is in a standard condition to automatically select another of said switches and direct the movable contacts thereof to a predetermined set of stationary contacts connected to a testing device, and means to automatically continue like selection and direction of a plurality of such switches.

38. A testing arrangement for testing the operation of automatic selector switches comprising means to select a switch and direct the movable contacts thereof to a predetermined set of stationary contacts connected to a testing device, means operative when said switch is in a standard condition to automatically select another of said switches and direct the movable contacts thereof to a predetermined set of stationary contacts connected to a testing device, and means to denote an unstandard condition during any operation of said switch under test.

39. An automatically progressive testing device for testing the operation of automatic selector switches comprising means to select a switch and direct the movable contacts thereof to a predetermined set of stationary contacts connected to an auxiliary test device, means operative when said switch is in a standard condition to automatically select another of said switches and direct the movable contacts thereof to a predetermined set of stationary contacts connected to an auxiliary testing device, and means to terminate the automatic progression of said testing device when an unstandard condition is encountered.

40. An automatic progressive testing device for testing the operation of automatic selector switches comprising means to select a switch and direct the movable contacts thereof to a predetermined set of stationary contacts connected to an auxiliary testing device, means operative when said switch is in a standard condition to automatically select another of said switches and direct the movable contacts thereof to a predetermined set of stationary contacts connected to an auxiliary testing device, and means operative when an unstandard condition is encountered to terminate the automatic progression of said testing device at a position that will denote the part of the automatic selector switch that is in an unstandard condition.

41. In a system for testing groups of apparatus, each apparatus being individually accessible, a register switch having a plurality of positions, means to progressively test all apparatus of one group in each position of said register switch, and means to position said register by the manipulation of keys to progressively test the apparatus of any particular group.

42. In a system for testing groups of apparatus, said groups being divided into sub-groups, a register switch having a plurality of positions, a key set, means to position said register under the control of said keys, means under the control of said register and keys to select a particular sub-group in a particular group, means to test the apparatus of said sub-group, and means under the control of said key set to govern the number of sub-groups of apparatus tested in said particular group.

43. In a system for testing groups of apparatus, a progressively operable register, means to position said register to start said progression, means responsive to the completion of the test of each group of apparatus to reposition said register, and means to position said register by the manipulation of keys to test the apparatus of any particular group.

44. In a system for testing groups of apparatus, said groups being divided into sub-groups, a progressively operable register, means to position said register to start said progression, means to automatically advance said register from position to position, means to test one group of apparatus in each position of said register, automatic means to govern the number of sub-groups combined to make each group, other means to position said register to test apparatus in particular sub-groups, and other means to govern the number of said particular sub-groups tested.

45. In a system for testing automatic switches, an automatically progressive controlling device to select the switches to be tested, auxiliary apparatus associated with said switches, means to select one of said switches, means to test said switch and associated auxiliary apparatus, and means operable after a predetermined number of successive tests of said auxiliary apparatus to cause said controlling device to select a different automatic switch to be tested.

46. In a system for testing an automatically progressive testing device for testing groups of apparatus, means to select one of said groups, means to successively test each apparatus in said group, and means to restore to normal said testing device during any of said tests.

47. In a system for testing groups of automatic switches, said groups being divided into varying combinations of sub-groups, a progressively operable register, means to position said register, a plurality of test selectors, means to select one of said test selectors in accordance with the setting of said register, means to operate said test selector to select a group of automatic switches in accordance with the setting of said register, means to successively seize and test the automatic switches of the first sub-group of said group, means comprising a switch device to govern the number of sub-groups of automatic switches tested in said group, means under the control of said switching device to operate said test selector to successively select a plurality of other sub-groups of automatic switches in said group, means to successively seize and test said automatic switches, means to advance said register upon the completion of said tests for like operation in testing the automatic switches in other groups, and means to restore said system to normal in a progressive manner from any of its advanced positions.

48. In a system for testing groups of automatic switches, said groups being divided into varying combinations of sub-groups, a progressively operable register, means to position said register, a plurality of test selectors, means to select one of said test selectors in accordance with the setting of said register, means to operate said test selector to select a group of automatic switches in accordance with the setting of said register, means to successively seize and test the automatic switches of the first sub-group of said group, means comprising a switching device to govern the number of sub-groups of automatic switches tested in said group, means under the control of said switching device to operate said test selector to successively select a plurality of other sub-groups of automatic switches in said group, means to successively seize and test said automatic switches, means to advance said register upon the completion of said tests for like operation in testing the automatic switches in other groups, means operative during any point of progression to restore said system to normal in a progressive manner, and means to complete the test of a selected automatic switch before said restoring means is effective.

49. In a system for testing switches, said switches being operative over varying trunk loops, means to equalize said trunk loops, and means to test said switches over said equalized trunk loops.

50. In a system for testing switches, said switches being operative over varying trunk loops, means to automatically and progressively select said switches, means to equalize said trunk loops, and means to test said switches over said equalized trunk loops.

51. In a system for testing switches, said switches being operative over varying trunk loops, a progressively operable register, means to selectively equalize said trunk loops in accordance with the position of said register, and means to automatically advance said register from position to position.

52. In a system for testing groups of switches, said switches being operative over varying trunk loops, said trunk loops being the same for all switches in each group, a progressively operable register, means to selectively equalize said trunk loops in accordance with the position of said register, and means to automatically advance said register from position to position.

53. In a system for testing automatic switches, a progressively operable switching device to select said automatic switches, means including a sender to direct a selected switch to a testing device, means to test said switch for unstandard conditions, means to arrest the progression of said sender when an unstanderd condition is encountered, means to identify the unstandard switch, and means to identify the part of said switch in which said unstandard conditions exists.

54. In a system for testing automatic switches, a progressively operable switching device to select said automatic switches, means including a sender to direct a selected switch to a testing device, means to test said switch for unstandard conditions, means to arrest the progression of said sender when an unstandard condition is encountered, and means to advance said sender from its arrested position to cause automatic selection of the next successive switch to be tested.

55. In a system for testing groups of automatic switches, a progressively operable selecting device to select said groups of switches, means to successively select and test the automatic switches of said groups, and means to make a single repeat test or a plurality of repeat tests of any of said automatic switches.

In witness whereof, we hereunto subscribe our names this 27th day of September A. D., 1923.

HARRY W. MacDOUGALL.
ARNOLD S. BERTELS.